(12) United States Patent
Freed et al.

(10) Patent No.: US 11,800,303 B2
(45) Date of Patent: *Oct. 24, 2023

(54) SLIDING BIAS AND PEAK LIMITING FOR OPTICAL HEARING DEVICES

(71) Applicant: Earlens Corporation, Menlo Park, CA (US)

(72) Inventors: Daniel J. Freed, San Mateo, CA (US); Sunil Puria, Boston, MA (US)

(73) Assignee: Earlens Corporation, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/534,189

(22) Filed: Nov. 23, 2021

(65) Prior Publication Data

US 2022/0329954 A1    Oct. 13, 2022

Related U.S. Application Data

(63) Continuation of application No. 16/688,774, filed on Nov. 19, 2019, now Pat. No. 11,259,129, which is a
(Continued)

(51) Int. Cl.
*H04R 25/00* (2006.01)
*H04B 10/50* (2013.01)
*H04B 10/114* (2013.01)

(52) U.S. Cl.
CPC ......... *H04R 25/554* (2013.01); *H04B 10/114* (2013.01); *H04B 10/50595* (2013.01);
(Continued)

(58) Field of Classification Search
CPC .............. H04R 25/554; H04R 2225/33; H04R 2225/49; H04R 2460/03
See application file for complete search history.

(56) References Cited

U.S. PATENT DOCUMENTS 2,763,334 A    9/1956 Starkey
3,209,082 A    9/1965 McCarrell et al.
(Continued)

FOREIGN PATENT DOCUMENTS

AU    2004301961 A1    2/2005
CA      2242545 C       9/2009
(Continued)

OTHER PUBLICATIONS

Asbeck, et al. Scaling Hard Vertical Surfaces with Compliant Microspine Arrays, The International Journal of Robotics Research 2006; 25; 1165-79.
(Continued)

*Primary Examiner* — Sunita Joshi
(74) *Attorney, Agent, or Firm* — Polsinelli PC

(57) ABSTRACT

A processor comprises instructions to adjust a bias of an input signal in order to decrease a duty cycle of a pulse modulated optical signal. The bias can be increased, decreased, or maintained in response to one or more measured values of the signal. In many embodiments, a gain of the signal is adjusted with the bias in order to inhibit distortion. The bias can be adjusted slowly in order to inhibit audible noise, and the gain can be adjusted faster than the bias in order to inhibit clipping of the signal. In many embodiments, one or more of the bias or the gain is adjusted in response to a value of the signal traversing a threshold amount. The value may comprise a trough of the signal traversing the threshold.

56 Claims, 18 Drawing Sheets

Related U.S. Application Data continuation of application No. 15/890,185, filed on Feb. 6, 2018, now Pat. No. 10,531,206, which is a continuation of application No. 14/813,301, filed on Jul. 30, 2015, now Pat. No. 9,930,458, which is a continuation of application No. PCT/US2015/040397, filed on Jul. 14, 2015.

(60) Provisional application No. 62/024,275, filed on Jul. 14, 2014.

(52) U.S. Cl.
CPC ........ *H04R 25/606* (2013.01); *H04R 2225/33* (2013.01); *H04R 2225/49* (2013.01); *H04R 2460/03* (2013.01)

(56) References Cited

U.S. PATENT DOCUMENTS

| | | |
|---|---|---|
| 3,229,049 A | 1/1966 | Goldberg |
| 3,440,314 A | 4/1969 | Eldon |
| 3,449,768 A | 6/1969 | Doyle et al. |
| 3,526,949 A | 9/1970 | Genovese |
| 3,549,818 A | 12/1970 | Turner |
| 3,585,416 A | 6/1971 | Mellen |
| 3,594,514 A | 7/1971 | Wingrove |
| 3,710,399 A | 1/1973 | Hurst |
| 3,712,962 A | 1/1973 | Epley |
| 3,764,748 A | 10/1973 | Branch et al. |
| 3,808,179 A | 4/1974 | Gaylord |
| 3,870,832 A | 3/1975 | Fredrickson |
| 3,882,285 A | 5/1975 | Nunley et al. |
| 3,965,430 A | 6/1976 | Brandt |
| 3,985,977 A | 10/1976 | Beaty et al. |
| 4,002,897 A | 1/1977 | Kleinman et al. |
| 4,031,318 A | 6/1977 | Pitre |
| 4,061,972 A | 12/1977 | Burgess |
| 4,075,042 A | 2/1978 | Das |
| 4,098,277 A | 7/1978 | Mendell |
| 4,109,116 A | 8/1978 | Victoreen |
| 4,120,570 A | 10/1978 | Gaylord |
| 4,207,441 A | 6/1980 | Ricard et al. |
| 4,248,899 A | 2/1981 | Lyon et al. |
| 4,252,440 A | 2/1981 | Fedors et al. |
| 4,281,419 A | 8/1981 | Treace |
| 4,303,772 A | 12/1981 | Novicky |
| 4,319,359 A | 3/1982 | Wolf |
| 4,334,315 A | 6/1982 | Ono et al. |
| 4,334,321 A | 6/1982 | Edelman |
| 4,338,929 A | 7/1982 | Lundin et al. |
| 4,339,954 A | 7/1982 | Anson et al. |
| 4,357,497 A | 11/1982 | Hochmair et al. |
| 4,375,016 A | 2/1983 | Harada |
| 4,380,689 A | 4/1983 | Giannetti |
| 4,428,377 A | 1/1984 | Zollner et al. |
| 4,524,294 A | 6/1985 | Brody |
| 4,540,761 A | 9/1985 | Kawamura et al. |
| 4,556,122 A | 12/1985 | Goode |
| 4,592,087 A | 5/1986 | Killion |
| 4,606,329 A | 8/1986 | Hough |
| 4,611,598 A | 9/1986 | Hortmann et al. |
| 4,628,907 A | 12/1986 | Epley |
| 4,641,377 A | 2/1987 | Rush et al. |
| 4,652,414 A | 3/1987 | Schlaegel |
| 4,654,554 A | 3/1987 | Kishi |
| 4,689,819 A | 8/1987 | Killion |
| 4,696,287 A | 9/1987 | Hortmann et al. |
| 4,729,366 A | 3/1988 | Schaefer |
| 4,741,339 A | 5/1988 | Harrison et al. |
| 4,742,499 A | 5/1988 | Butler |
| 4,756,312 A | 7/1988 | Epley |
| 4,759,070 A | 7/1988 | Voroba et al. |
| 4,766,607 A | 8/1988 | Feldman |
| 4,774,933 A | 10/1988 | Hough et al. |
| 4,776,322 A | 10/1988 | Hough et al. |
| 4,782,818 A | 11/1988 | Mori |
| 4,800,884 A | 1/1989 | Heide et al. |
| 4,800,982 A | 1/1989 | Carlson |
| 4,817,607 A | 4/1989 | Tatge |
| 4,840,178 A | 6/1989 | Heide et al. |
| 4,845,755 A | 7/1989 | Busch et al. |
| 4,865,035 A | 9/1989 | Mori |
| 4,870,688 A | 9/1989 | Voroba et al. |
| 4,918,745 A | 4/1990 | Hutchison |
| 4,932,405 A | 6/1990 | Peeters et al. |
| 4,936,305 A | 6/1990 | Ashtiani et al. |
| 4,944,301 A | 7/1990 | Widin et al. |
| 4,948,855 A | 8/1990 | Novicky |
| 4,957,478 A | 9/1990 | Maniglia et al. |
| 4,963,963 A | 10/1990 | Dorman |
| 4,982,434 A | 1/1991 | Lenhardt et al. |
| 4,999,819 A | 3/1991 | Newnham et al. |
| 5,003,608 A | 3/1991 | Carlson |
| 5,012,520 A | 4/1991 | Steeger |
| 5,015,224 A | 5/1991 | Maniglia |
| 5,015,225 A | 5/1991 | Hough et al. |
| 5,031,219 A | 7/1991 | Ward et al. |
| 5,061,282 A | 10/1991 | Jacobs |
| 5,066,091 A | 11/1991 | Stoy et al. |
| 5,068,902 A | 11/1991 | Ward |
| 5,094,108 A | 3/1992 | Kim et al. |
| 5,117,461 A | 5/1992 | Moseley |
| 5,142,186 A | 8/1992 | Cross et al. |
| 5,163,957 A | 11/1992 | Sade et al. |
| 5,167,235 A | 12/1992 | Seacord et al. |
| 5,201,007 A | 4/1993 | Ward et al. |
| 5,220,612 A | 6/1993 | Tibbetts et al. |
| 5,259,032 A | 11/1993 | Perkins et al. |
| 5,272,757 A | 12/1993 | Scofield et al. |
| 5,276,910 A | 1/1994 | Buchele |
| 5,277,694 A | 1/1994 | Leysieffer et al. |
| 5,282,858 A | 2/1994 | Bisch et al. |
| 5,296,797 A | 3/1994 | Bartlett |
| 5,298,692 A | 3/1994 | Ikeda et al. |
| 5,338,287 A | 8/1994 | Miller et al. |
| 5,360,388 A | 11/1994 | Spindel et al. |
| 5,378,933 A | 1/1995 | Pfannenmueller et al. |
| 5,402,496 A | 3/1995 | Soli et al. |
| 5,411,467 A | 5/1995 | Hortmann et al. |
| 5,424,698 A | 6/1995 | Dydyk et al. |
| 5,425,104 A | 6/1995 | Shennib |
| 5,440,082 A | 8/1995 | Claes |
| 5,440,237 A | 8/1995 | Brown et al. |
| 5,455,994 A | 10/1995 | Termeer et al. |
| 5,456,654 A | 10/1995 | Ball |
| 5,531,787 A | 7/1996 | Lesinski et al. |
| 5,531,954 A | 7/1996 | Heide et al. |
| 5,535,282 A | 7/1996 | Luca |
| 5,554,096 A | 9/1996 | Ball |
| 5,558,618 A | 9/1996 | Maniglia |
| 5,571,148 A | 11/1996 | Loeb et al. |
| 5,572,594 A | 11/1996 | Devoe et al. |
| 5,606,621 A | 2/1997 | Reiter et al. |
| 5,624,376 A | 4/1997 | Ball et al. |
| 5,654,530 A | 8/1997 | Sauer et al. |
| 5,692,059 A | 11/1997 | Kruger |
| 5,699,809 A | 12/1997 | Combs et al. |
| 5,701,348 A | 12/1997 | Shennib et al. |
| 5,707,338 A | 1/1998 | Adams et al. |
| 5,715,321 A | 2/1998 | Andrea et al. |
| 5,721,783 A | 2/1998 | Anderson |
| 5,722,411 A | 3/1998 | Suzuki et al. |
| 5,729,077 A | 3/1998 | Newnham et al. |
| 5,740,258 A | 4/1998 | Goodwin-Johansson |
| 5,742,692 A | 4/1998 | Garcia et al. |
| 5,749,912 A | 5/1998 | Zhang et al. |
| 5,762,583 A | 6/1998 | Adams et al. |
| 5,772,575 A | 6/1998 | Lesinski et al. |
| 5,774,259 A | 6/1998 | Saitoh et al. |
| 5,782,744 A | 7/1998 | Money |
| 5,788,711 A | 8/1998 | Lehner et al. |
| 5,795,287 A | 8/1998 | Ball et al. |
| 5,797,834 A | 8/1998 | Goode |

(56) References Cited

U.S. PATENT DOCUMENTS

| | | |
|---|---|---|
| 5,800,336 A | 9/1998 | Ball et al. |
| 5,804,109 A | 9/1998 | Perkins |
| 5,804,907 A | 9/1998 | Park et al. |
| 5,814,095 A | 9/1998 | Mueller et al. |
| 5,824,022 A | 10/1998 | Zilberman et al. |
| 5,825,122 A | 10/1998 | Givargizov et al. |
| 5,836,863 A | 11/1998 | Bushek et al. |
| 5,842,967 A | 12/1998 | Kroll |
| 5,851,199 A | 12/1998 | Peerless et al. |
| 5,857,958 A | 1/1999 | Ball et al. |
| 5,859,916 A | 1/1999 | Ball et al. |
| 5,868,682 A | 2/1999 | Combs et al. |
| 5,879,283 A | 3/1999 | Adams et al. |
| 5,888,187 A | 3/1999 | Jaeger et al. |
| 5,897,486 A | 4/1999 | Ball et al. |
| 5,899,847 A | 5/1999 | Adams et al. |
| 5,900,274 A | 5/1999 | Chatterjee et al. |
| 5,906,635 A | 5/1999 | Maniglia |
| 5,913,815 A | 6/1999 | Ball et al. |
| 5,922,017 A | 7/1999 | Bredberg et al. |
| 5,922,077 A | 7/1999 | Espy et al. |
| 5,935,170 A | 8/1999 | Haakansson et al. |
| 5,940,519 A | 8/1999 | Kuo |
| 5,949,895 A | 9/1999 | Ball et al. |
| 5,951,601 A | 9/1999 | Lesinski et al. |
| 5,984,859 A | 11/1999 | Lesinski |
| 5,987,146 A | 11/1999 | Pluvinage et al. |
| 6,001,129 A | 12/1999 | Bushek et al. |
| 6,005,955 A | 12/1999 | Kroll et al. |
| 6,011,984 A | 1/2000 | Van Antwerp et al. |
| 6,024,717 A | 2/2000 | Ball et al. |
| 6,038,480 A | 3/2000 | Hrdlicka et al. |
| 6,045,528 A | 4/2000 | Arenberg et al. |
| 6,050,933 A | 4/2000 | Bushek et al. |
| 6,067,474 A | 5/2000 | Schulman et al. |
| 6,068,589 A | 5/2000 | Neukermans |
| 6,068,590 A | 5/2000 | Brisken |
| 6,072,884 A | 6/2000 | Kates |
| 6,084,975 A | 7/2000 | Perkins |
| 6,093,144 A | 7/2000 | Jaeger et al. |
| 6,135,612 A | 10/2000 | Clore |
| 6,137,889 A | 10/2000 | Shennib et al. |
| 6,139,488 A | 10/2000 | Ball |
| 6,153,966 A | 11/2000 | Neukermans |
| 6,168,948 B1 | 1/2001 | Anderson et al. |
| 6,174,278 B1 | 1/2001 | Jaeger et al. |
| 6,175,637 B1 | 1/2001 | Fujihira et al. |
| 6,181,801 B1 | 1/2001 | Puthuff et al. |
| 6,190,305 B1 | 2/2001 | Ball et al. |
| 6,190,306 B1 | 2/2001 | Kennedy |
| 6,208,445 B1 | 3/2001 | Reime |
| 6,216,040 B1 | 4/2001 | Harrison |
| 6,217,508 B1 | 4/2001 | Ball et al. |
| 6,219,427 B1 | 4/2001 | Kates et al. |
| 6,222,302 B1 | 4/2001 | Imada et al. |
| 6,222,927 B1 | 4/2001 | Feng et al. |
| 6,240,192 B1 | 5/2001 | Brennan et al. |
| 6,241,767 B1 | 6/2001 | Stennert et al. |
| 6,259,951 B1 | 7/2001 | Kuzma et al. |
| 6,261,224 B1 | 7/2001 | Adams et al. |
| 6,264,603 B1 | 7/2001 | Kennedy |
| 6,277,148 B1 | 8/2001 | Dormer |
| 6,312,959 B1 | 11/2001 | Datskos |
| 6,339,648 B1 | 1/2002 | McIntosh et al. |
| 6,342,035 B1 | 1/2002 | Kroll et al. |
| 6,354,990 B1 | 3/2002 | Juneau et al. |
| 6,359,993 B2 | 3/2002 | Brimhall |
| 6,366,863 B1 | 4/2002 | Bye et al. |
| 6,374,143 B1 | 4/2002 | Berrang et al. |
| 6,385,363 B1 | 5/2002 | Rajic et al. |
| 6,387,039 B1 | 5/2002 | Moses |
| 6,390,971 B1 | 5/2002 | Adams et al. |
| 6,393,130 B1 | 5/2002 | Stonikas et al. |
| 6,422,991 B1 | 7/2002 | Jaeger |
| 6,432,248 B1 | 8/2002 | Popp et al. |
| 6,434,246 B1 | 8/2002 | Kates et al. |
| 6,434,247 B1 | 8/2002 | Kates et al. |
| 6,436,028 B1 | 8/2002 | Dormer |
| 6,438,244 B1 | 8/2002 | Juneau et al. |
| 6,445,799 B1 | 9/2002 | Taenzer et al. |
| 6,473,512 B1 | 10/2002 | Juneau et al. |
| 6,475,134 B1 | 11/2002 | Ball et al. |
| 6,491,622 B1 | 12/2002 | Kasic, II et al. |
| 6,491,644 B1 | 12/2002 | Vujanic et al. |
| 6,491,722 B1 | 12/2002 | Kroll et al. |
| 6,493,453 B1 | 12/2002 | Glendon |
| 6,493,454 B1 | 12/2002 | Loi et al. |
| 6,498,858 B2 | 12/2002 | Kates |
| 6,507,758 B1 | 1/2003 | Greenberg et al. |
| 6,519,376 B2 | 2/2003 | Biagi et al. |
| 6,523,985 B2 | 2/2003 | Hamanaka et al. |
| 6,536,530 B2 | 3/2003 | Schultz et al. |
| 6,537,200 B2 | 3/2003 | Leysieffer et al. |
| 6,547,715 B1 | 4/2003 | Mueller et al. |
| 6,549,633 B1 | 4/2003 | Westermann |
| 6,549,635 B1 | 4/2003 | Gebert |
| 6,554,761 B1 | 4/2003 | Puria et al. |
| 6,575,894 B2 | 6/2003 | Leysieffer et al. |
| 6,592,513 B1 | 7/2003 | Kroll et al. |
| 6,603,860 B1 | 8/2003 | Taenzer et al. |
| 6,620,110 B2 | 9/2003 | Schmid |
| 6,626,822 B1 | 9/2003 | Jaeger et al. |
| 6,629,922 B1 | 10/2003 | Puria et al. |
| 6,631,196 B1 | 10/2003 | Taenzer et al. |
| 6,643,378 B2 | 11/2003 | Schumaier |
| 6,663,575 B2 | 12/2003 | Leysieffer |
| 6,668,062 B1 | 12/2003 | Luo et al. |
| 6,676,592 B2 | 1/2004 | Ball et al. |
| 6,681,022 B1 | 1/2004 | Puthuff et al. |
| 6,695,943 B2 | 2/2004 | Juneau et al. |
| 6,697,674 B2 | 2/2004 | Leysieffer |
| 6,724,902 B1 | 4/2004 | Shennib et al. |
| 6,726,618 B2 | 4/2004 | Miller |
| 6,726,718 B1 | 4/2004 | Carlyle et al. |
| 6,727,789 B2 | 4/2004 | Tibbetts et al. |
| 6,728,024 B2 | 4/2004 | Ribak |
| 6,735,318 B2 | 5/2004 | Cho |
| 6,754,358 B1 | 6/2004 | Boesen et al. |
| 6,754,359 B1 | 6/2004 | Svean et al. |
| 6,754,537 B1 | 6/2004 | Harrison et al. |
| 6,785,394 B1 | 8/2004 | Olsen et al. |
| 6,792,114 B1 | 9/2004 | Kates et al. |
| 6,801,629 B2 | 10/2004 | Brimhall et al. |
| 6,829,363 B2 | 12/2004 | Sacha |
| 6,831,986 B2 | 12/2004 | Kates |
| 6,837,857 B2 | 1/2005 | Stirnemann |
| 6,842,647 B1 | 1/2005 | Griffith et al. |
| 6,888,949 B1 | 5/2005 | Vanden et al. |
| 6,900,926 B2 | 5/2005 | Ribak |
| 6,912,289 B2 | 6/2005 | Vonlanthen et al. |
| 6,920,340 B2 | 7/2005 | Laderman |
| 6,931,231 B1 | 8/2005 | Griffin |
| 6,940,988 B1 | 9/2005 | Shennib et al. |
| 6,940,989 B1 | 9/2005 | Shennib et al. |
| 6,942,989 B2 | 9/2005 | Felkner et al. |
| D512,979 S | 12/2005 | Corcoran et al. |
| 6,975,402 B2 | 12/2005 | Bisson et al. |
| 6,978,159 B2 | 12/2005 | Feng et al. |
| 7,020,297 B2 | 3/2006 | Fang et al. |
| 7,024,010 B2 | 4/2006 | Saunders et al. |
| 7,043,037 B2 | 5/2006 | Lichtblau et al. |
| 7,050,675 B2 | 5/2006 | Zhou et al. |
| 7,050,876 B1 | 5/2006 | Fu et al. |
| 7,057,256 B2 | 6/2006 | Mazur et al. |
| 7,058,182 B2 | 6/2006 | Kates |
| 7,058,188 B1 | 6/2006 | Allred |
| 7,072,475 B1 | 7/2006 | Denap et al. |
| 7,076,076 B2 | 7/2006 | Bauman |
| 7,095,981 B1 | 8/2006 | Voroba et al. |
| 7,167,572 B1 | 1/2007 | Harrison et al. |
| 7,174,026 B2 | 2/2007 | Niederdrank et al. |
| 7,179,238 B2 | 2/2007 | Hissong |
| 7,181,034 B2 | 2/2007 | Armstrong |
| 7,203,331 B2 | 4/2007 | Boesen |

(56) References Cited

U.S. PATENT DOCUMENTS

| | | |
|---|---|---|
| 7,239,069 B2 | 7/2007 | Cho |
| 7,245,732 B2 | 7/2007 | Jorgensen et al. |
| 7,255,457 B2 | 8/2007 | Ducharme et al. |
| 7,266,208 B2 | 9/2007 | Charvin et al. |
| 7,289,639 B2 | 10/2007 | Abel et al. |
| 7,313,245 B1 | 12/2007 | Shennib |
| 7,315,211 B1 | 1/2008 | Lee et al. |
| 7,322,930 B2 | 1/2008 | Jaeger et al. |
| 7,349,741 B2 | 3/2008 | Maltan et al. |
| 7,354,792 B2 | 4/2008 | Mazur et al. |
| 7,376,563 B2 | 5/2008 | Leysieffer et al. |
| 7,390,689 B2 | 6/2008 | Mazur et al. |
| 7,394,909 B1 | 7/2008 | Widmer et al. |
| 7,421,087 B2 | 9/2008 | Perkins et al. |
| 7,424,122 B2 | 9/2008 | Ryan |
| 7,444,877 B2 | 11/2008 | Li et al. |
| 7,547,275 B2 | 6/2009 | Cho et al. |
| 7,630,646 B2 | 12/2009 | Anderson et al. |
| 7,645,877 B2 | 1/2010 | Gmeiner et al. |
| 7,668,325 B2 | 2/2010 | Puria et al. |
| 7,747,295 B2 | 6/2010 | Choi |
| 7,778,434 B2 | 8/2010 | Juneau et al. |
| 7,809,150 B2 | 10/2010 | Natarajan et al. |
| 7,822,215 B2 | 10/2010 | Carazo et al. |
| 7,826,632 B2 | 11/2010 | Von Buol et al. |
| 7,853,033 B2 | 12/2010 | Maltan et al. |
| 7,867,160 B2 | 1/2011 | Pluvinage et al. |
| 7,883,535 B2 | 2/2011 | Cantin et al. |
| 7,885,359 B2 | 2/2011 | Meltzer |
| 7,955,249 B2 | 6/2011 | Perkins et al. |
| 7,983,435 B2 | 7/2011 | Moses |
| 8,090,134 B2 | 1/2012 | Takigawa et al. |
| 8,099,169 B1 | 1/2012 | Karunasiri |
| 8,116,494 B2 | 2/2012 | Rass |
| 8,128,551 B2 | 3/2012 | Jolly |
| 8,157,730 B2 | 4/2012 | LeBoeuf et al. |
| 8,197,461 B1 | 6/2012 | Arenberg et al. |
| 8,204,786 B2 | 6/2012 | LeBoeuf et al. |
| 8,233,651 B1 | 7/2012 | Haller |
| 8,251,903 B2 | 8/2012 | LeBoeuf et al. |
| 8,284,970 B2 | 10/2012 | Sacha |
| 8,295,505 B2 | 10/2012 | Weinans et al. |
| 8,295,523 B2 | 10/2012 | Fay et al. |
| 8,320,601 B2 | 11/2012 | Takigawa et al. |
| 8,320,982 B2 | 11/2012 | LeBoeuf et al. |
| 8,340,310 B2 | 12/2012 | Ambrose et al. |
| 8,340,335 B1 | 12/2012 | Shennib |
| 8,391,527 B2 | 3/2013 | Feucht et al. |
| 8,396,235 B2 | 3/2013 | Gebhardt et al. |
| 8,396,239 B2 | 3/2013 | Fay et al. |
| 8,401,212 B2 | 3/2013 | Puria et al. |
| 8,401,214 B2 | 3/2013 | Perkins et al. |
| 8,506,473 B2 | 8/2013 | Puria |
| 8,512,242 B2 | 8/2013 | LeBoeuf et al. |
| 8,526,651 B2 | 9/2013 | Lafort et al. |
| 8,526,652 B2 | 9/2013 | Ambrose et al. |
| 8,526,971 B2 | 9/2013 | Giniger et al. |
| 8,545,383 B2 | 10/2013 | Wenzel et al. |
| 8,600,089 B2 | 12/2013 | Wenzel et al. |
| 8,647,270 B2 | 2/2014 | LeBoeuf et al. |
| 8,652,040 B2 | 2/2014 | LeBoeuf et al. |
| 8,684,922 B2 | 4/2014 | Tran |
| 8,696,054 B2 | 4/2014 | Crum |
| 8,696,541 B2 | 4/2014 | Pluvinage et al. |
| 8,700,111 B2 | 4/2014 | LeBoeuf et al. |
| 8,702,607 B2 | 4/2014 | LeBoeuf et al. |
| 8,715,152 B2 | 5/2014 | Puria et al. |
| 8,715,153 B2 | 5/2014 | Puria et al. |
| 8,715,154 B2 | 5/2014 | Perkins et al. |
| 8,761,423 B2 | 6/2014 | Wagner et al. |
| 8,787,609 B2 | 7/2014 | Perkins et al. |
| 8,788,002 B2 | 7/2014 | LeBoeuf et al. |
| 8,817,998 B2 | 8/2014 | Inoue |
| 8,824,715 B2 | 9/2014 | Fay et al. |
| 8,837,758 B2 | 9/2014 | Knudsen |
| 8,845,705 B2 | 9/2014 | Perkins et al. |
| 8,855,323 B2 | 10/2014 | Kroman |
| 8,858,419 B2 | 10/2014 | Puria et al. |
| 8,885,860 B2 | 11/2014 | Djalilian et al. |
| 8,886,269 B2 | 11/2014 | LeBoeuf et al. |
| 8,888,701 B2 | 11/2014 | LeBoeuf et al. |
| 8,923,941 B2 | 12/2014 | LeBoeuf et al. |
| 8,929,965 B2 | 1/2015 | LeBoeuf et al. |
| 8,929,966 B2 | 1/2015 | LeBoeuf et al. |
| 8,934,952 B2 | 1/2015 | LeBoeuf et al. |
| 8,942,776 B2 | 1/2015 | LeBoeuf et al. |
| 8,961,415 B2 | 2/2015 | LeBoeuf et al. |
| 8,986,187 B2 | 3/2015 | Perkins et al. |
| 8,989,830 B2 | 3/2015 | LeBoeuf et al. |
| 9,044,180 B2 | 6/2015 | LeBoeuf et al. |
| 9,049,528 B2 | 6/2015 | Fay et al. |
| 9,055,379 B2 | 6/2015 | Puria et al. |
| 9,131,312 B2 | 9/2015 | LeBoeuf et al. |
| 9,154,891 B2 | 10/2015 | Puria et al. |
| 9,211,069 B2 | 12/2015 | Larsen et al. |
| 9,226,083 B2 | 12/2015 | Puria et al. |
| 9,277,335 B2 | 3/2016 | Perkins et al. |
| 9,289,135 B2 | 3/2016 | LeBoeuf et al. |
| 9,289,175 B2 | 3/2016 | LeBoeuf et al. |
| 9,301,696 B2 | 4/2016 | LeBoeuf et al. |
| 9,314,167 B2 | 4/2016 | LeBoeuf et al. |
| 9,392,377 B2 | 7/2016 | Olsen et al. |
| 9,427,191 B2 | 8/2016 | LeBoeuf |
| 9,497,556 B2 | 11/2016 | Kaltenbacher et al. |
| 9,521,962 B2 | 12/2016 | LeBoeuf |
| 9,524,092 B2 | 12/2016 | Ren et al. |
| 9,538,921 B2 | 1/2017 | LeBoeuf et al. |
| 9,544,675 B2 | 1/2017 | Facteau et al. |
| 9,544,700 B2 | 1/2017 | Puria et al. |
| 9,564,862 B2 | 2/2017 | Hoyerby |
| 9,591,409 B2 | 3/2017 | Puria et al. |
| 9,749,758 B2 | 8/2017 | Puria et al. |
| 9,750,462 B2 | 9/2017 | LeBoeuf et al. |
| 9,788,785 B2 | 10/2017 | LeBoeuf |
| 9,788,794 B2 | 10/2017 | LeBoeuf et al. |
| 9,794,653 B2 | 10/2017 | Aumer et al. |
| 9,794,688 B2 | 10/2017 | You |
| 9,801,552 B2 | 10/2017 | Romesburg |
| 9,808,204 B2 | 11/2017 | LeBoeuf et al. |
| 9,924,276 B2 | 3/2018 | Wenzel |
| 9,930,458 B2 | 3/2018 | Freed et al. |
| 9,949,035 B2 | 4/2018 | Rucker et al. |
| 9,949,039 B2 | 4/2018 | Perkins et al. |
| 9,949,045 B2 | 4/2018 | Kure et al. |
| 9,961,454 B2 | 5/2018 | Puria et al. |
| 9,964,672 B2 | 5/2018 | Phair et al. |
| 10,003,888 B2 | 6/2018 | Stephanou et al. |
| 10,034,103 B2 | 7/2018 | Puria et al. |
| 10,143,592 B2 | 12/2018 | Goldstein |
| 10,154,352 B2 | 12/2018 | Perkins et al. |
| 10,178,483 B2 | 1/2019 | Teran et al. |
| 10,206,045 B2 | 2/2019 | Kaltenbacher et al. |
| 10,237,663 B2 | 3/2019 | Puria et al. |
| 10,284,964 B2 | 5/2019 | Olsen et al. |
| 10,286,215 B2 | 5/2019 | Perkins et al. |
| 10,292,601 B2 | 5/2019 | Perkins et al. |
| 10,306,381 B2 | 5/2019 | Sandhu et al. |
| 10,492,010 B2 | 11/2019 | Rucker et al. |
| 10,511,913 B2 | 12/2019 | Puria et al. |
| 10,516,946 B2 | 12/2019 | Puria et al. |
| 10,516,949 B2 | 12/2019 | Puria et al. |
| 10,516,950 B2 | 12/2019 | Perkins et al. |
| 10,516,951 B2 | 12/2019 | Wenzel |
| 10,531,206 B2 | 1/2020 | Freed et al. |
| 10,555,100 B2 | 2/2020 | Perkins et al. |
| 10,609,492 B2 | 3/2020 | Olsen et al. |
| 10,743,110 B2 | 8/2020 | Puria et al. |
| 10,779,094 B2 | 9/2020 | Rucker et al. |
| 10,863,286 B2 | 12/2020 | Perkins et al. |
| 11,057,714 B2 | 7/2021 | Puria et al. |
| 11,058,305 B2 | 7/2021 | Perkins et al. |
| 11,070,927 B2 | 7/2021 | Rucker et al. |
| 11,102,594 B2 | 8/2021 | Shaquer et al. |
| 11,153,697 B2 | 10/2021 | Olsen et al. |

(56) References Cited

U.S. PATENT DOCUMENTS

| | | |
|---|---|---|
| 11,166,114 B2 | 11/2021 | Perkins et al. |
| 11,212,626 B2 | 12/2021 | Larkin et al. |
| 11,252,516 B2 | 2/2022 | Wenzel |
| 11,259,129 B2 | 2/2022 | Freed et al. |
| 11,310,605 B2 | 4/2022 | Puria et al. |
| 11,317,224 B2 | 4/2022 | Puria |
| 11,337,012 B2 | 5/2022 | Atamaniuk et al. |
| 11,350,226 B2 | 5/2022 | Sandhu et al. |
| 11,483,665 B2 | 10/2022 | Perkins et al. |
| 11,516,602 B2 | 11/2022 | Rucker et al. |
| 11,516,603 B2 | 11/2022 | Dy et al. |
| 2001/0003788 A1 | 6/2001 | Ball et al. |
| 2001/0007050 A1 | 7/2001 | Adelman |
| 2001/0024507 A1 | 9/2001 | Boesen |
| 2001/0027342 A1 | 10/2001 | Dormer |
| 2001/0029313 A1 | 10/2001 | Kennedy |
| 2001/0053871 A1 | 12/2001 | Zilberman et al. |
| 2002/0025055 A1 | 2/2002 | Stonikas et al. |
| 2002/0035309 A1 | 3/2002 | Leysieffer |
| 2002/0048374 A1 | 4/2002 | Soli et al. |
| 2002/0085728 A1 | 7/2002 | Shennib et al. |
| 2002/0086715 A1 | 7/2002 | Sahagen |
| 2002/0172350 A1 | 11/2002 | Edwards et al. |
| 2002/0183587 A1 | 12/2002 | Dormer |
| 2003/0021903 A1 | 1/2003 | Shlenker et al. |
| 2003/0055311 A1 | 3/2003 | Neukermans et al. |
| 2003/0064746 A1 | 4/2003 | Rader et al. |
| 2003/0081803 A1 | 5/2003 | Petilli et al. |
| 2003/0097178 A1 | 5/2003 | Roberson et al. |
| 2003/0125602 A1 | 7/2003 | Sokolich et al. |
| 2003/0142841 A1 | 7/2003 | Wiegand |
| 2003/0208099 A1 | 11/2003 | Ball |
| 2003/0208888 A1 | 11/2003 | Fearing et al. |
| 2004/0093040 A1 | 5/2004 | Boylston et al. |
| 2004/0121291 A1 | 6/2004 | Knapp et al. |
| 2004/0158157 A1 | 8/2004 | Jensen et al. |
| 2004/0165742 A1 | 8/2004 | Shennib et al. |
| 2004/0166495 A1 | 8/2004 | Greinwald, Jr. et al. |
| 2004/0167377 A1 | 8/2004 | Schafer et al. |
| 2004/0190734 A1 | 9/2004 | Kates |
| 2004/0202339 A1 | 10/2004 | O'Brien, Jr et al. |
| 2004/0202340 A1 | 10/2004 | Armstrong et al. |
| 2004/0208333 A1 | 10/2004 | Cheung et al. |
| 2004/0234089 A1 | 11/2004 | Rembrand et al. |
| 2004/0234092 A1 | 11/2004 | Wada et al. |
| 2004/0236416 A1 | 11/2004 | Falotico |
| 2004/0240691 A1 | 12/2004 | Grafenberg |
| 2005/0018859 A1 | 1/2005 | Buchholz |
| 2005/0020873 A1 | 1/2005 | Berrang et al. |
| 2005/0036639 A1 | 2/2005 | Bachler et al. |
| 2005/0038498 A1 | 2/2005 | Dubrow et al. |
| 2005/0088435 A1 | 4/2005 | Geng |
| 2005/0101830 A1 | 5/2005 | Easter et al. |
| 2005/0111683 A1 | 5/2005 | Chabries et al. |
| 2005/0117765 A1 | 6/2005 | Meyer et al. |
| 2005/0190939 A1 | 9/2005 | Fretz |
| 2005/0196005 A1 | 9/2005 | Shennib et al. |
| 2005/0222823 A1 | 10/2005 | Brumback et al. |
| 2005/0226446 A1 | 10/2005 | Luo et al. |
| 2005/0267549 A1 | 12/2005 | Della et al. |
| 2005/0271870 A1 | 12/2005 | Jackson |
| 2005/0288739 A1 | 12/2005 | Hassler, Jr. et al. |
| 2006/0058573 A1 | 3/2006 | Neisz et al. |
| 2006/0062420 A1 | 3/2006 | Araki |
| 2006/0074159 A1 | 4/2006 | Lu et al. |
| 2006/0075175 A1 | 4/2006 | Jensen et al. |
| 2006/0161227 A1 | 7/2006 | Walsh et al. |
| 2006/0161255 A1 | 7/2006 | Zarowski et al. |
| 2006/0177079 A1 | 8/2006 | Baekgaard et al. |
| 2006/0177082 A1 | 8/2006 | Solomito et al. |
| 2006/0183965 A1 | 8/2006 | Kasic, II et al. |
| 2006/0231914 A1 | 10/2006 | Carey, III et al. |
| 2006/0233398 A1 | 10/2006 | Husung |
| 2006/0237126 A1 | 10/2006 | Guffrey et al. |
| 2006/0247735 A1 | 11/2006 | Honert et al. |
| 2006/0256989 A1 | 11/2006 | Olsen et al. |
| 2006/0278245 A1 | 12/2006 | Gan |
| 2007/0030990 A1 | 2/2007 | Fischer |
| 2007/0036377 A1 | 2/2007 | Stirnemann |
| 2007/0076913 A1 | 4/2007 | Schanz |
| 2007/0083078 A1 | 4/2007 | Easter et al. |
| 2007/0127748 A1 | 6/2007 | Carlile et al. |
| 2007/0127752 A1 | 6/2007 | Armstrong |
| 2007/0127766 A1 | 6/2007 | Combest |
| 2007/0135870 A1 | 6/2007 | Shanks et al. |
| 2007/0161848 A1 | 7/2007 | Dalton et al. |
| 2007/0191673 A1 | 8/2007 | Ball et al. |
| 2007/0201713 A1 | 8/2007 | Fang et al. |
| 2007/0206825 A1 | 9/2007 | Thomasson |
| 2007/0223755 A1 | 9/2007 | Salvetti et al. |
| 2007/0225776 A1 | 9/2007 | Fritsch et al. |
| 2007/0236704 A1 | 10/2007 | Carr et al. |
| 2007/0250119 A1 | 10/2007 | Tyler et al. |
| 2007/0251082 A1 | 11/2007 | Milojevic et al. |
| 2007/0258507 A1 | 11/2007 | Lee et al. |
| 2007/0286429 A1 | 12/2007 | Grafenberg et al. |
| 2008/0021518 A1 | 1/2008 | Hochmair et al. |
| 2008/0051623 A1 | 2/2008 | Schneider et al. |
| 2008/0054509 A1 | 3/2008 | Berman et al. |
| 2008/0063228 A1 | 3/2008 | Mejia et al. |
| 2008/0063231 A1 | 3/2008 | Juneau et al. |
| 2008/0077198 A1 | 3/2008 | Webb et al. |
| 2008/0089292 A1 | 4/2008 | Kitazoe et al. |
| 2008/0107292 A1 | 5/2008 | Kornagel |
| 2008/0123866 A1 | 5/2008 | Rule et al. |
| 2008/0130927 A1 | 6/2008 | Theverapperuma et al. |
| 2008/0188707 A1 | 8/2008 | Bernard et al. |
| 2008/0298600 A1 | 12/2008 | Poe et al. |
| 2008/0300703 A1 | 12/2008 | Widmer et al. |
| 2009/0016553 A1 | 1/2009 | Ho et al. |
| 2009/0023976 A1 | 1/2009 | Cho et al. |
| 2009/0043149 A1 | 2/2009 | Abel et al. |
| 2009/0076581 A1 | 3/2009 | Gibson |
| 2009/0131742 A1 | 5/2009 | Cho et al. |
| 2009/0141919 A1 | 6/2009 | Spitaels et al. |
| 2009/0149697 A1 | 6/2009 | Steinhardt et al. |
| 2009/0157143 A1 | 6/2009 | Edler et al. |
| 2009/0175474 A1 | 7/2009 | Salvetti et al. |
| 2009/0246627 A1 | 10/2009 | Park |
| 2009/0253951 A1 | 10/2009 | Ball et al. |
| 2009/0262966 A1 | 10/2009 | Vestergaard et al. |
| 2009/0281367 A1 | 11/2009 | Cho et al. |
| 2009/0310805 A1 | 12/2009 | Petroff |
| 2009/0316922 A1 | 12/2009 | Merks et al. |
| 2010/0036488 A1 | 2/2010 | De Juan, Jr. et al. |
| 2010/0048982 A1* | 2/2010 | Puria .................. H04R 23/008 607/57 |
| 2010/0085176 A1 | 4/2010 | Flick |
| 2010/0103404 A1 | 4/2010 | Remke et al. |
| 2010/0114190 A1 | 5/2010 | Bendett et al. |
| 2010/0145135 A1 | 6/2010 | Ball et al. |
| 2010/0171369 A1 | 7/2010 | Baarman et al. |
| 2010/0172507 A1 | 7/2010 | Merks |
| 2010/0177918 A1 | 7/2010 | Keady et al. |
| 2010/0222639 A1 | 9/2010 | Purcell et al. |
| 2010/0260364 A1 | 10/2010 | Merks |
| 2010/0272299 A1 | 10/2010 | Van Schuylenbergh et al. |
| 2010/0290653 A1 | 11/2010 | Wiggins et al. |
| 2010/0322452 A1 | 12/2010 | Ladabaum et al. |
| 2011/0062793 A1 | 3/2011 | Azancot et al. |
| 2011/0069852 A1 | 3/2011 | Arndt et al. |
| 2011/0084654 A1 | 4/2011 | Julstrom et al. |
| 2011/0112462 A1 | 5/2011 | Parker et al. |
| 2011/0116666 A1 | 5/2011 | Dittberner et al. |
| 2011/0125222 A1 | 5/2011 | Perkins et al. |
| 2011/0130622 A1 | 6/2011 | Ilberg et al. |
| 2011/0144414 A1 | 6/2011 | Spearman et al. |
| 2011/0164771 A1 | 7/2011 | Jensen et al. |
| 2011/0196460 A1 | 8/2011 | Weiss |
| 2011/0221391 A1 | 9/2011 | Won et al. |
| 2011/0249845 A1 | 10/2011 | Kates |
| 2011/0249847 A1 | 10/2011 | Salvetti et al. |
| 2011/0257290 A1 | 10/2011 | Zeller et al. |
| 2011/0258839 A1 | 10/2011 | Probst |

(56) References Cited

U.S. PATENT DOCUMENTS

| | | |
|---|---|---|
| 2011/0271965 A1 | 11/2011 | Parkins et al. |
| 2012/0008807 A1 | 1/2012 | Gran |
| 2012/0038881 A1 | 2/2012 | Amirparviz et al. |
| 2012/0039493 A1 | 2/2012 | Rucker et al. |
| 2012/0092461 A1 | 4/2012 | Fisker et al. |
| 2012/0114157 A1 | 5/2012 | Arndt et al. |
| 2012/0140967 A1 | 6/2012 | Aubert et al. |
| 2012/0217087 A1 | 8/2012 | Ambrose et al. |
| 2012/0236524 A1 | 9/2012 | Pugh et al. |
| 2012/0263339 A1 | 10/2012 | Funahashi |
| 2013/0004004 A1 | 1/2013 | Zhao et al. |
| 2013/0034258 A1 | 2/2013 | Lin |
| 2013/0083938 A1 | 4/2013 | Bakalos et al. |
| 2013/0089227 A1 | 4/2013 | Kates |
| 2013/0195300 A1 | 8/2013 | Larsen et al. |
| 2013/0230204 A1 | 9/2013 | Monahan et al. |
| 2013/0303835 A1 | 11/2013 | Koskowich |
| 2013/0308782 A1 | 11/2013 | Dittberner et al. |
| 2013/0308807 A1 | 11/2013 | Burns |
| 2013/0343584 A1 | 12/2013 | Bennett et al. |
| 2013/0343585 A1 | 12/2013 | Bennett et al. |
| 2013/0343587 A1 | 12/2013 | Naylor et al. |
| 2014/0084698 A1 | 3/2014 | Asanuma et al. |
| 2014/0107423 A1 | 4/2014 | Yaacobi |
| 2014/0153761 A1 | 6/2014 | Shennib et al. |
| 2014/0169603 A1 | 6/2014 | Sacha et al. |
| 2014/0177863 A1 | 6/2014 | Parkins |
| 2014/0194891 A1 | 7/2014 | Shahoian |
| 2014/0254856 A1 | 9/2014 | Blick et al. |
| 2014/0286514 A1 | 9/2014 | Pluvinage et al. |
| 2014/0288356 A1 | 9/2014 | Van Vlem |
| 2014/0288358 A1 | 9/2014 | Puria et al. |
| 2014/0296620 A1 | 10/2014 | Puria et al. |
| 2014/0321657 A1 | 10/2014 | Stirnemann |
| 2014/0379874 A1 | 12/2014 | Starr et al. |
| 2015/0021568 A1 | 1/2015 | Gong et al. |
| 2015/0049889 A1 | 2/2015 | Bern |
| 2015/0117689 A1 | 4/2015 | Bergs et al. |
| 2015/0124985 A1 | 5/2015 | Kim et al. |
| 2015/0201269 A1 | 7/2015 | Dahl |
| 2015/0222978 A1 | 8/2015 | Murozaki |
| 2015/0358743 A1* | 12/2015 | Killion .......... H04B 10/502 381/323 |
| 2016/0008176 A1 | 1/2016 | Goldstein |
| 2016/0064814 A1 | 3/2016 | Jang et al. |
| 2016/0087687 A1 | 3/2016 | Kesler et al. |
| 2016/0094043 A1 | 3/2016 | Hao et al. |
| 2016/0277854 A1 | 9/2016 | Puria et al. |
| 2016/0309265 A1 | 10/2016 | Pluvinage et al. |
| 2016/0309266 A1 | 10/2016 | Olsen et al. |
| 2016/0330555 A1 | 11/2016 | Vonlanthen et al. |
| 2017/0040012 A1 | 2/2017 | Goldstein |
| 2017/0095202 A1 | 4/2017 | Facteau et al. |
| 2017/0180888 A1 | 6/2017 | Andersson et al. |
| 2017/0195806 A1 | 7/2017 | Atamaniuk et al. |
| 2017/0257710 A1 | 9/2017 | Parker |
| 2018/0077503 A1 | 3/2018 | Shaquer et al. |
| 2018/0077504 A1 | 3/2018 | Shaquer et al. |
| 2018/0213331 A1 | 7/2018 | Rucker et al. |
| 2018/0262846 A1 | 9/2018 | Perkins et al. |
| 2018/0317026 A1 | 11/2018 | Puria |
| 2018/0376255 A1 | 12/2018 | Parker |
| 2019/0166438 A1 | 5/2019 | Perkins et al. |
| 2019/0253811 A1 | 8/2019 | Unno et al. |
| 2019/0253815 A1 | 8/2019 | Atamaniuk et al. |
| 2020/0037082 A1 | 1/2020 | Perkins et al. |
| 2020/0128338 A1 | 4/2020 | Shaquer et al. |
| 2020/0186942 A1 | 6/2020 | Flaherty et al. |
| 2020/0336843 A1 | 10/2020 | Lee et al. |
| 2021/0029451 A1 | 1/2021 | Fitz et al. |
| 2021/0186343 A1 | 6/2021 | Perkins et al. |
| 2021/0266686 A1 | 8/2021 | Puria et al. |
| 2021/0306777 A1 | 9/2021 | Rucker et al. |
| 2021/0314712 A1 | 10/2021 | Shaquer et al. |
| 2021/0392449 A1 | 12/2021 | Flaherty et al. |
| 2021/0400405 A1 | 12/2021 | Perkins et al. |
| 2022/0007114 A1 | 1/2022 | Perkins et al. |
| 2022/0007115 A1 | 1/2022 | Perkins et al. |
| 2022/0007120 A1 | 1/2022 | Olsen et al. |
| 2022/0046366 A1 | 2/2022 | Larkin et al. |
| 2022/0086572 A1 | 3/2022 | Flaherty et al. |
| 2022/0150650 A1 | 5/2022 | Rucker |
| 2022/0369052 A1 | 11/2022 | Sandhu et al. |

FOREIGN PATENT DOCUMENTS

| | | |
|---|---|---|
| CN | 1176731 A | 3/1998 |
| CN | 101459868 A | 6/2009 |
| CN | 101489171 A | 7/2009 |
| CN | 102301747 A | 12/2011 |
| CN | 105491496 A | 4/2016 |
| DE | 2044870 A1 | 3/1972 |
| DE | 3243850 A1 | 5/1984 |
| DE | 3508830 A1 | 9/1986 |
| DE | 102013114771 A1 | 6/2015 |
| EP | 0092822 A2 | 11/1983 |
| EP | 0242038 A2 | 10/1987 |
| EP | 0291325 A2 | 11/1988 |
| EP | 0296092 A2 | 12/1988 |
| EP | 0242038 A3 | 5/1989 |
| EP | 0296092 A3 | 8/1989 |
| EP | 0352954 A2 | 1/1990 |
| EP | 0291325 A3 | 6/1990 |
| EP | 0352954 A3 | 8/1991 |
| EP | 1035753 A1 | 9/2000 |
| EP | 1435757 A1 | 7/2004 |
| EP | 1845919 A1 | 10/2007 |
| EP | 1955407 A1 | 8/2008 |
| EP | 1845919 B1 | 9/2010 |
| EP | 2272520 A1 | 1/2011 |
| EP | 2301262 A1 | 3/2011 |
| EP | 2752030 A1 | 7/2014 |
| EP | 3101519 A1 | 12/2016 |
| EP | 2425502 B1 | 1/2017 |
| EP | 2907294 B1 | 5/2017 |
| EP | 3183814 A1 | 6/2017 |
| EP | 3094067 B1 | 10/2017 |
| EP | 3006079 B1 | 3/2019 |
| FR | 2455820 A1 | 11/1980 |
| GB | 2085694 A | 4/1982 |
| JP | S60154800 A | 8/1985 |
| JP | S621726 B2 | 1/1987 |
| JP | S6443252 A | 2/1989 |
| JP | H09327098 A | 12/1997 |
| JP | 2000504913 A | 4/2000 |
| JP | 2004187953 A | 7/2004 |
| JP | 2004193908 A | 7/2004 |
| JP | 2005516505 A | 6/2005 |
| JP | 2006060833 A | 3/2006 |
| KR | 100624445 B1 | 9/2006 |
| WO | WO-9209181 A1 | 5/1992 |
| WO | WO-9501678 A1 | 1/1995 |
| WO | WO-9621334 A1 | 7/1996 |
| WO | WO-9736457 A1 | 10/1997 |
| WO | WO-9745074 A1 | 12/1997 |
| WO | WO-9806236 A1 | 2/1998 |
| WO | WO-9903146 A1 | 1/1999 |
| WO | WO-9915111 A1 | 4/1999 |
| WO | WO-0022875 A2 | 4/2000 |
| WO | WO-0022875 A3 | 7/2000 |
| WO | WO-0150815 A1 | 7/2001 |
| WO | WO-0158206 A2 | 8/2001 |
| WO | WO-0176059 A2 | 10/2001 |
| WO | WO-0158206 A3 | 2/2002 |
| WO | WO-0239874 A2 | 5/2002 |
| WO | WO-0239874 A3 | 2/2003 |
| WO | WO-03030772 A2 | 4/2003 |
| WO | WO-03063542 A2 | 7/2003 |
| WO | WO-03063542 A3 | 1/2004 |
| WO | WO-2004010733 A1 | 1/2004 |
| WO | WO-2005015952 A1 | 2/2005 |
| WO | WO-2005107320 A1 | 11/2005 |
| WO | WO-2006014915 A2 | 2/2006 |
| WO | WO-2006037156 A1 | 4/2006 |

(56) References Cited

FOREIGN PATENT DOCUMENTS

| WO | WO-2006039146 A2 | 4/2006 |
|---|---|---|
| WO | WO-2006042298 A2 | 4/2006 |
| WO | WO-2006071210 A1 | 7/2006 |
| WO | WO-2006075169 A1 | 7/2006 |
| WO | WO-2006075175 A1 | 7/2006 |
| WO | WO-2006118819 A2 | 11/2006 |
| WO | WO-2006042298 A3 | 12/2006 |
| WO | WO-2007023164 A1 | 3/2007 |
| WO | WO-2009046329 A1 | 4/2009 |
| WO | WO-2009047370 A2 | 4/2009 |
| WO | WO-2009049320 A1 | 4/2009 |
| WO | WO-2009056167 A1 | 5/2009 |
| WO | WO-2009062142 A1 | 5/2009 |
| WO | WO-2009047370 A3 | 7/2009 |
| WO | WO-2009125903 A1 | 10/2009 |
| WO | WO-2009145842 A2 | 12/2009 |
| WO | WO-2009146151 A2 | 12/2009 |
| WO | WO-2009155358 A1 | 12/2009 |
| WO | WO-2009155361 A1 | 12/2009 |
| WO | WO-2009155385 A1 | 12/2009 |
| WO | WO-2010033932 A1 | 3/2010 |
| WO | WO-2010033933 A1 | 3/2010 |
| WO | WO-2010077781 A2 | 7/2010 |
| WO | WO-2010147935 A1 | 12/2010 |
| WO | WO-2010148345 A2 | 12/2010 |
| WO | WO-2011005500 A2 | 1/2011 |
| WO | WO-2012088187 A2 | 6/2012 |
| WO | WO-2012149970 A1 | 11/2012 |
| WO | WO-2013016336 A2 | 1/2013 |
| WO | WO-2016011044 A1 | 1/2016 |
| WO | WO-2016045709 A1 | 3/2016 |
| WO | WO-2016146487 A1 | 9/2016 |
| WO | WO-2017045700 A1 | 3/2017 |
| WO | WO-2017059218 A1 | 4/2017 |
| WO | WO-2017059240 A1 | 4/2017 |
| WO | WO-2017116791 A1 | 7/2017 |
| WO | WO-2017116865 A1 | 7/2017 |
| WO | WO-2018048794 A1 | 3/2018 |
| WO | WO-2018081121 A1 | 5/2018 |
| WO | WO-2018093733 A1 | 5/2018 |
| WO | WO-2019055308 A1 | 3/2019 |
| WO | WO-2019173470 A1 | 9/2019 |
| WO | WO-2019199680 A1 | 10/2019 |
| WO | WO-2019199683 A1 | 10/2019 |
| WO | WO-2020176086 A1 | 9/2020 |
| WO | WO-2021003087 A1 | 1/2021 |

OTHER PUBLICATIONS

ATASOY [Paper] Opto-acoustic Imaging. for BYM504E Biomedical Imaging Systems class at ITU, downloaded from the Internet www2.itu.edu.td-cilesiz/courses/BYM504-2005-OA504041413.pdf, 14 pages.

Athanassiou, et al. Laser controlled photomechanical actuation of photochromic polymers Microsystems. Rev. Adv. Mater. Sci. 2003; 5:245-251.

Autumn, et al. Dynamics of geckos running vertically, The Journal of Experimental Biology 209, 260-272, (2006).

Autumn, et al., Evidence for van der Waals adhesion in gecko setae, www.pnas.orgycgiydoiy10.1073ypnas.192252799 (2002).

Ayatollahi, et al. Design and Modeling of Micromachined Condenser MEMS Loudspeaker using Permanent Magnet Neodymium-Iron-Boron (Nd—Fe—B). IEEE International Conference on Semiconductor Electronics, 2006. ICSE '06, Oct. 29, 2006-Dec. 1, 2006; 160-166.

Baer, et al. Effects of Low Pass Filtering on the Intelligibility of Speech in Noise for People With and Without Dead Regions at High Frequencies. J. Acost. Soc. Am 112 (3), pt. 1, (Sep. 2002), pp. 1133-1144.

Best, et al. The influence of high frequencies on speech localization. Abstract 981 (Feb. 24, 2003) from www.aro.org/abstracts/abstracts.html.

Birch, et al. Microengineered systems for the hearing impaired. IEE Colloquium on Medical Applications of Microengineering, Jan. 31, 1996; pp. 2/1-2/5.

Boedts. Tympanic epithelial migration, Clinical Otolaryngology 1978, 3, 249-253.

Burkhard, et al. Anthropometric Manikin for Acoustic Research. J. Acoust. Soc. Am., vol. 58, No. 1, (Jul. 1975), pp. 214-222.

Camacho-Lopez, et al. Fast Liquid Crystal Elastomer Swims Into the Dark, Electronic Liquid Crystal Communications. Nov. 26, 2003; 9 pages total.

Carlile, et al. Frequency bandwidth and multi-talker environments. Audio Engineering Society Convention 120. Audio Engineering Society, May 20-23, 2006. Paris, France. 118: 8 pages.

Carlile, et al. Spatialisation of talkers and the segregation of concurrent speech. Abstract 1264 (Feb. 24, 2004) from www.aro.org/abstracts/abstracts.html.

Cheng, et al. A Silicon Microspeaker for Hearing Instruments. Journal of Micromechanics and Microengineering 2004; 14(7):859-866.

Co-pending U.S. Appl. No. 17/356,217, inventors Imatani; Kyle et al., filed on Jun. 23, 2021.

Dictionary.corn's (via American Heritage Medical Dictionary) online dictionary definition of 'percutaneous'. Accessed on Jun. 3, 2013. 2 pages.

Merriam-Webster's online dictionary definition of 'percutaneous'. Accessed on Jun. 3, 2013. 3 pages.

Datskos, et al. Photoinduced and thermal stress in silicon microcantilevers. Applied Physics Letters. Oct. 19, 1998; 73(16):2319-2321.

Decraemer, et al. A method for determining three-dimensional vibration in the ear. Hearing Res., 77:19-37 (1994).

Dundas et al. The Earlens Light-Driven Hearing Aid: Top 10 questions and answers. Hearing Review. 2018;25(2):36-39.

EAR. Downloaded from the Internet. Accessed Jun. 17, 2008. 4 pages. URL: http://wwwmgs.bionet.nsc.ru/mgs/gnw/trrd/thesaurus/Se/ear.html.

Edinger, J.R. High-Quality Audio Amplifier With Automatic Bias Control. Audio Engineering; Jun. 1947; pp. 7-9.

European search report and opinion dated May 4, 2018 for EP Application No. 15821719.0.

Fay. Cat eardrum mechanics. Ph.D. thesis. Dissertation submitted to Department of Aeronautics and Astronautics. Stanford University. May 2001; 210 pages total.

Fay, et al. Cat eardrum response mechanics. Mechanics and Computation Division. Department of Mechanical Engineering. Stanford University. 2002; 10 pages total.

Fay, et al. Preliminary evaluation of a light-based contact hearing device for the hearing impaired. Otol Neurotol. Jul. 2013;34(5):912-21. doi: 10.1097/MAO.0b013e31827de4b1.

Fay, et al. The discordant eardrum, PNAS, Dec. 26, 2006, vol. 103, No. 52, p. 19743-19748.

Fletcher. Effects of Distortion on the Individual Speech Sounds. Chapter 18, ASA Edition of Speech and Hearing in Communication, Acoust Soc.of Am. (republished in 1995) pp. 415-423.

Folkeard, et al. Detection, Speech Recognition, Loudness, and Preference Outcomes With a Direct Drive Hearing Aid: Effects of Bandwidth. Trends Hear. Jan.-Dec. 2021; 25: 1-17. doi: 10.1177/2331216521999139.

Freyman, et al. Spatial Release from Informational Masking in Speech Recognition. J. Acost. Soc. Am., vol. 109, No. 5, pt. 1, (May 2001); 2112-2122.

Freyman, et al. The Role of Perceived Spatial Separation in the Unmasking of Speech. J. Acoust. Soc. Am., vol. 106, No. 6, (Dec. 1999); 3578-3588.

Fritsch, et al. EarLens transducer behavior in high-field strength MRI scanners. Otolaryngol Head Neck Surg. Mar. 2009;140(3):426-8. doi: 10.1016/j.otohns.2008.10.016.

Galbraith et al. A wide-band efficient inductive transdermal power and data link with coupling insensitive gain IEEE Trans Biomed Eng. Apr. 1987;34(4):265-75.

Gantz, et al. Broad Spectrum Amplification with a Light Driven Hearing System. Combined Otolaryngology Spring Meetings, 2016 (Chicago).

(56) References Cited

OTHER PUBLICATIONS

Gantz, et al. Light Driven Hearing System: A Multi-Center Clinical Study. Association for Research in Otolaryngology Annual Meeting, 2016 (San Diego).
Gantz, et al. Light-Driven Contact Hearing Aid for Broad Spectrum Amplification: Safety and Effectiveness Pivotal Study. Otology & Neurotology Journal, 2016 (in review).
Gantz, et al. Light-Driven Contact Hearing Aid for Broad-Spectrum Amplification: Safety and Effectiveness Pivotal Study. Otology & Neurotology. Copyright 2016. 7 pages.
Ge, et al., Carbon nanotube-based synthetic gecko tapes, p. 10792-10795, PNAS, Jun. 26, 2007, vol. 104, No. 26.
Gennum. GA3280 Preliminary Data Sheet: Voyageur TD Open Platform DSP System for Ultra Low Power Audio Processing. Oct. 2006; 17 pages. Downloaded from the Internet: www.sounddesigntechnologies.com/products/pdf/37601DOC.pdf.
Gobin, et al. Comments on the physical basis of the active materials concept. Proc. SPIE 2003; 4512:84-92.
Gorb, et al. Structural Design and Biomechanics of Friction-Based Releasable Attachment Devices in Insects. Integr Comp Biol. Dec. 2002. 42(6):1127-1139. doi: 10.1093/icb/42.6.1127.
Hakansson, et al. Percutaneous vs. transcutaneous transducers for hearing by direct bone conduction (Abstract). Otolaryngol Head Neck Surg. Apr. 1990;102(4):339-44.
Hato, et al. Three-dimensional stapes footplate motion in human temporal bones. Audiol. Neurootol., 8:140-152 (Jan. 30, 2003).
Hofman, et al. Relearning Sound Localization With New Ears. Nature Neuroscience, vol. 1, No. 5, (Sep. 1998); 417-421.
"International search report and written opinion dated Oct. 15, 2015 for PCT/US2015/040397."
Izzo, et al. Laser Stimulation of Auditory Neurons: Effect of Shorter Pulse Duration and Penetration Depth. Biophys J. Apr. 15, 2008;94(8):3159-3166.
Izzo, et al. Laser Stimulation of the Auditory Nerve. Lasers Surg Med. Sep. 2006;38(8):745-753.
Izzo, et al. Selectivity of Neural Stimulation in the Auditory System: A Comparison of Optic and Electric Stimuli. J Biomed Opt. Mar.-Apr. 2007;12(2):021008.
Jackson, et al. Multiphoton and Transmission Electron Microscopy of Collagen in Ex Vivo Tympanic Membranes. Ninth Annual Symposium on Biomedical Computation at Stanford (BCATS). BCATS 2008 Abstract Book. Poster 18:56. Oct. 2008. URL: www.stanford.edu/~purial/BCATS08.html.
Jian, et al. A 0.6 V, 1.66 mW energy harvester and audio driver for tympanic membrane transducer with wirelessly optical signal and power transfer. InCircuits and Systems (ISCAS), 2014 IEEE International Symposium on Jun. 1, 2014. 874-7. IEEE.
Jin, et al. Speech Localization. J. Audio Eng. Soc. convention paper, presented at the AES 112th Convention, Munich, Germany, May 10-13, 2002, 13 pages total.
Khaleghi, et al. Attenuating the ear canal feedback pressure of a laser-driven hearing aid. J Acoust Soc Am. Mar. 2017;141(3):1683.
Khaleghi, et al. Attenuating the feedback pressure of a light-activated hearing device to allows microphone placement at the ear canal entrance. IHCON 2016, International Hearing Aid Research Conference, Tahoe City, CA, Aug. 2016.
Khaleghi, et al. Characterization of Ear-Canal Feedback Pressure due to Umbo-Drive Forces: Finite-Element vs. Circuit Models. ARO Midwinter Meeting 2016, (San Diego).
Khaleghi, et al. Mechano-Electro-Magnetic Finite Element Model of a Balanced Armature Transducer for a Contact Hearing Aid. Proc. MoH 2017, Mechanics of Hearing workshop, Brock University, Jun. 2017.
Khaleghi, et al. Multiphysics Finite Element Model of a Balanced Armature Transducer used in a Contact Hearing Device. ARO 2017, 40th ARO MidWinter Meeting, Baltimore, MD, Feb. 2017.
Kiessling, et al. Occlusion Effect of Earmolds with Different Venting Systems. J Am Acad Audiol. Apr. 2005;16(4):237-49.
Killion, et al. The case of the missing dots: AI and SNR loss. The Hearing Journal, 1998. 51(5), 32-47.
Killion. Myths About Hearing in Noise and Directional Microphones. The Hearing Review. Feb. 2004; 11(2):14, 16, 18, 19, 72 & 73.
Killion. SNR loss: I can hear what people say but I can't understand them. The Hearing Review, 1997; 4(12):8-14.
Knight, D. Diode detectors for RF measurement. Paper. Jan. 1, 2016. [Retrieved from 1-16 online] (retrieved Feb. 11, 2020) abstract, p. 1; section 1, p. 6; section 1.3, p. 9; section 3 voltage-double rectifier, p. 21; section 5, p. 27. URL: g3ynh.info/circuits/Diode_det.pdf.
Lee, et al. A Novel Opto-Electromagnetic Actuator Coupled to the tympanic Membrane. J Biomech. Dec. 5, 2008;41(16):3515-8. Epub Nov. 7, 2008.
Lee, et al. The optimal magnetic force for a novel actuator coupled to the tympanic membrane: a finite element analysis. Biomedical engineering: applications, basis and communications. 2007; 19(3):171-177.
Levy, et al. Characterization of the available feedback gain margin at two device microphone locations, in the fossa triangularis and Behind the Ear, for the light-based contact hearing device. Acoustical Society of America (ASA) meeting, 2013 (San Francisco).
Levy, et al. Extended High-Frequency Bandwidth Improves Speech Reception in the Presence of Spatially Separated Masking Speech. Ear Hear. Sep.-Oct. 2015;36(5):e214-24. doi: 10.1097/AUD.0000000000000161.
Levy et al. Light-driven contact hearing aid: a removable direct-drive hearing device option for mild to severe sensorineural hearing impairment. Conference on Implantable Auditory Prostheses, Tahoe City, CA, Jul. 2017. 4 pages.
Lezal. Chalcogenide glasses—survey and progress. Journal of Optoelectronics and Advanced Materials. Mar. 2003; 5(1):23-34.
Mah. Fundamentals of photovoltaic materials. National Solar Power Research Institute. Dec. 21, 1998, 3-9.
Makino, et al. Epithelial migration in the healing process of tympanic membrane perforations. Eur Arch Otorhinolaryngol. 1990; 247: 352-355.
Makino, et al., Epithelial migration on the tympanic membrane and external canal, Arch Otorhinolaryngol (1986) 243:39-42.
Markoff. Intuition + Money: An Aha Moment. New York Times Oct. 11, 2008, page BU4, 3 pages total.
Martin, et al. Utility of Monaural Spectral Cues is Enhanced in the Presence of Cues to Sound-Source Lateral Angle. JARO. 2004; 5:80-89.
McElveen et al. Overcoming High-Frequency Limitations of Air Conduction Hearing Devices Using a LIGHT-DRIVEN Contact Hearing Aid. Poster presentation at The Triological Society, 120th Annual Meeting at COSM, Apr. 28, 2017; San Diego, CA.
Michaels, et al., Auditory epithelial migration on the human tympanic membrane: II. The existence of two discrete migratory pathways and their embryologic correlates. Am J Anat. Nov. 1990. 189(3):189-200. DOI: 10.1002/aja.1001890302.
Moore, et al. Perceived naturalness of spectrally distorted speech and music. J Acoust Soc Am. Jul. 2003;114(1):408-19.
Moore, et al. Spectro-temporal characteristics of speech at high frequencies, and the potential for restoration of audibility to people with mild-to-moderate hearing loss. Ear Hear. Dec. 2008;29(6):907-22. doi: 10.1097/AUD.0b013e31818246f6.
Moore. Loudness perception and intensity resolution. Cochlear Hearing Loss, Chapter 4, pp. 90-115, Whurr Publishers Ltd., London (1998).
Murphy, et al. Adhesion and anisotropic friction enhancements of angled heterogeneous micro-fiber arrays with spherical and spatula tips. Journal of Adhesion Science and Technology. vol. 21. No. 12-13. Aug. 2007. pp. 1281-1296. DOI: 10.1163/156856107782328380.
Murugasu, et al. Malleus-to-footplate versus malleus-to-stapes-head ossicular reconstruction prostheses: temporal bone pressure gain measurements and clinical audiological data. Otol Neurotol. Jul. 2005;26(4):572-82. DOI: 10.1097/01.mao.0000178151.44505.1b.
Musicant, et al. Direction-dependent spectral properties of cat external ear: new data and cross-species comparisons. J Acoust Soc Am. Feb. 1990. 87(2):757-781. DOI: 10.1121/1.399545.

(56) References Cited

OTHER PUBLICATIONS

National Semiconductor. LM4673 Boomer: Filterless, 2.65W, Mono, Class D Audio Power Amplifier. Nov. 1, 2007. 24 pages. [Data Sheet] downloaded from the Internet: URL: www.national.com/ds/LM/LM4673.pdf.
Nishihara, et al. Effect of changes in mass on middle ear function. Otolaryngol Head Neck Surg. Nov. 1993;109(5):889-910.
Notice of Allowance dated Jul. 19, 2019 for U.S. Appl. No. 15/890,185.
Notice of Allowance dated Aug. 29, 2019 for U.S. Appl. No. 15/890,185.
Notice of Allowance dated Sep. 29, 2017 for U.S. Appl. No. 14/813,301.
Notice of Allowance dated Nov. 7, 2017 for U.S. Appl. No. 14/813,301.
Notice of Allowance dated May 14, 2019 for U.S. Appl. No. 15/890,185.
O'Connor, et al. Middle ear Cavity and Ear Canal Pressure-Driven Stapes Velocity Responses in Human Cadaveric Temporal Bones. J Acoust Soc Am. Sep. 2006;120(3):1517-28.
Office Action dated Aug. 29, 2018 for U.S. Appl. No. 15/890,185.
Office Action dated Sep. 29, 2016 for U.S. Appl. No. 14/813,301.
Park, et al. Design and analysis of a microelectromagnetic vibration transducer used as an implantable middle ear hearing aid. J. Micromech. Microeng. vol. 12 (2002), pp. 505-511.
Perkins, et al. Light-based Contact Hearing Device: Characterization of available Feedback Gain Margin at two device microphone locations. Presented at AAO-HNSF Annual Meeting, 2013 (Vancouver).
Perkins, et al. The EarLens Photonic Transducer: Extended bandwidth. Presented at AAO-HNSF Annual Meeting, 2011 (San Francisco).
Perkins, et al. The EarLens System: New Sound Transduction Methods. Hear Res. May 2010; 263(1-2): 104-113. Published online Jan. 29, 2010. doi: 10.1016/j.heares.2010.01.012.
Perkins, R. Earlens tympanic contact transducer: a new method of sound transduction to the human ear. Otolaryngol Head Neck Surg. Jun. 1996;114(6):720-8.
Poosanaas, et al. Influence of sample thickness on the performance of photostrictive ceramics, J. App. Phys. Aug. 1, 1998; 84(3):1508-1512.
Puria et al. A gear in the middle ear. ARO Denver CO, 2007b.
Puria, et al. Cues above 4 kilohertz can improve spatially separated speech recognition. The Journal of the Acoustical Society of America, 2011, 129, 2384.
Puria, et al. Extending bandwidth above 4 kHz improves speech understanding in the presence of masking speech. Association for Research in Otolaryngology Annual Meeting, 2012 (San Diego).
Puria, et al. Extending bandwidth provides the brain what it needs to improve hearing in noise. First international conference on cognitive hearing science for communication, 2011 (Linkoping, Sweden).
Puria, et al. Hearing Restoration: Improved Multi-talker Speech Understanding. 5th International Symposium on Middle Ear Mechanics in Research and Otology (MEMRO), Jun. 2009 (Stanford University).
Puria, et al. Imaging, Physiology and Biomechanics of the middle ear: Towards understating the functional consequences of anatomy. Stanford Mechanics and Computation Symposium, 2005, ed Fong J.
Puria, et al. Malleus-to-footplate ossicular reconstruction prosthesis positioning: cochleovestibular pressure optimization. Otol Nerotol. May 2005; 26(3):368-379. DOI: 10.1097/01 .mao.0000169788. 07460.4a.
Puria, et al. Measurements and model of the cat middle ear: Evidence of tympanic membrane acoustic delay. J. Acoust. Soc. Am., 104(6):3463-3481 (Dec. 1998).
Puria, et al., Mechano-Acoustical Transformations in A. Basbaum et al., eds., The Senses: A Comprehensive Reference, v3, p. 165-201, Academic Press (2008).
Puria, et al. Middle Ear Morphometry From Cadaveric Temporal Bone MicroCT Imaging. Proceedings of the 4th International Symposium, Zurich, Switzerland, Jul. 27-30, 2006, Middle Ear Mechanics In Research and Otology, pp. 260-269.
Puria, et al. Sound-Pressure Measurements in the Cochlear Vestibule of Human-Cadaver Ears. Journal of the Acoustical Society of America. 1997; 101 (5-1): 2754-2770.
Puria, et al. Temporal-Bone Measurements of the Maximum Equivalent Pressure Output and Maximum Stable Gain of a Light-Driven Hearing System That Mechanically Stimulates the Umbo. Otol Neurotol. Feb. 2016;37(2):160-6. doi: 10.1097/MAO. 0000000000000941.
Puria, et al. The EarLens Photonic Hearing Aid. Association for Research in Otolaryngology Annual Meeting, 2012 (San Diego).
Puria, et al. The Effects of bandwidth and microphone location on understanding of masked speech by normal-hearing and hearing-impaired listeners. International Conference for Hearing Aid Research (IHCON) meeting, 2012 (Tahoe City).
Puria, et al. Tympanic-membrane and malleus-incus-complex co-adaptations for high-frequency hearing in mammals. Hear Res. May 2010;263(1-2):183-90. doi: 10.1016/j.heares.2009.10.013. Epub Oct. 28, 2009.
Puria. Measurements of human middle ear forward and reverse acoustics: implications for otoacoustic emissions. J Acoust Soc Am. May 2003;113(5):2773-89.
Puria, S. Middle Ear Hearing Devices. Chapter 10. Part of the series Springer Handbook of Auditory Research pp. 273-308. Date: Feb. 9, 2013.
Qu, et al. Carbon nanotube arrays with strong shear binding-on and easy normal lifting-off. Science. Oct. 10, 2008. 322(5899):238-342. doi: 10.1126/science.1159503.
Robles, et al. Mechanics of the mammalian cochlea. Physiol Rev. Jul. 2001;81(3):1305-52.
Roush. SiOnyx Brings "Black Silicon" into the Light; Material Could Upend Solar, Imaging Industries. Xconomy, Oct. 12, 2008, retrieved from the Internet: www.xconomy.com/boston/2008/10/12/sionyx-brings-black-silicon-into-the-light-material-could-upend-solar-imaging-industries 4 pages total.
Rubinstein. How cochlear implants encode speech. Curr Opin Otolaryngol Head Neck Surg. Oct. 2004. 12(5):444-448. DOI: 10.1097/01.moo.0000134452.24819.c0.
School of Physics Sydney, Australia. Acoustic Compliance, Inertance and Impedance. 1-6. (2018). http://www.animations.physics.unsw.edu.au/jw/compliance-inertance-impedance.htm.
Sekaric, et al. Nanomechanical resonant structures as tunable passive modulators. Applied Physics Letters. May 2002. 80(19):3617-3619. DOI: 10.1063/1.1479209.
Shaw. Transformation of Sound Pressure Level From the Free Field to the Eardrum in the Horizontal Plane. J. Acoust. Soc. Am., vol. 56, No. 6, (Dec. 1974), 1848-1861.
Shih, et al. Shape and displacement control of beams with various boundary conditions via photostrictive optical actuators. Proc. IMECE. Nov. 2003; 1-10.
Smith. The Scientist and Engineers Guide to Digital Signal Processing. California Technical Publishing. 1997. Chapter 22. pp. 351-372.
Song, et al. The development of a non-surgical direct drive hearing device with a wireless actuator coupled to the tympanic membrane. Applied Acoustics. Dec. 31, 2013;74(12):1511-8.
Sound Design Technologies. Voyager TD Open Platform DSP System for Ultra Low Power Audio Processing—GA3280 Data Sheet. Oct. 2007. 15 pages. Retrieved from the Internet: www.sounddes.com/pdf/37601DOC.pdf.
Spolenak, et al. Effects of contact shape on the scaling of biological attachments. Proc. R. Soc. A. 2005; 461:305-319.
Stenfelt, et al. Bone-Conducted Sound: Physiological and Clinical Aspects. Otology & Neurotology, Nov. 2005; 26 (6):1245-1261.
Struck, et al. Comparison of Real-world Bandwidth in Hearing Aids vs Earlens Light-driven Hearing Aid System. The Hearing Review. TechTopic: EarLens. Hearingreview.com. Mar. 14, 2017. pp. 24-28.
Stuchlik, et al. Micro-Nano Actuators Driven by Polarized Light. IEEE Proc. Sci. Meas. Techn. Mar. 2004; 151(2):131-136.

(56) References Cited

OTHER PUBLICATIONS

Suski, et al. Optically activated ZnO/SiO2/Si cantilever beams. Sensors and Actuators A: Physical. Sep. 1990. 24(3): 221-225. https://doi.org/10.1016/0924-4247(90)80062-A.
Takagi, et al. Mechanochemical Synthesis of Piezoelectric PLZT Powder. KONA. 2003; 51(21):234-241.
Thakoor, et al. Optical microactuation in piezoceramics. Proc. SPIE. Jul. 1998; 3328:376-391.
Thompson. Tutorial on microphone technologies for directional hearing aids. Hearing Journal. Nov. 2003; 56(11):14-16,18, 20-21.
Tzou, et al. Smart Materials, Precision Sensors/Actuators, Smart Structures, and Structronic Systems. Mechanics of Advanced Materials and Structures. 2004; 11:367-393.
Uchino, et al. Photostricitve actuators. Ferroelectrics. 2001; 258:147-158.
Vickers, et al. Effects of Low-Pass Filtering on the Intelligibility of Speech in Quiet for People With and Without Dead Regions at High Frequencies. J. Acoust. Soc. Am. Aug. 2001; 110(2):1164-1175.
Vinge. Wireless Energy Transfer by Resonant Inductive Coupling. Master of Science Thesis. Chalmers University of Technology. 1-83 (2015).
Vinikman-Pinhasi, et al. Piezoelectric and Piezooptic Effects in Porous Silicon. Applied Physics Letters, Mar. 2006; 88(11): 111905-1-111905-2. DOI: 10.1063/1.2186395.
Wang, et al. Preliminary Assessment of Remote Photoelectric Excitation of an Actuator for a Hearing Implant. Proceeding of the 2005 IEEE, Engineering in Medicine and Biology 27th Annual Conference, Shanghai, China. Sep. 1-4, 2005; 6233-6234.
Web Books Publishing, "The Ear," accessed online Jan. 22, 2013, available online Nov. 2, 2007 at http://www.web-books.com/eLibrary/Medicine/Physiology/Ear/Ear.htm.
Wiener, et al. On the Sound Pressure Transformation by the Head and Auditory Meatus of the Cat. Acta Otolaryngol. Mar. 1966; 61(3):255-269.
Wightman, et al. Monaural Sound Localization Revisited. J Acoust Soc Am. Feb. 1997;101(2):1050-1063.
Wiki. Sliding Bias Variant 1, Dynamic Hearing (2015).
Wikipedia. Headphones. Downloaded from the Internet. Accessed Oct. 27, 2008. 7 pages. URL: http://en.wikipedia.org/wiki/Headphones.
Wikipedia. Inductive Coupling. 1-2 (Jan. 11, 2018). https://en.wikipedia.org/wiki/Inductive_coupling.
Wikipedia. Pulse-density Coupling. 1-4 (Apr. 6, 2017). https://en.wikipedia.org/wiki/Pulse-density_modulation.
Wikipedia. Resonant Inductive Coupling. 1-11 (Jan. 12, 2018). https://en.wikipedia.org/wiki/Resonant_inductive_coupling#cite_note-13.
Yao, et al. Adhesion and sliding response of a biologically inspired fibrillar surface: experimental observations, J. R. Soc. Interface (2008) 5, 723-733 doi:10.1098/rsif.2007.1225 Published online Oct. 30, 2007.
Yao, et al. Maximum strength for intermolecular adhesion of nanospheres at an optimal size. J R Soc Interface. Nov. 6, 2008;5(28):1363-70. doi: 10.1098/rsif.2008.0066.
Yi, et al. Piezoelectric Microspeaker with Compressive Nitride Diaphragm. The Fifteenth IEEE International Conference on Micro Electro Mechanical Systems, 2002; 260-263.
Yu, et al. Photomechanics: Directed bending of a polymer film by light. Nature. Sep. 11, 2003;425(6954):145. DOI: 10.1038/425145a.
Notice of Allowance dated Jan. 14, 2022 for U.S. Appl. No. 16/688,774.
Notice of Allowance dated Jul. 29, 2021 for U.S. Appl. No. 16/688,774.
Notice of Allowance dated Sep. 9, 2021 for U.S. Appl. No. 16/688,774.
Notice of Allowance dated Dec. 10, 2021 for U.S. Appl. No. 16/688,774.
Office action dated Jan. 22, 2021 for U.S. Appl. No. 16/688,774.

* cited by examiner

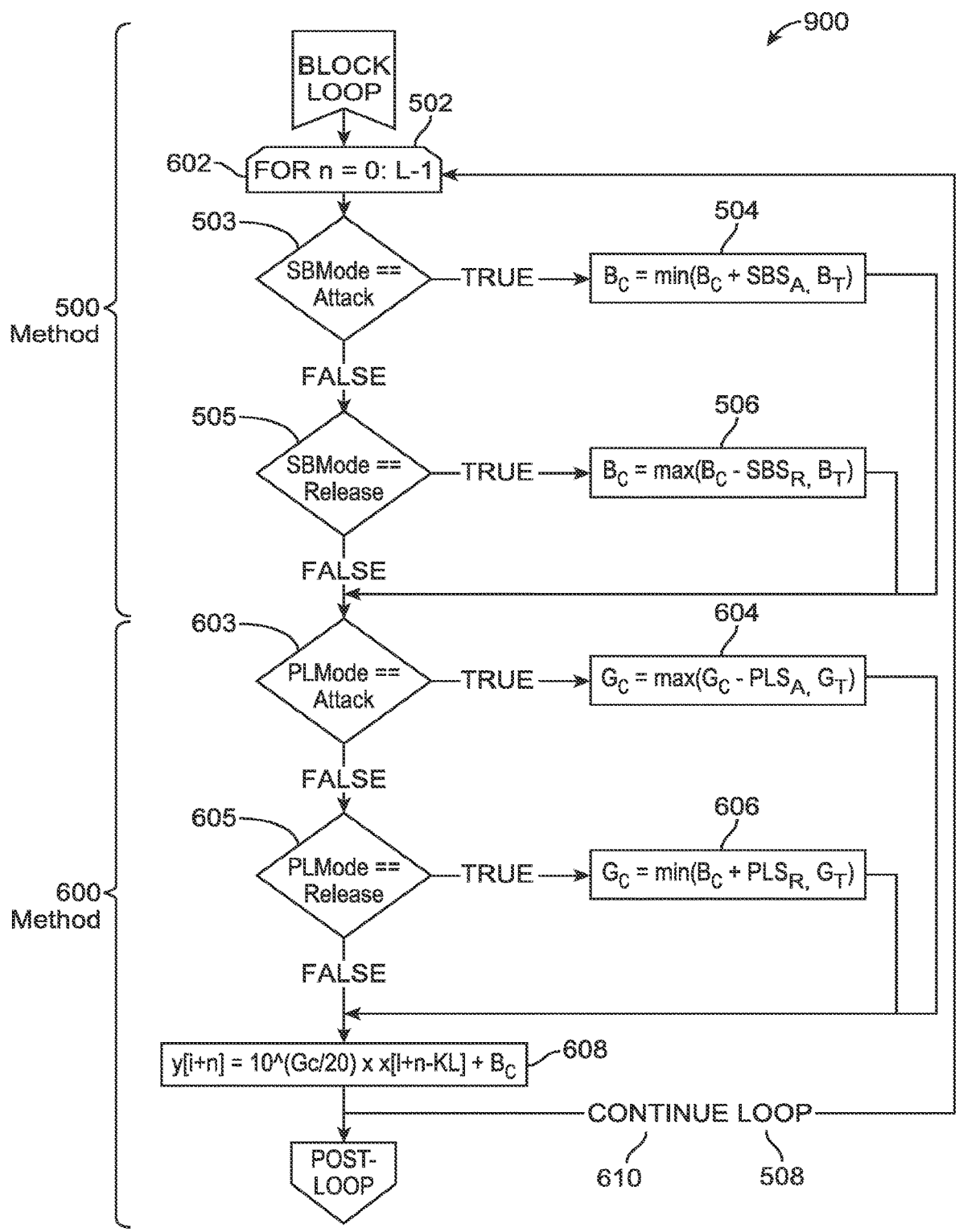
FIG. 7 (Cont. 1)

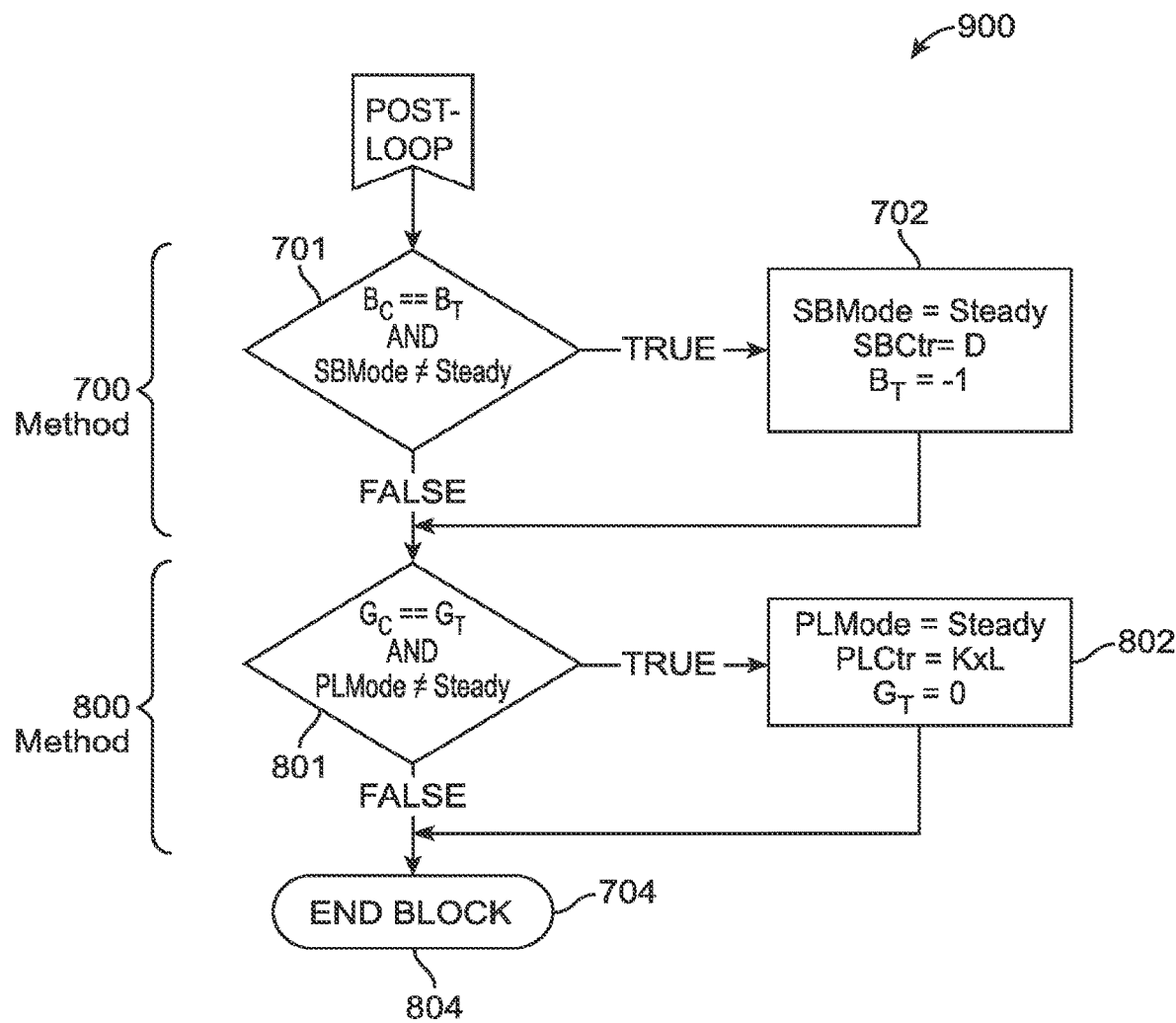
FIG. 7 (Cont. 2)

SLIDING BIAS AND PEAK LIMITING FOR OPTICAL HEARING DEVICES

CROSS-REFERENCE

The present patent application is a continuation of U.S. patent application Ser. No. 16/688,774, filed Nov. 19, 2019, now U.S. Patent Application No. 11,259,129; which is a continuation of U.S. Patent Application No. 15,890,185, filed Feb. 6, 2018, now U.S. Pat. No. 10,531,206; which is a continuation of U.S. patent application Ser. No. 14/813,301, filed Jul. 30, 2015, now U.S. Pat. No. 9,930,458; which is a continuation of PCT Application No. PCT/US15/40397, filed Jul. 14, 2015; which claims priority to U.S. Provisional Patent Application No. 62/024,275, filed Jul. 14, 2014; the entire disclosures of which are incorporated herein by reference.

BACKGROUND

The field of the present invention is related to optical hearing devices.

The prior methods and apparatus for providing sound to users can be less than ideal in at least some respects. People like to communicate, and hearing is an important aspect of communication for both communication devices and prosthetic devices such as hearing aids.

Contact hearing devices that contact tissue or bone have the advantage of providing sound with decreased feedback along the ear canal to the input microphone. However, the ear is composed of several small and delicate structures such as the tympanic membrane, ossicles and cochlea. Providing compact hearing devices that fit comfortably within the ear and contact moveable structures of the ear to provide high quality sound can be challenging. Transmitting power and signals to such small devices has also proven challenging.

Recently, it has been proposed to use light based hearing devices. Light based hearing devices have the advantage of potentially being small and providing high fidelity sound. However, realization of these potential advantages has proven challenging for several reasons. Sound is transmitted with positive and negative changes in air pressure. However, the light energy transmitted from a light source only results in the generation of positive light energy, with no corresponding negative light energy being available. Although light does oscillate with electrical and magnetic fields in the Terahertz frequency range, such frequencies are too fast for most detectors to capture the oscillating positive and negative field components of light. Consequently prior methods and apparatus used to drive electrical signals associated with positive and negative sound pressure may not be well suited for use with light based systems. Also, optical components can introduce distortions to optical signals, such as nonlinear behavior of the light source and detector, which can present additional challenges.

At least some of the prior electronic circuitry solutions are less than ideally suited for the transmission of light based optical signals. For example, the use of prior delta-sigma modulation with optical signals can result in more power consumption than would be ideal. Similarly, prior analog approaches to transmitting electrical signals can result in increased power consumption when used with optical systems. As hearing devices can be worn for extended amounts of time, excessive power consumption may result in less than ideal performance of the hearing device in at least some instances.

In light of the above, it would be helpful to provide improved methods and apparatus for optical hearing. Ideally such optical devices would provide decreased power consumption, low amounts of distortion, be compact, and transmit the optical signal and energy to power the transducer with decreased amounts of distortion.

SUMMARY

Embodiments of the present invention provide improved transmission of optical signals with decreased amounts of light energy and distortion. In many embodiments, circuitry is configured to bias an input signal in order to generate an optical signal with decreased power consumption and distortion. The biased input signal reduces the amount of light energy transmitted for low energy input sound, and increases the amount of light energy transmitted for higher amounts of input sound energy. The bias can be adjusted slowly in order to inhibit audible sounds from being perceived by the user when the bias is adjusted. The slowly changing bias can be combined with rapidly decreased gain in response to peaks of the signal in order to inhibit peak clipping, and the gain can be rapidly increased to restore the gain. In many embodiments, the gain both decreases and increases quickly while the bias remains substantially fixed to inhibit clipping. In many embodiments, the bias shifts the input signal in a direction corresponding to negative sound pressure in response to low amounts of negative sound pressure. A processor can be configured with a look ahead delay in order to adjust the gain in response to the signal traversing a threshold detected with the look ahead delay, such that the gain can be dynamically increased and decreased in real time in response to the detected peak in order to decrease distortion.

The biased input signal can be used with many types of circuitry, and the circuitry configured to generate the optical signal in response to the biased input signal may comprise delta sigma modulation circuitry or analog amplifier circuitry, and combinations thereof. In many embodiments, a processor is configured with instructions to adjust the bias of the input sound signal in order to decrease a duty cycle of the output optical signal.

The bias can be increased, decreased, or maintained in response to one or more measured values of the signal. In many embodiments, a gain of the signal is adjusted with the bias in order to inhibit distortion. The bias can be adjusted slowly in order to inhibit audible noise such as thumping, and the gain can be adjusted faster than the bias in order to inhibit clipping of the signal and distortion. Thumping is a user perceivable sound like a "thump" that may occur if the bias were to be adjusted too quickly. In many embodiments, one or more of the bias or the gain is adjusted in response to a value of the signal below a threshold.

In many embodiments, peak limiting with a variable change in gain is used to inhibit clipping of the biased audio signal. The processor can be configured with a look ahead delay to detect an incident peak and to adjust the gain in response to the peak detected with the look ahead delay to inhibit clipping.

In a first aspect, embodiments provide a hearing apparatus to transmit an audio signal to an ear of a user with light. The apparatus comprises an input to receive the audio signal, a light source to generate an optical signal, and an output transducer to receive the optical signal from the light source. A processor is coupled to the input and configured with instructions to receive the audio signal, determine a bias of the audio signal and a biased audio signal in response to the audio signal, and output the biased audio signal to circuitry to drive the light source with the biased signal in order to decrease light energy of the optical signal transmitted from the light source.

In many embodiments, the processor comprises instructions to adjust the bias to decrease light energy in response to decreased energy of the audio signal and to adjust the bias to increase light energy in response to increased energy of the audio signal in order to inhibit distortion. The processor may comprise instructions to adjust the bias in a direction corresponding to negative sound pressure in response to decreased amounts of negative sound pressure of the audio signal. The processor may comprise instructions to adjust the bias to decrease amounts of light energy at a first rate and to increase amounts of light energy at a second rate to inhibit distortion. The first rate may be slower than the second rate. The processor may comprise instructions to adjust the bias over a time duration of more than about 50 ms or more than about 20 ms in order to inhibit an audible thump.

In many embodiments, the processor comprises instructions for a look ahead delay to decrease the gain to inhibit clipping in response to a negative signal below a threshold amount detected with the look ahead delay. The processor may comprise instructions to adjust the biased signal to more positive values in response to the negative signal below the threshold amount and to increase the gain when the biased signal is adjusted to the more positive values. The negative signal may correspond to negative sound pressure. The threshold amount may comprise a lower end of the input range. The processor may comprise instructions to decrease the gain faster than a change in bias. The bias may remain substantially fixed when the gain is decreased in response to the signal below the threshold. The processor may comprise instructions to decrease the gain over a duration of no more than a length of the look ahead delay. The bias may remain substantially fixed to within about five percent (5%) over the length of the look ahead delay.

The processor may comprise instructions to limit the bias in response to a noise floor associated with one or more of delta sigma modulation circuitry, the circuitry to drive the light source, the light source, or the output transducer to receive the output signal.

The audio signal may comprise a fixed bias. The processor may comprise instructions to determine the biased audio signal in response to the fixed bias of the audio signal.

The circuitry to drive the light source may comprise delta sigma modulation circuitry. The delta modulation circuitry may comprise one or more of pulse width modulation circuitry, pulse density modulation circuitry, or a digital to analog converter of the processor comprising the pulse density modulation circuitry. Alternatively or in combination, the circuitry to drive the light source may comprise an analog amplifier.

In another aspect, embodiments provide a method of transmitting an audio signal to an ear of a user with light. The audio signal may be received from an input. A bias of the audio signal and a biased audio signal may be determined with a processor in response to the audio signal. The biased audio signal may be output to circuitry to drive a light source with the biased signal in order to generate an optical signal with decreased light energy transmitted from the light source. The optical signal may be received with an output transducer to vibrate the ear in response to the output optical signal.

In many embodiments, the processor comprises instructions to adjust the bias to decrease light energy in response to decreased energy of the audio signal and to adjust the bias to increase light energy in response to increased energy of the audio signal in order to inhibit distortion. The processor may comprise instructions to adjust the bias in a direction corresponding to negative sound pressure in response to decreased amounts of negative sound pressure of the audio signal. The processor may comprise instructions to adjust the bias to decrease amounts of light energy at a first rate and to increase amounts of light energy at a second rate to inhibit distortion. The first rate may be slower than the second rate. The processor may comprise instructions to adjust the bias over a time duration of more than about 50 ms or more than about 20 ms in order to inhibit an audible thump.

In many embodiments, the processor comprises instructions for a look ahead delay to decrease the gain to inhibit clipping in response to a negative signal below a threshold amount detected with the look ahead delay. The processor may comprise instructions to adjust the biased signal to more positive values in response to the negative signal below the threshold amount and to increase the gain when the biased signal is adjusted to the more positive values. The negative signal may correspond to negative sound pressure. The threshold amount may comprise a lower end of the input range. The processor may comprise instructions to decrease the gain faster than a change in bias. The bias may remain substantially fixed when the gain is decreased in response to the signal below the threshold. The processor may comprise instructions to decrease the gain over a duration of no more than a length of the look ahead delay. The bias may remain substantially fixed to within about five percent (5%) over the length of the look ahead delay.

The processor may comprise instructions to limit the bias in response to a noise floor associated with one or more of delta sigma modulation circuitry, the circuitry to drive the light source, the light source or the output transducer to receive the output signal.

The input audio signal may comprise a fixed bias. The processor may comprise instructions to determine the biased audio signal in response to the fixed bias of the audio signal.

The circuitry to drive the light source may comprise delta sigma modulation circuitry. The delta modulation circuitry may comprise one or more of pulse width modulation circuitry, pulse density modulation circuitry, or a digital to analog converter of the processor comprising the pulse density modulation circuitry. Alternatively or in combination, the circuitry to drive the light source may comprise an analog amplifier.

In another aspect, embodiments provide a method of transmitting an audio signal with light. The audio signal may be received from an input. A bias of the audio signal and a biased audio signal may be determined with a processor in response to the audio signal. The biased audio signal may be output to circuitry to drive a light source with the biased signal in order to generate an optical signal with decreased light energy transmitted from the light source.

In another aspect, embodiments provide a hearing apparatus to transmit an audio signal to an ear of a user with light. The hearing apparatus may comprise a processor coupled to an input to receive the audio signal. The processor may be configured with instructions to receive the audio signal from the input, determine a bias of the audio signal and a biased audio signal in response to the audio signal, and output the biased audio signal to circuitry to drive a light source with the biased signal in order to decrease light energy transmitted from the light source.

In another aspect, embodiments provide a hearing apparatus. The apparatus may comprise an input to receive an audio signal, a light source, an output transducer to receive an optical signal from the light source, and a processor coupled to the input. The processor may comprise instructions configured to receive the audio signal, determine a bias of the audio signal to in response to the audio signal in order to decrease power consumption of the light source, decrease a gain in response to a negative peak of the audio signal below a threshold amount, and output an optical signal to the light source in response to the determined bias and the decreased gain in response to the negative peak of the audio signal below the threshold amount.

In another aspect, embodiments provide a hearing apparatus. The hearing apparatus may comprise an input to receive an audio signal, an output transducer to receive an optical signal, and a processor coupled to the input. The processor may comprise instructions to receive the audio signal and determine a bias of the audio signal in response to the audio signal and output an optical signal in response to the bias.

The optical signal may comprise a pulse modulated optical signal. The processor may comprise instructions to output the pulse modulated optical signal. Alternatively, the optical signal may comprise an analog optical signal, and the processor may comprise instructions to output the analog optical signal.

The apparatus may further comprise a light source. The light source may comprise a laser diode. The laser diode may comprise a linear light output in response to a biased audio signal input to the laser diode.

The instructions of the processor may comprise instruction to adjust the bias in response to a value of the signal, to adjust the bias in response to a value of the signal traversing a threshold amount, or to adjust the bias and a gain of the signal in response to a value of the signal traversing a threshold amount, and combinations thereof.

The bias may be combined with the input audio signal to provide a biased audio signal. The pulse modulated signal may be determined in response to the biased audio signal. The bias may comprise a negative bias added to the input audio signal to decrease amounts of light transmitted with the pulse modulated signal. The bias may comprise a sliding bias to offset the input audio signal by a variable amount and to provide the biased audio signal with a variable bias. The bias may comprise an adjustable bias, and the instructions of the processor may be configured to adjust the bias with substantially inaudible frequencies.

The audio signal may comprise a peak. The bias may be adjusted in response to the peak of the signal. The peak may comprise a negative peak. The bias may be determined in response to the negative peak of the signal.

The audio signal may comprise a positive peak and a negative peak. The bias may be adjusted in response to the negative peak of the signal. Alternatively or in combination, the bias may be adjusted in response to the positive peak of the signal.

The processor may comprise instructions to adjust or decrease a gain of the signal in response to the value of the audio signal.

The apparatus may further comprise one or more light sources to couple to the output transducer, and drive circuitry coupled to the processor and the one or more light sources. The processor may comprise instructions to drive the one or more light sources with drive circuitry and the pulse modulated signal. The one or more light sources and the drive circuitry may be arranged to transmit power and signal to the output transducer with the pulse modulated optical signal in order to drive the output transducer assembly in response to the power and signal transmitted with the pulse modulated optical signal.

The output transducer may comprise one or more of a support, a photodiode, an electromechanical transducer, or a photostrictive material. The support may comprise one or more of a support shaped to engage a tympanic membrane of the user, a support shaped to engage an ossicle of the user, a support shaped to engage a round window of the user, a support shaped to engage an oval window of the user, or a support shaped to engage bone of the user.

The electromechanical transducer may comprise one or more of a balanced armature transducer, a coil and magnetic material, or a piezoelectric material.

In another aspect, embodiments provide a method comprising providing the apparatus as in any one of embodiments described above and herein.

In another aspect, embodiments provide a method of transmitting sound to a user. The method comprising receiving an audio signal, determining a bias of the signal in response to the signal, and providing a pulse modulated optical signal in response to the bias and the signal.

BRIEF DESCRIPTION OF THE DRAWINGS

A better understanding of the features and advantages of the present disclosure will be obtained by reference to the following detailed description that sets forth illustrative embodiments, in which the principles of the disclosure are utilized, and the accompanying drawings of which.

DETAILED DESCRIPTION

Figure 1:
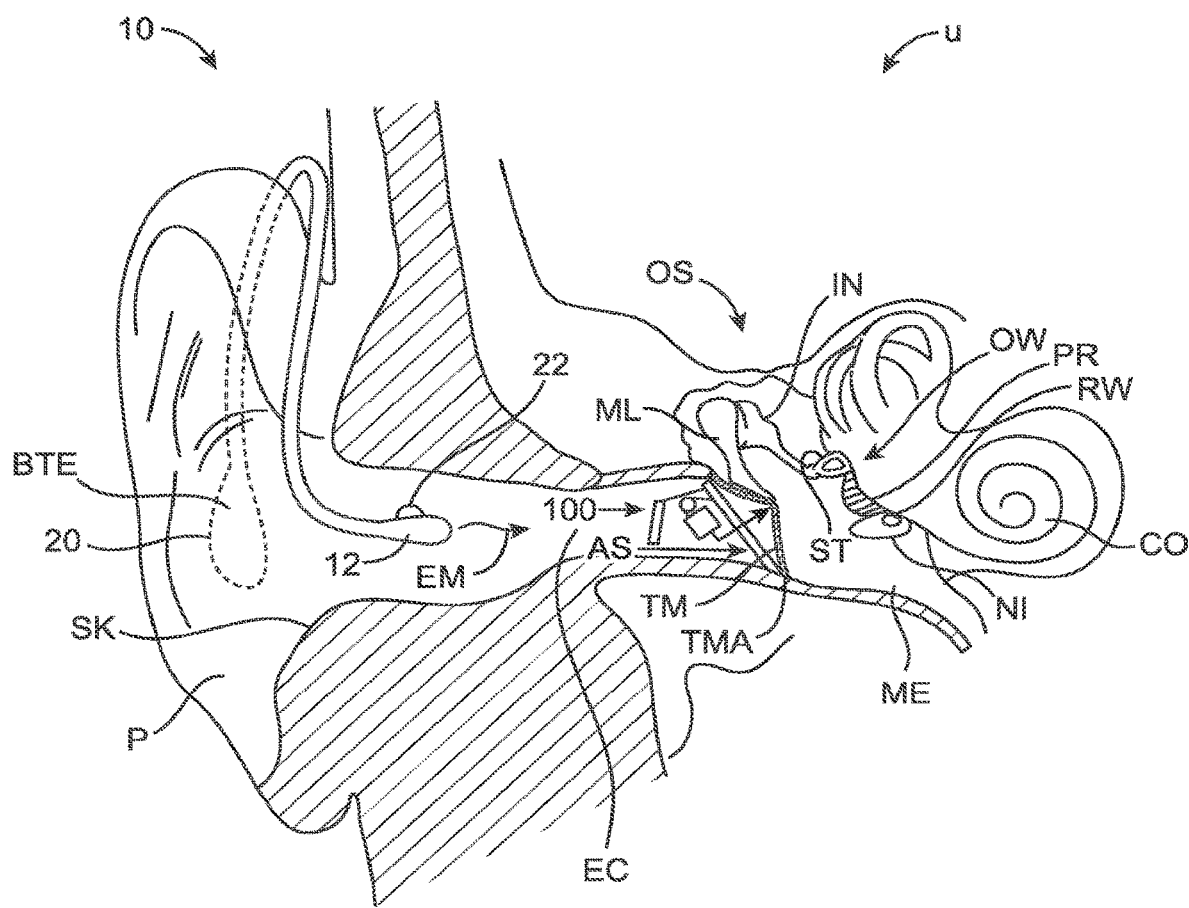
FIG. 1 shows a hearing aid system configured to transmit electromagnetic energy to an output transducer assembly, in accordance with embodiments.

A better understanding of the features and advantages of the present disclosure will be obtained by reference to the following detailed description that sets forth illustrative embodiments, in which the principles of embodiments of the present disclosure are utilized, and the accompanying drawings.

Although the detailed description contains many specifics, these should not be construed as limiting the scope of the disclosure but merely as illustrating different examples and aspects of the present disclosure. It should be appreciated that the scope of the disclosure includes other embodiments not discussed in detail above. Various other modifications, changes and variations which will be apparent to those skilled in the art may be made in the arrangement, operation and details of the method and apparatus of the present disclosure provided herein without departing from the spirit and scope of the invention as described herein.

Although specific reference is made to a hearing aid, the embodiments disclosed herein will have application with many fields, such as acoustics and listening devices, for example electronic communication devices such as cell phones.

The optical methods and apparatus disclosed herein that provide low distortion optical signals with decreased power consumption are well suited for combination with many types of commercially available electrical circuits and sound processors used to transmit electrical signals such as delta sigma modulation circuitry and class-A amplifiers for example.

The embodiments disclosed herein can be combined with implantable and non-implantable hearing devices.

The embodiments disclosed herein can be combined in one or more of many ways to provide improved sound quality with optically driven transducers.

As used herein like characters identify like elements.

As used herein light encompasses one or more of visible light, ultraviolet light, or infrared light, and combinations thereof.

As used herein electromagnetic energy encompasses light energy.

As used herein a trough encompasses a negative peak.

Examples of optical transducers that couple the transducer to structure of the ear so as to decrease occlusion are described in U.S. Pat. Nos. 7,668,325; 7,867,160; 8,396,239; 8,401,212; 8,715,153; 8,715,154; and U.S. patent application Ser. Nos. 12/820,776; 13/069,282; 61/217,801, filed Jun. 3, 2009, entitled "Balanced Armature Device and Methods for Hearing"; and PCT/US2009/057719, filed 21 Sep. 2009, entitled "Balanced Armature Device and Methods for Hearing", published as WO 2010/033933; the full disclosures of which are incorporated herein by reference and suitable for combination in accordance with embodiments as described herein.

In many embodiments, an audio signal is transmitted using light to provide both power and signal to a transducer. Although light comprises electrical fields oscillating at terahertz frequencies, commercially available detectors do not capture the negative component of the electric field oscillation. Because the light energy applied to a transducer results in a unidirectional signal, no opposing signal is available. Therefore, a light-encoded signal can be biased in order to decrease power consumption. Power consumption increases with increasing bias, and reducing bias can extend battery life substantially. However, the bias also determines the maximum signal amplitude that can be encoded, so reducing bias constrains signal level. The embodiments disclosed herein are particularly well suited for providing a decreased bias in combination with inhibited clipping in order to provide improved sound to the user.

In many embodiments, the adjustable bias comprises a sliding bias (hereinafter "SB"). The SB algorithm monitors the signal level and may continually adjust the bias. In many embodiments, the bias is set to the minimum value that can accommodate the signal level. Power consumption can be reduced when the signal level is low, such that the tradeoff between battery life and signal range can be balanced, for example optimized.

In many embodiments, the SB algorithm sets the bias level in response to the peak levels of the signal, such as negative peaks of the signal. The peak level can be proportional to the root mean square (rms) level of signal. A factor comprising the ratio of the peak value to rms value is known as the crest factor. However, the crest factor can vary with the type of input signal and may not be well suited for use with at least some input audio signals. High crest factor signals may require high bias levels and thus increase power consumption. Therefore it may be desirable to reduce the crest factor in conjunction with applying sliding bias. There are several methods that can be used to reduce the crest factor of a signal. One method is to use a variable level peak limiting strategy, for example. Another method is to use a peak cancellation strategy. Yet another method provides a soft limiting strategy. These methods are suitable for combination in accordance with embodiments disclosed herein. In many embodiments, the peak limiting is adjustable and is not fixed, and the crest-factor limiting is dependent on the bias level.

The sliding-bias algorithm and the combined peak limiting and sliding-bias algorithms as described herein can be used alternatively or in combination as the front end to pulse-width or pulse density modulation circuitry. Alternatively, they can be used as the front end of a class-A analog system. In these embodiments, a significant savings in output power can be realized, particularly when the signal is low level.

FIG. 1 shows a hearing aid system 10 configured to transmit electromagnetic energy comprising light energy EM to an output transducer assembly 100 positioned in the ear canal EC of the user. The ear comprises an external ear, a middle ear ME and an inner ear. The external ear comprises a Pinna P and an ear canal EC and is bounded medially by an eardrum TM. Ear canal EC extends medially from pinna P to eardrum TM. Ear canal EC is at least partially defined by a skin SK disposed along the surface of the ear canal. The eardrum TM comprises an annulus TMA that extends circumferentially around a majority of the eardrum to hold the eardrum in place. The middle ear ME is disposed between eardrum TM of the ear and a cochlea CO of the ear. The middle ear ME comprises the ossicles OS to couple the eardrum TM to cochlea CO. The ossicles OS comprise an incus IN, a malleus ML and a stapes ST. The malleus ML is connected to the eardrum TM and the stapes ST is connected to an oval window OW, with the incus IN disposed between the malleus ML and stapes ST. Stapes ST is coupled to the oval window OW so as to conduct sound from the middle ear to the cochlea.

The hearing system 10 includes an input transducer assembly 20 and an output transducer assembly 100 to transmit sound to the user. Hearing system 10 may comprise a behind the ear unit BTE. Behind the ear unit BTE may comprise many components of system 10 such as a speech processor, battery, wireless transmission circuitry and input transducer assembly 10. Behind the ear unit BTE may comprise many component as described in U.S. Pat. Pub. Nos. 2007/0100197, entitled "Output transducers for hearing systems"; and 2006/0251278, entitled "Hearing system having improved high frequency response", the full disclosures of which are incorporated herein by reference and may be suitable for combination in accordance with some embodiments of the present invention. The input transducer assembly 20 can be located at least partially behind the pinna P, although the input transducer assembly may be located at many sites. For example, the input transducer assembly may be located substantially within the ear canal, as described in U.S. Pub. No. 2006/0251278. The input transducer assembly may comprise a Bluetooth® connection to couple to a cell phone and may comprise, for example, components of the commercially available Sound ID 300, available from Sound ID of Palo Alto, Calif. The output transducer assembly 100 may comprise components to receive the light energy and vibrate the eardrum in response to light energy. An example of an output transducer assembly having components suitable for combination in accordance with embodiments as described herein is described in U.S. Pat. App. Nos. 61,217, 801, filed Jun. 3, 2009, entitled "Balanced Armature Device and Methods for Hearing" and PCT/US2009/057719, filed 21 Sep. 2009, Balanced Armature Device and Methods for Hearing", the full disclosure of which is incorporated herein by reference.

The input transducer assembly 20 can receive a sound input, for example an audio sound. With hearing aids for hearing impaired individuals, the input can be ambient sound. The input transducer assembly comprises at least one input transducer, for example a microphone 22. Microphone 22 can be positioned in many locations such as behind the ear, as appropriate. Microphone 22 is shown positioned to detect spatial localization cues from the ambient sound, such that the user can determine where a speaker is located based on the transmitted sound. The pinna P of the ear can diffract sound waves toward the ear canal opening such that sound localization cues can be detected with frequencies above at least about 4 kHz. The sound localization cues can be detected when the microphone is positioned within ear canal EC and also when the microphone is positioned outside the ear canal EC and within about 5 mm of the ear canal opening. The at least one input transducer may comprise a second microphone located away from the ear canal and the ear canal opening, for example positioned on the behind the ear unit BTE. The input transducer assembly can include a suitable amplifier or other electronic interface. In some embodiments, the input may comprise an electronic sound signal from a sound producing or receiving device, such as a telephone, a cellular telephone, a Bluetooth connection, a radio, a digital audio unit, and the like.

In many embodiments, at least a first microphone can be positioned in an ear canal or near an opening of the ear canal to measure high frequency sound above at least about one 4 kHz comprising spatial localization cues. A second microphone can be positioned away from the ear canal and the ear canal opening to measure at least low frequency sound below about 4 kHz. This configuration may decrease feedback to the user, as described in U.S. Pat. Pub. No. US 2009/0097681, the full disclosure of which is incorporated herein by reference and may be suitable for combination in accordance with embodiments of the present invention.

Input transducer assembly 20 includes a signal output source 12 which may comprise a light source such as an LED or a laser diode, an electromagnet, an RF source, or the like. The signal output source can produce an output based on the sound input. Output transducer assembly 100 can receive the output from input transducer assembly 20 and can produce mechanical vibrations in response. Output transducer assembly 100 comprises a sound transducer and may comprise at least one of a coil, a magnet, a magnetostrictive element, a photostrictive element, or a piezoelectric element, for example. For example, the output transducer assembly 100 can be coupled input transducer assembly 20 comprising an elongate flexible support having a coil supported thereon for insertion into the ear canal as described in U.S. Pat. Pub. No. 2009/0092271, entitled "Energy Delivery and Microphone Placement Methods for Improved Comfort in an Open Canal Hearing Aid", the full disclosure of which is incorporated herein by reference and may be suitable for combination in accordance with some embodiments of the present invention. Alternatively or in combination, the input transducer assembly 20 may comprise a light source coupled to a fiber optic, for example as described in U.S. Pat. Pub. No. 2006/0189841 entitled, "Systems and Methods for Photo-Mechanical Hearing Transduction", the full disclosure of which is incorporated herein by reference and may be suitable for combination in accordance with some embodiments of the present invention. The light source of the input transducer assembly 20 may also be positioned in the ear canal, and the output transducer assembly and the BTE circuitry components may be located within the ear canal so as to fit within the ear canal. When properly coupled to the subject's hearing transduction pathway, the mechanical vibrations caused by output transducer assembly 100 can induce neural impulses in the subject which can be interpreted by the subject as the original sound input.

Figure 2A:
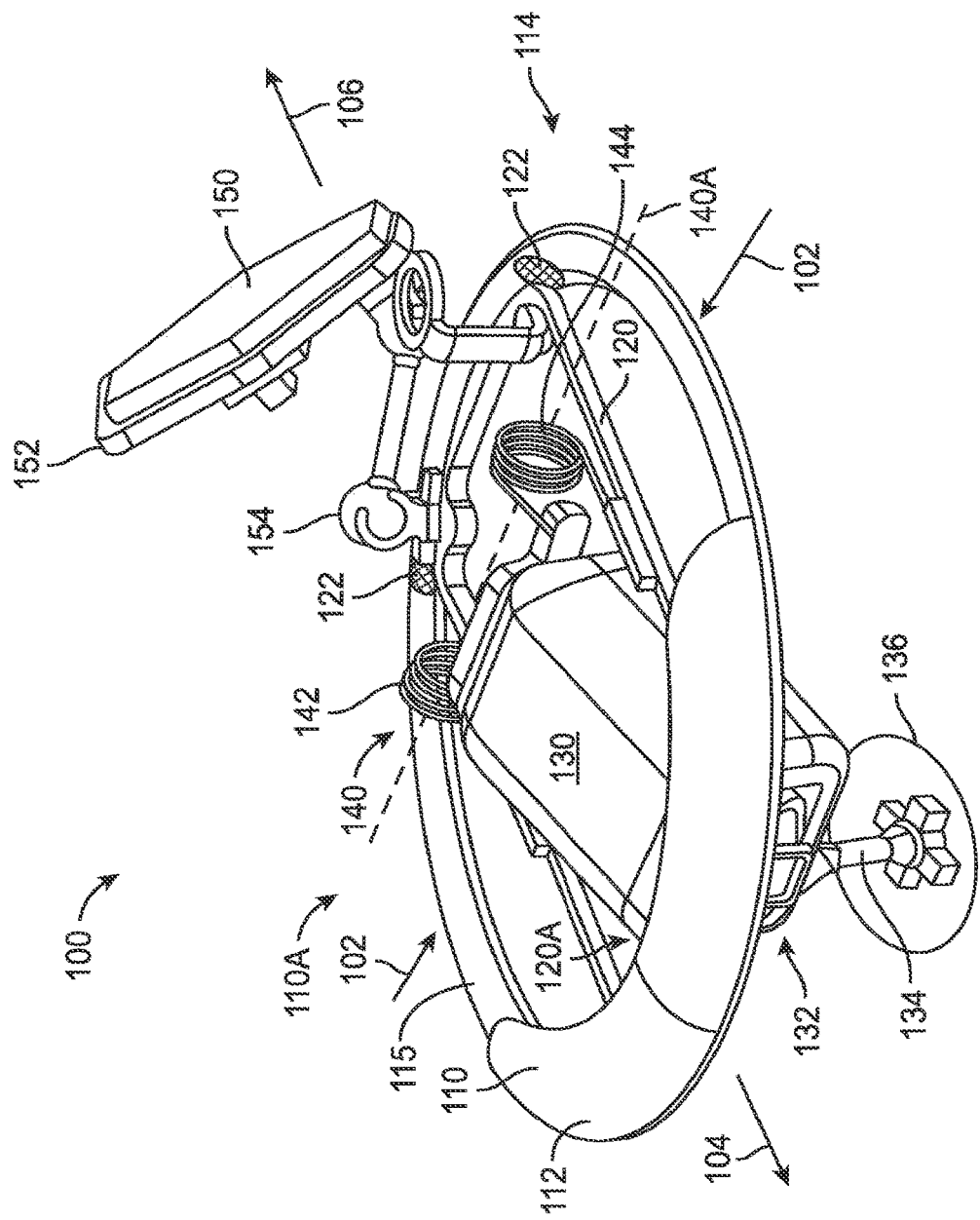
FIGS. 2A and 2B show isometric and top views, respectively, of the output transducer assembly in accordance with embodiments.
Figure 2B:
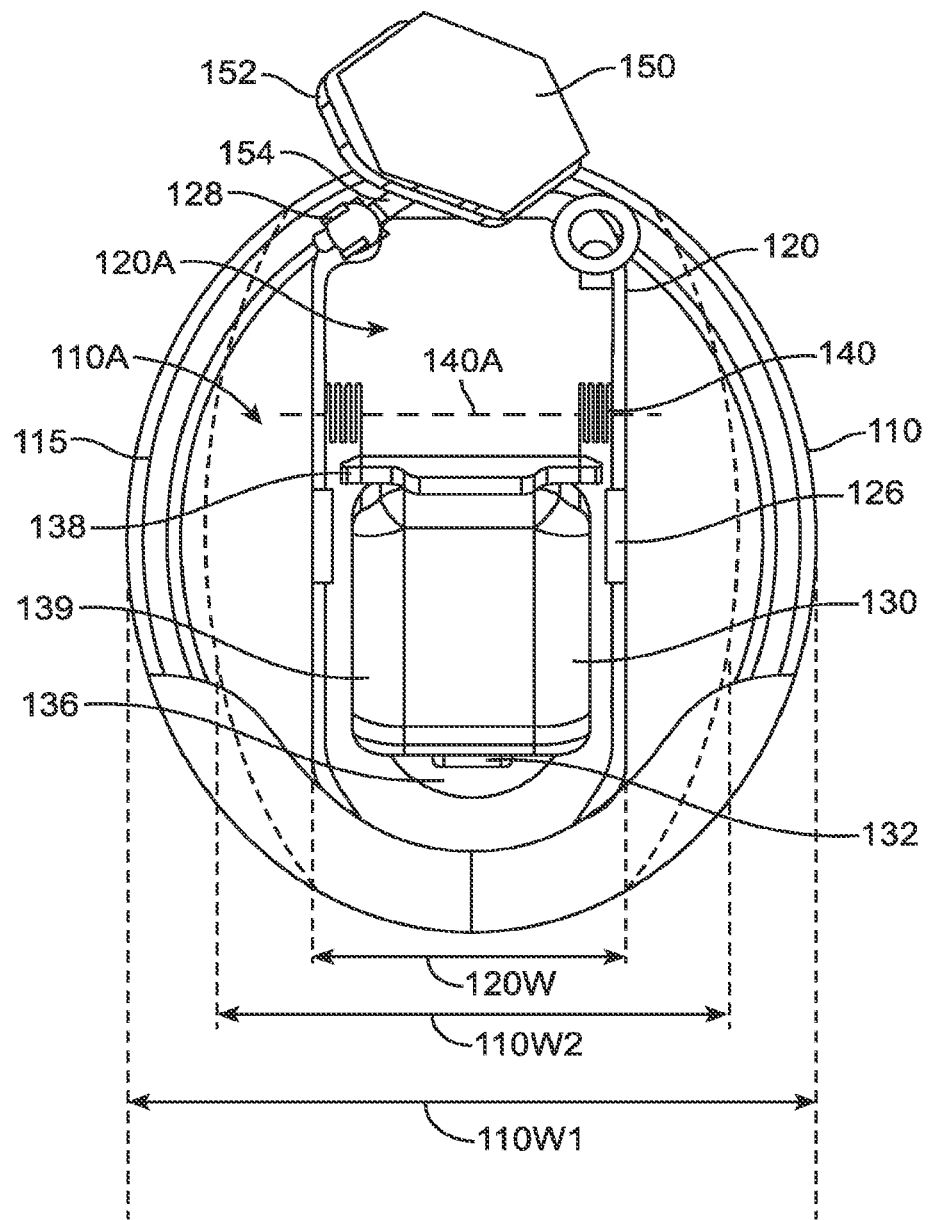

FIGS. 2A and 2B show isometric and top views, respectively, of the output transducer assembly 100. Output transducer assembly 100 comprises a retention structure 110, a support 120, a transducer 130, at least one spring 140 and a photodetector 150. Retention structure 110 is sized to couple to the eardrum annulus TMA and at least a portion of the anterior sulcus AS of the ear canal EC. Retention structure 110 comprises an aperture 110A. Aperture 110A is sized to receive transducer 130.

The retention structure 110 can be sized to the user and may comprise one or more of an o-ring, a c-ring, a molded structure, or a structure having a shape profile so as to correspond to a mold of the ear of the user. For example retention structure 110 may comprise a polymer layer 115 coated on a positive mold of a user, such as an elastomer or other polymer. Alternatively or in combination, retention structure 110 may comprise a layer 115 of material formed with vapor deposition on a positive mold of the user, as described herein. Retention structure 110 may comprise a resilient retention structure such that the retention structure can be compressed radially inward as indicated by arrows 102 from an expanded wide profile configuration to a narrow profile configuration when passing through the ear canal and subsequently expand to the wide profile configuration when placed on one or more of the eardrum, the eardrum annulus, or the skin of the ear canal.

The retention structure 110 may comprise a shape profile corresponding to anatomical structures that define the ear canal. For example, the retention structure 110 may comprise a first end 112 corresponding to a shape profile of the anterior sulcus AS of the ear canal and the anterior portion of the eardrum annulus TMA. The first end 112 may comprise an end portion having a convex shape profile, for example a nose, so as to fit the anterior sulcus and so as to facilitate advancement of the first end 112 into the anterior sulcus. The retention structure 110 may comprise a second end 114 having a shape profile corresponding to the posterior portion of eardrum annulus TMA.

The support 120 may comprise a frame, or chassis, so as to support the components connected to support 120. Support 120 may comprise a rigid material and can be coupled to the retention structure 110, the transducer 130, the at least one spring 140 and the photodetector 150. The support 120 may comprise a biocompatible metal such as stainless steel so as to support the retention structure 110, the transducer 130, the at least one spring 140 and the photodetector 150. For example, support 120 may comprise cut sheet metal material. Alternatively, support 120 may comprise injection molded biocompatible plastic. The support 120 may comprise an elastomeric bumper structure 122 extending between the support and the retention structure, so as to couple the support to the retention structure with the elastomeric bumper. The elastomeric bumper structure 122 can also extend between the support 120 and the eardrum, such that the elastomeric bumper structure 122 contacts the eardrum TM and protects the eardrum TM from the rigid support 120. The support 120 may define an aperture 120A formed thereon. The aperture 120A can be sized so as to receive the balanced armature transducer 130, for example such that the housing of the balanced armature transducer 130 can extend at least partially through the aperture 120A when the balanced armature transducer is coupled to the eardrum TM. The support 120 may comprise an elongate dimension such that support 120 can be passed through the ear canal EC without substantial deformation when advanced along an axis corresponding to the elongate dimension, such that support 120 may comprise a substantially rigid material and thickness.

The transducer 130 comprises structures to couple to the eardrum when the retention structure 120 contacts one or more of the eardrum, the eardrum annulus, or the skin of the ear canal. The transducer 130 may comprise a balanced armature transducer having a housing and a vibratory reed 132 extending through the housing of the transducer. The vibratory reed 132 is affixed to an extension 134, for example a post, and an inner soft coupling structure 136. The soft coupling structure 136 has a convex surface that contacts the eardrum TM and vibrates the eardrum TM. The soft coupling structure 136 may comprise an elastomer such as silicone elastomer. The soft coupling structure 136 can be anatomically customized to the anatomy of the ear of the user. For example, the soft coupling structure 136 can be customized based a shape profile of the ear of the user, such as from a mold of the ear of the user as described herein.

At least one spring 140 can be connected to the support 120 and the transducer 130, so as to support the transducer 130. The at least one spring 140 may comprise a first spring 122 and a second spring 124, in which each spring is connected to opposing sides of a first end of transducer 130. The springs may comprise coil springs having a first end attached to support 120 and a second end attached to a housing of transducer 130 or a mount affixed to the housing of the transducer 130, such that the coil springs pivot the transducer about axes 140A of the coils of the coil springs and resiliently urge the transducer toward the eardrum when the retention structure contacts one or more of the eardrum, the eardrum annulus, or the skin of the ear canal. The support 120 may comprise a tube sized to receiving an end of the at least one spring 140, so as to couple the at least one spring to support 120.

A photodetector 150 can be coupled to the support 120. A bracket mount 152 can extend substantially around photodetector 150. An arm 154 extend between support 120 and bracket 152 so as to support photodetector 150 with an orientation relative to support 120 when placed in the ear canal EC. The arm 154 may comprise a ball portion so as to couple to support 120 with a ball-joint. The photodetector 150 can be coupled to transducer 130 so as to driven transducer 130 with electrical energy in response to the light energy signal from the output transducer assembly.

Resilient retention structure 110 can be resiliently deformed when inserted into the ear canal EC. The retention structure 110 can be compressed radially inward along the pivot axes 140A of the coil springs such that the retention structure 110 is compressed as indicated by arrows 102 from a wide profile configuration having a first width 110W1 to an elongate narrow profile configuration having a second width 110W2 when advanced along the ear canal EC as indicated by arrow 104 and when removed from the ear canal as indicated by arrow 106. The elongate narrow profile configuration may comprise an elongate dimension extending along an elongate axis corresponding to an elongate dimension of support 120 and aperture 120A. The elongate narrow profile configuration may comprise a shorter dimension corresponding to a width 120W of the support 120 and aperture 120A along a shorter dimension. The retention structure 110 and support 120 can be passed through the ear canal EC for placement. The reed 132 of the balanced armature transducer 130 can be aligned substantially with the ear canal EC when the assembly 100 is advanced along the ear canal EC in the elongate narrow profile configuration having second width 110W2.

The support 120 may comprise a rigidity greater than the resilient retention structure 110, such that the width 120W remains substantially fixed when the resilient retention structure is compressed from the first configuration having width 110W1 to the second configuration having width 110W2. The rigidity of support 120 greater than the resilient retention structure 110 can provide an intended amount of force to the eardrum TM when the inner soft coupling structure 136 couples to the eardrum, as the support 120 can maintain a substantially fixed shape with coupling of the at least one spring 140. In many embodiments, the outer edges of the resilient retention structure 110 can be rolled upwards toward the side of the photodetector 150 so as to compress the resilient retention structure from the first configuration having width 110W1 to the second configuration having width 110W2, such that the assembly can be easily advanced along the ear canal EC.

Figure 3:
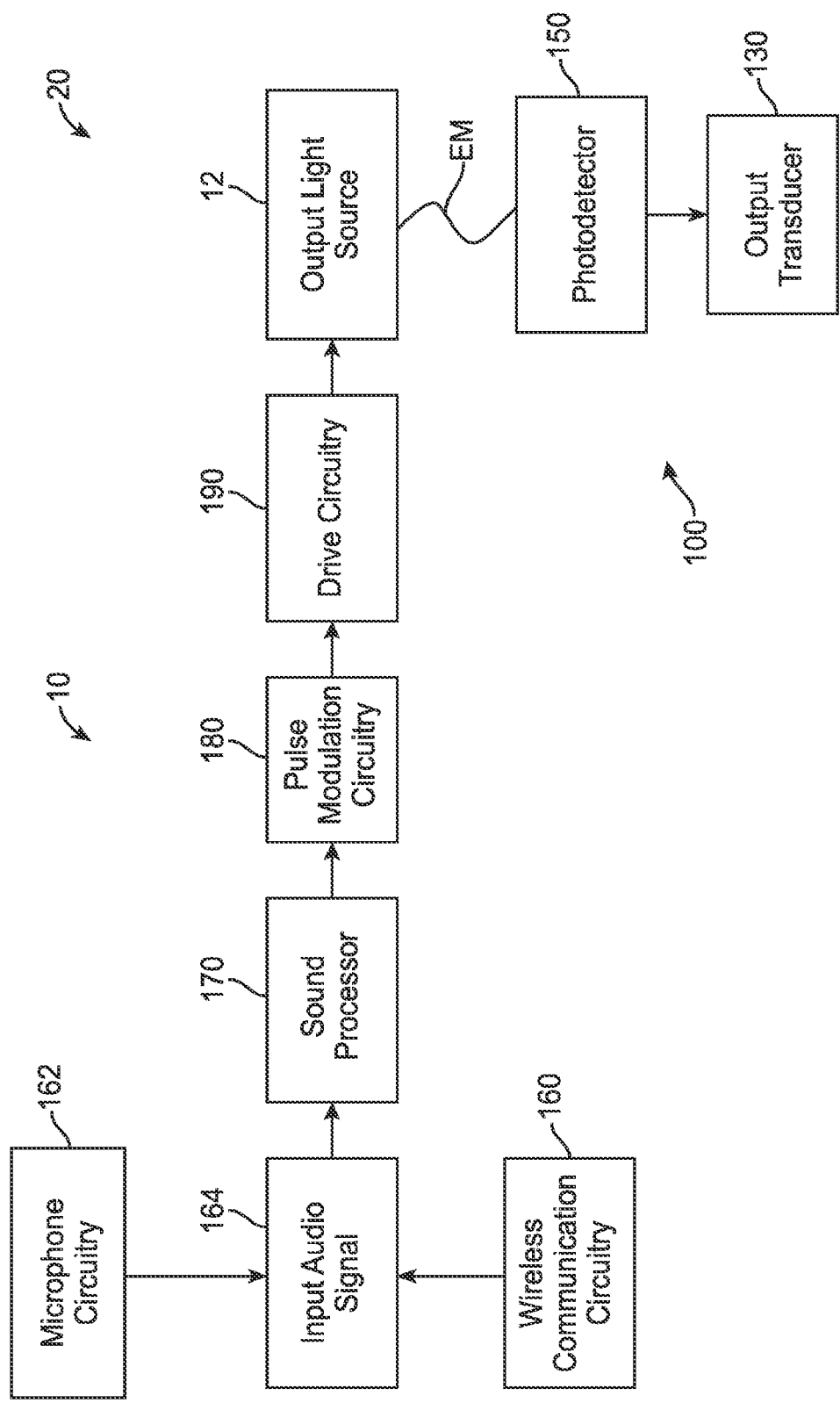
FIG. 3 shows circuitry of the hearing aid system 10, in accordance with embodiments.

FIG. 3 shows circuitry of the hearing aid system 10. The circuitry of hearing system 10 may comprise one or more components of input transducer assembly 20 and output transducer assembly 100, for example.

The circuitry of the input transducer assembly 20 comprises one or more sources of an input audio signal 164, such as one or more of wireless communication circuitry 160 or microphone circuitry 162, for example. Wireless communication circuitry 160 may comprise one or more of many known wireless communication circuitry components such as circuitry compatible with Bluetooth® communication standards, for example. The microphone circuitry 162 may comprise microphone 22 and amplifiers, for example. The input audio signal 164 is received with an input of sound processor 170. Sound processor 170 can be coupled to pulse modulation circuitry 180 to generate modulated pulses, for example. Alternatively or in combination, the sound processor 170 may comprise the pulse modulation circuitry. The output of the pulse modulation circuitry 180 can be coupled to drive circuitry 190. The drive circuitry 190 can be coupled to an output light source 12, for example. The output light source 12 can provide output light energy pulses modulated in accordance with pulse modulation circuitry 190, for example.

The light output source 12 can be configured in one or more of many ways. The light output source 12 can be placed in the ear canal, or outside the ear canal such as in a BTE unit as described herein, for example. The light output source 12 may comprise one or more of many light sources such as a light emitting diode, a laser, or a laser diode, for example. In many embodiments, the output light source 12 comprises a laser diode having a linear light energy output in response to an input signal, for example. The laser diode having the substantially linear output in response to the input signal can provide a low distortion output light signal, which can be combined with an analog output or modulated output signal from the processor and drive circuitry as described herein, for example.

The circuitry of the output transducer assembly 100 can be configured in one or more of many ways to receive the pulse modulated light signal and induce vibrations of the subject's auditory pathway. In many embodiments, a photodetector 150 receives the modulated light pulses. The photodetector 150 may comprise one or more of many light sensitive materials such as a photodiode, a silicone photodiode material or a photostrictive material, for example. In many embodiments, photodetector 150 is coupled to an output transducer 130. The output transducer 130 may comprise one or more of many electromechanical actuators such as a coil, a magnetic material, a magnet, a balanced armature transducer, or a piezo electric material, for example.

The pulse modulation circuitry 180 may comprise one or more of pulse width modulation circuitry or pulse density modulation circuitry, for example. In many embodiments, the pulse modulation circuitry can be replaced or combined with one or more of many forms of circuitry. For example, the pulse modulation circuitry can be replaced with circuitry configured to output an analog optical signal, such as a class A amplifier. Alternatively, the pulse modulation circuitry can be replaced with one more of many forms of modulation circuitry such amplitude modulation, frequency modulation, or phase modulation, for example, in order to decrease the optical energy of the output signal from the light source.

The processor 170 may comprise on or more components of the input transducer assembly. The sound processor 170 may comprise one or more of: analog circuitry to amplify an analog signal from the microphone; analog to digital conversion circuitry to convert an analog input signal to a digital circuitry; digital input circuitry to receive a digital sound signal; a digital signal processor; a tangible medium embodying instructions to process a sound signal; output circuitry to output a digital signal; digital filters to adjust a sound signal in response to user preference; and combinations thereof. In many embodiments, the sound processor is configured with instructions to adjust the bias of the input signal and limit peaks as described herein.

The sound processor may comprise one or more components of a commercially available sound processor known to those of ordinary skill in the art of hearing aid design. The sound processor may comprise a tangible medium such as one or more of a computer readable memory, random access memory, read only memory, writable erasable read only memory, and a solid state hard drive. The sound processor may comprise a processor capable of executing instructions stored on the tangible medium, and may comprise gate array logic, programmable gate array logic, and combinations thereof. The processor may comprise a plurality of processors and a plurality of tangible media, for example. A person of ordinary skill in the art will recognize many configurations of processor 170 in accordance with the embodiments disclosed herein.

Figure 4A:
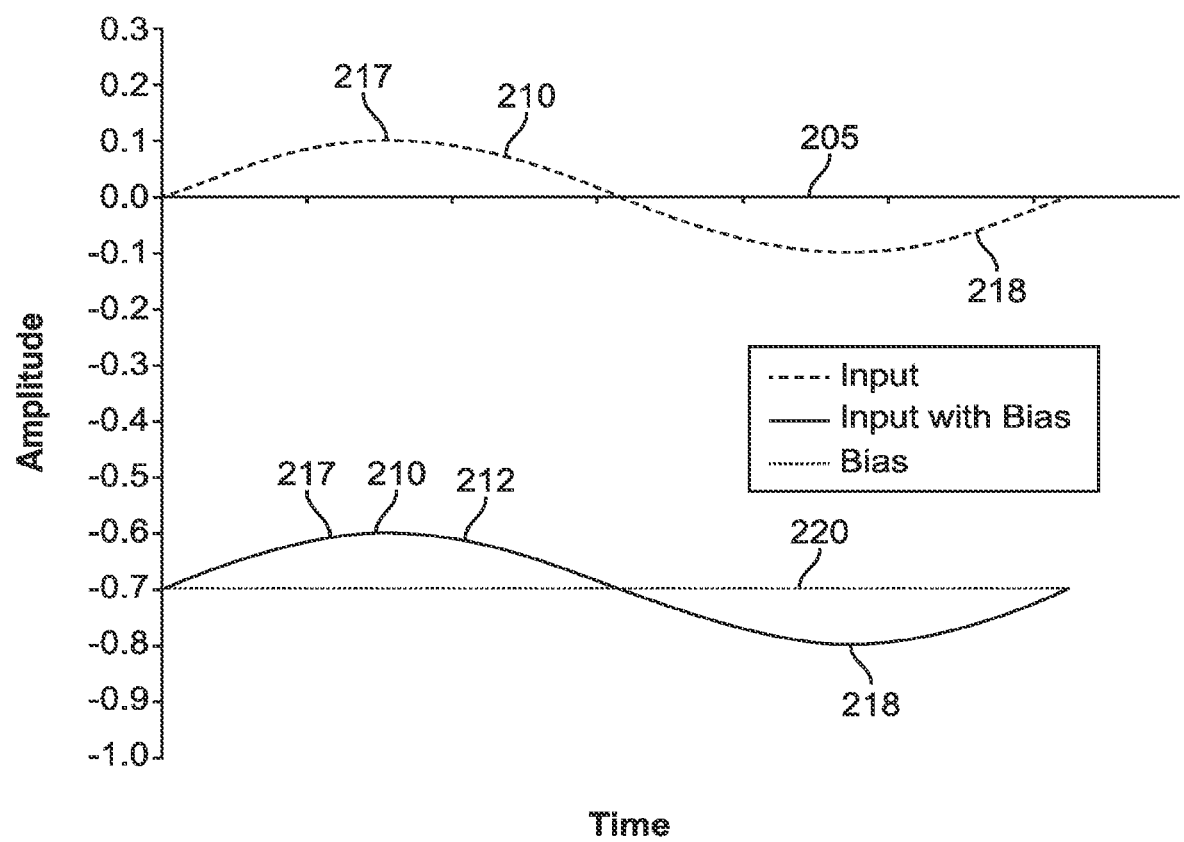
FIG. 4A shows an input signal and the input signal with bias, in accordance with embodiments.

FIG. 4A shows an input signal 210 relative to an input reference 205 and the input signal 210 with an adjustable bias 220. The input signal 210 may comprise an audio signal as described herein. The reference level 205 may correspond to, for example, 0 volts, and the amplitude of the input signal may vary over a range of positive and negative voltages of +1 and −1, for example. The voltage scale can be arbitrary. With the initial input audio signal 210 relative to reference level 205, the input audio signal varies above and below the reference 205 which in many embodiments may correspond to, for example 0 Volts. The input signal 210 comprises a peak 217 and a trough 218. In many embodiments trough 218 comprises a negative peak. The peak 217 and trough 218 may comprise a local peak and a local trough, respectively, for example.

In some embodiments of the invention, an input signal may have a voltage range from +1 to −1 without causing clipping of the output. In embodiments of the invention where the input signal is to a range of +1 to −1 volts, a small amplitude signal (e.g. a signal ranging in amplitude from approximately +0.1 to −0.1 volts) applied to the input of the pulse modulation circuitry 180 (e.g. a pulse wave modulator or pulse density modulator) will result in a duty cycle, without the adjustable bias, of about 50%. This duty cycle of about 50% results in greater power consumption than would be ideal for the amount of variation of the input audio signal 210.

In embodiments of the invention, a bias is applied to the input signal to ensure that the output of the pulse modulation circuitry accounts for both the positive and negative going amplitude peaks. In embodiments of the invention, this bias (e.g. reference level 205) may be a fixed bias and may be illustrated in, for Example FIG. 4A as having a reference value of 0.0. As this reference level is generally chosen to ensure that the largest input signal (e.g. a signal having positive and negative peak values of +1 and −1 volts) will not encounter clipping, it is generally chosen to be larger than required to prevent clipping of smaller input signals. For a small amplitude input signal, such as signal 210 in FIG. 4A, a smaller bias 220 can be combined with the input signal 210 to provide the biased input signal 212. The biased input signal 212 decreases the duty cycle of the pulses output from the pulse modulation circuitry 180. The biased input signal 212 can be offset by an amount sufficient to substantially decrease the duty cycle of light pulses in, for example, a laser driven by the output of drive circuitry 190. In some embodiments of the invention, a reference bias 205 may be reduced by, for example, 0.7 units, as illustrated in FIG. 4A, for a period of time during which the amplitude of an input signal 210 varies between a peak of approximately 0.1 units and −0.1 units.

Figure 4B:
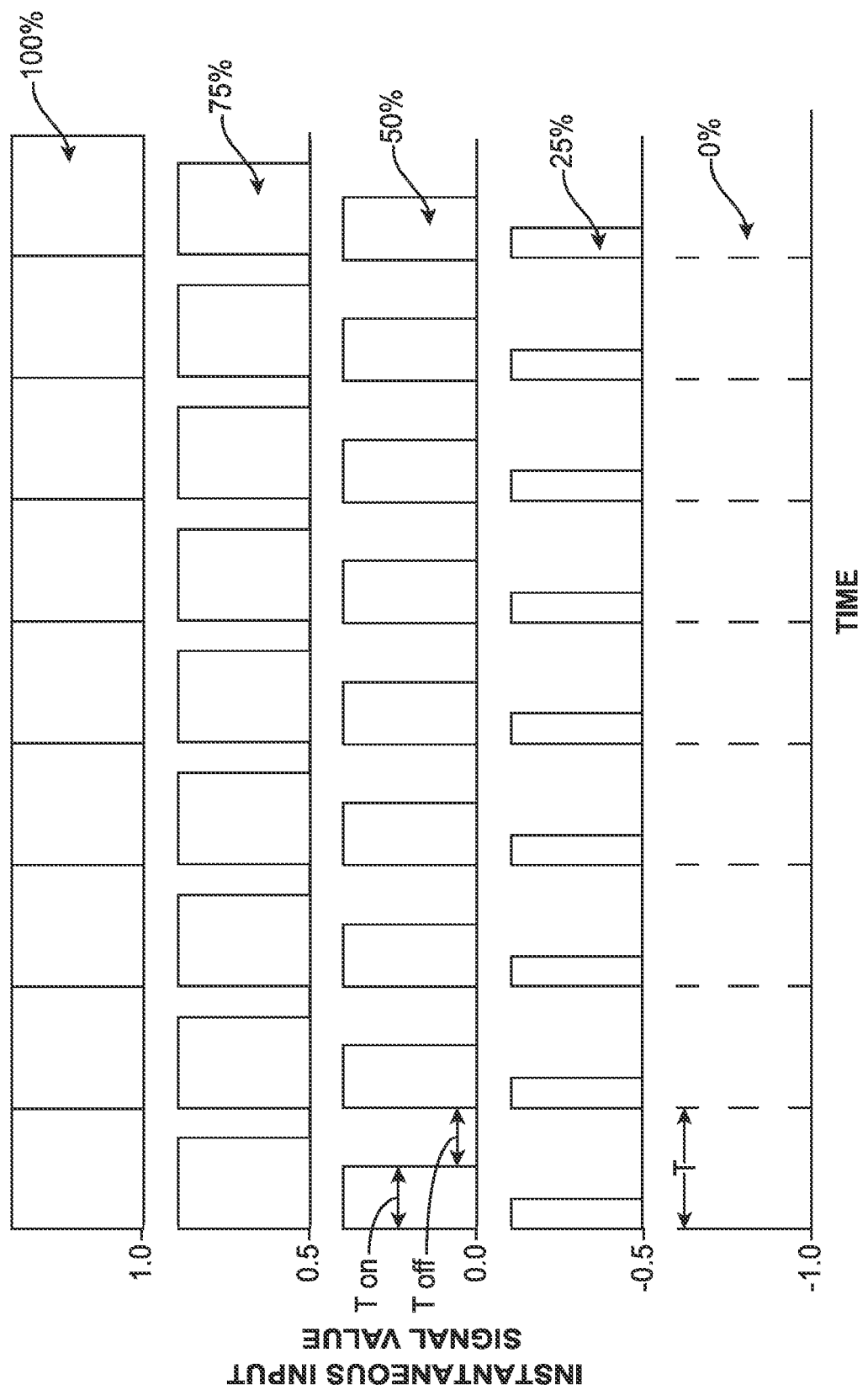
FIG. 4B shows modulated light pulses in accordance with the adjustable bias as described herein.

FIG. 4B shows pulse width modulated light pulses in a system where sliding bias has not been applied. In FIG. 4B, the instantaneous input signal value is shown from an arbitrary scale of −1 to +1. At a signal value of 0, the duty cycle of the pulse modulated signal is 50%. At signal values of −1, −0.5, +0.5 and 1, the duty cycle values are 0%, 25%, 75% and 100%, respectively. Each duty cycle comprises a period T, an on time Ton of the light source and an off time Toff of the light source. The duty cycle in percent can be defined as (Ton/T)*100. In a system such as that illustrated in FIG. 4B, a small signal, such as signal 210 from FIG. 4A would result in a duty cycle of between approximately 45% and 55%, a duty cycle which would result in the use of much more energy than would be required to actually transmit the information in signal 210. Thus, it would be advantageous to be reduce the duty cycle for signal 210 to a range of between approximately 0% and 10% to reduce the amount of energy required to transmit that signal. In some embodiments of the invention, that reduction may be accomplished through the use of a sliding bias by sensing, for example, minimum peaks of the incoming signal and modifying the amount of bias applied to reduce the duty cycle. In some embodiments of the invention, this may be done by, for example, modifying the duty cycle which is representative of the zero crossing of the incoming signal, such as, for example, reducing the duty cycle representative of a zero crossing from 50% as illustrated in FIG. 4B to approximately 10% for input signal 205 from FIG. 4A.

Although pulse width modulated signals are shown, the pulse modulated signal may comprise a pulse density modulated signal, or a pulse frequency modulated signal, for example. In many embodiments, the pulse modulated signal as described herein comprises a substantially fixed amplitude in order to inhibit effects of non-linearities of the optical sound transmission system components such one or more of the light source, the photodetector or the output transducer, for example.

Figure 4C:
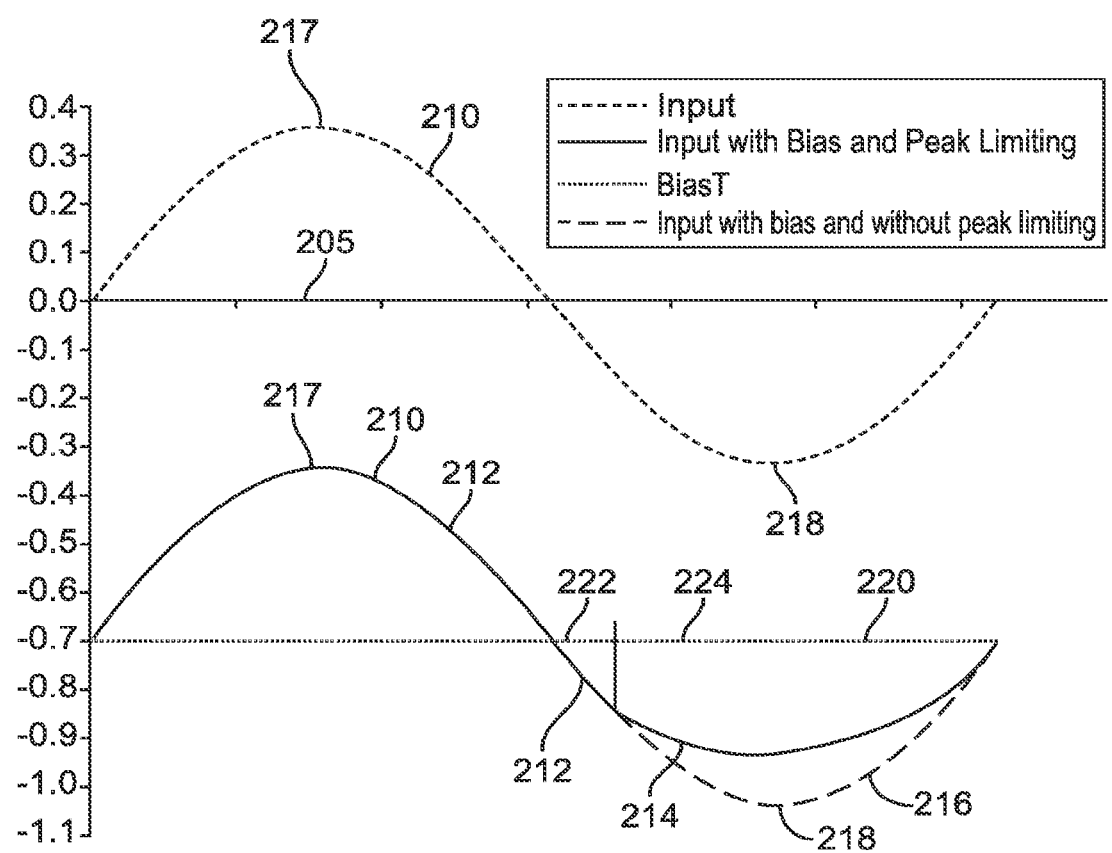
FIG. 4C shows an increased amplitude input signal with the bias of FIG. 4A and peak limiting, in accordance with embodiments.

FIG. 4C shows an increased amplitude of input signal 210 with the adjustable 220 bias of FIG. 4A and peak limiting. In the upper graph, Signal 210 is shown in relation to input reference 205. In this embodiment, clipping of signal 210 occurs when signal 201 exceeds an amplitude of +1.0 or −1.0, therefore, any applied bias must account for those clipping limits. It would, however, be advantageous to lower the applied bias represented by reference 205, in order to save energy. In the lower graph of FIG. 4C, bias 220, which is lower than reference bias 205 by approximately −0.7 units, is applied to signal 210 in order to provide biased signal 212. Unfortunately, as the negative peak of signal 210 is now at approximately −1.05 units, that peak will be clipped if it is not adjusted. Adjustments to the sliding bias which occur quickly (e.g. in response to changes in amplitude) may, in some embodiments, result in undesirable user perceptible noise. In some embodiments of the invention, the clipping illustrated in the lower graph of FIG. 4C may, therefore, be addressed by adjusting the gain of the system to ensure that the signal is not clipped.

The bias 220 comprises a fixed portion 222 having a substantially fixed value and a variable portion 224 comprising a gradually changing value. The gradually changing value is varied sufficiently slowly so as to inhibit user perceptible noise. However, slowly varying the bias may result in clipping of the signal until the sliding bias reaches a level at which clipping no longer occurs.

Alternatively or in combination with the adjustment to bias 220 with variable portion 224, the amplitude of signal 210 can be adjusted in order to inhibit clipping of the biased input signal 212. In many embodiments, the adjustment to the amplitude of signal 210 is provided much more rapidly than the adjustment to the bias. In embodiments of the Invention, reduction of the system gain will result in reducing or eliminating clipping of signal 210 until the bias can be adjusted to avoid such clipping, which may take several cycles of signal 210. Once the bias is adjusted sufficiently to avoid clipping, the system gain may be restored to its original value The adjustment to the gain can be determined with a look ahead delay as described herein below with reference to FIG. 6A. Although FIG. 4C shows the change to the gain over a portion of the signal for the convenience of illustration, the change to the gain can occur over several positive and negative oscillations of the sliding bias signal as described herein.

In many embodiments, the bias adjustment comprises a steady mode in which the bias remains substantially fixed and maintained at an appropriate value to, for example, minimize energy consumption. In some embodiments of the present invention, when the system detects a signal wherein the negative going peak will exceed the system limit, the sliding bias enters an attack mode, in which the bias is increased (in some embodiments an increase in sliding bias makes it less negative). In some embodiments of the invention, where the system detects that the bias may be reduced without causing clipping, the sliding bias enters a release mode in which the bias is decreased, which, in some embodiments will result in a reduction of duty cycle in the output signal.

The gain and corresponding amplitude of the signal can be adjusted in a manner similar to the bias as described herein, and can be adjusted more quickly without substantial user perceptible artifacts, for example. In many embodiments, the adjustment to the system gain inhibits user perceptible clipping of the signal which may otherwise occur when the biased signal exceeds the lower range limit. By inhibiting the biased signal from reaching a value more negative than the negative limit of the circuitry, while reducing the sliding bias to a minimum value, improved sound quality with decreased distortion and power consumption can be provided.

Figure 5A:
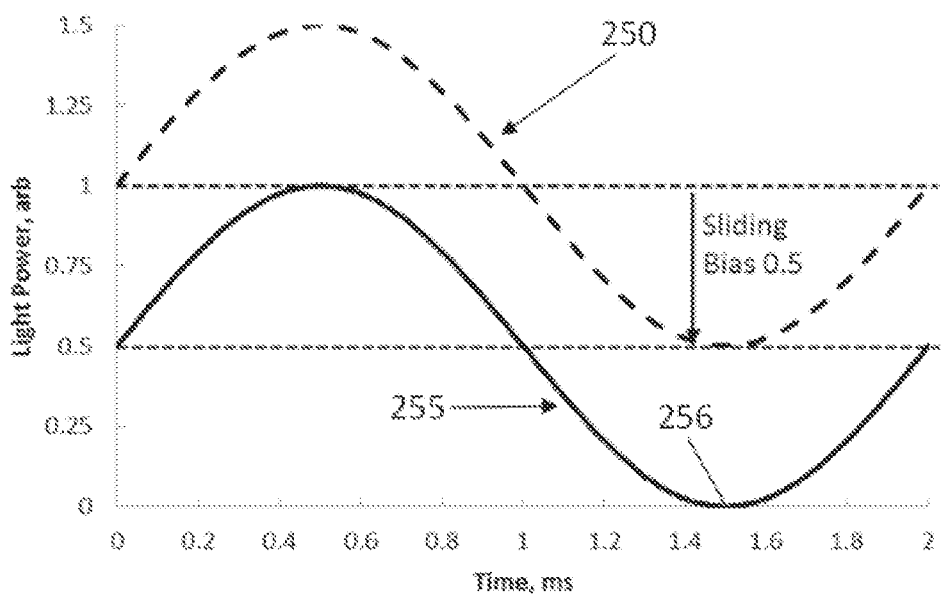
FIGS. 5A and 5B show light power curves with a fixed bias, and a sliding bias to improve sound quality and substantially decrease power consumption, in accordance with embodiments.
Figure 5B:
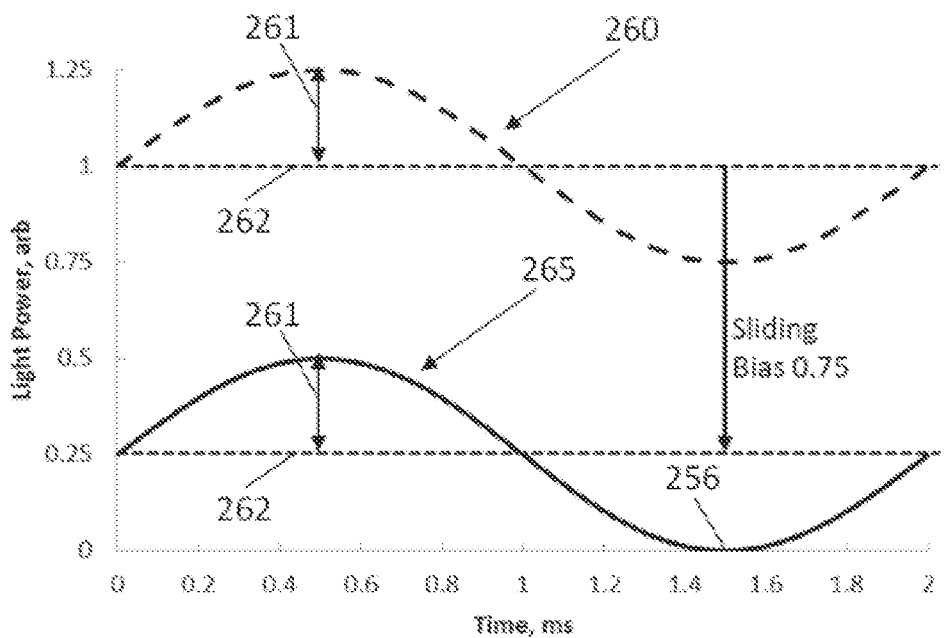

FIGS. 5A and 5B show light power curves biased to substantially decrease power consumption. The system of FIGS. 5A and 5B are designed to accommodate an output signal having a maximum peak to peak amplitude of +2.0 units without clipping. The bias applied to a large amplitude signal is, therefore, approximately +1.0 units. FIG. 5A shows the power curve 250 of an input signal of medium amplitude with a bias of +1.0 units but without sliding bias applied. The fixed bias of power curve 250 provides improved signal quality and can accommodate negative voltage of an input signal such as a microphone. A sliding bias of −0.5 is shown applied to the fixed bias signal, reducing the bias applied to 0.5 units and producing a sliding biased signal 255. The sliding bias may be adjusted so that the trough (or negative peak) 256 of the signal to which the sliding bias has been applied is at or near zero power. This configuration allows the bias (and output power) to be substantially decreased when the signal to be transmitted is smaller than the maximum signal the system can transmit with clipping. In embodiments of the invention, the sliding bias is used to decrease the applied bias to a value which reduces output power consumed while preventing clipping of the output signal. FIG. 5B shows another example, in which a larger sliding bias adjustment is used to shift the bias applied to a small-amplitude signal. In this case, the power curve of signal 260 starts with a bias of +1.0. Since the peak to peak amplitude of signal 260 is approximately 0.5, −0.75 may be chosen, corresponding to the difference between the amplitude and the offset of the input signal. This results in a sliding-biased signal 256 with a bias of 0.25, so that its trough 256 is substantially decreased at or near zero power and is not clipped.

The input signal may comprise an unbiased input audio signal or a biased input audio signal. The fixed bias as described herein can be introduced to the input signal in many ways. For example an input analog audio signal from a microphone may have an input range from −1 to +1 (arbitrary), and the analog to digital converter can be configured to digitize the input analog signal such that the digitized values are positive, for example from 0 to 2 (arbitrary). Alternatively, the analog to digital converter may convert the analog values to a digital range from −1 to +1, and a fixed bias of 1.0 introduced to the digitized values with addition, for example, such that the digitized values range from 0 to 2, for example. The fixed bias may comprise a fixed bias of an input digital audio signal from an external source such as music from a digital library or a cellular phone, for example. Alternatively or in combination, the processor can be configured with instructions to provide a fixed bias to the input digital audio signal, for example.

The curves shown in FIGS. 5A and 5B can be generated with the fixed bias and sliding bias output as described herein provided to an analog amplifier such as a class B amplifier. The sliding bias can be provided in order to provide decreased power consumption as a result of a decrease in the bias during periods where a maximum bias is not required.

Figure 5C:
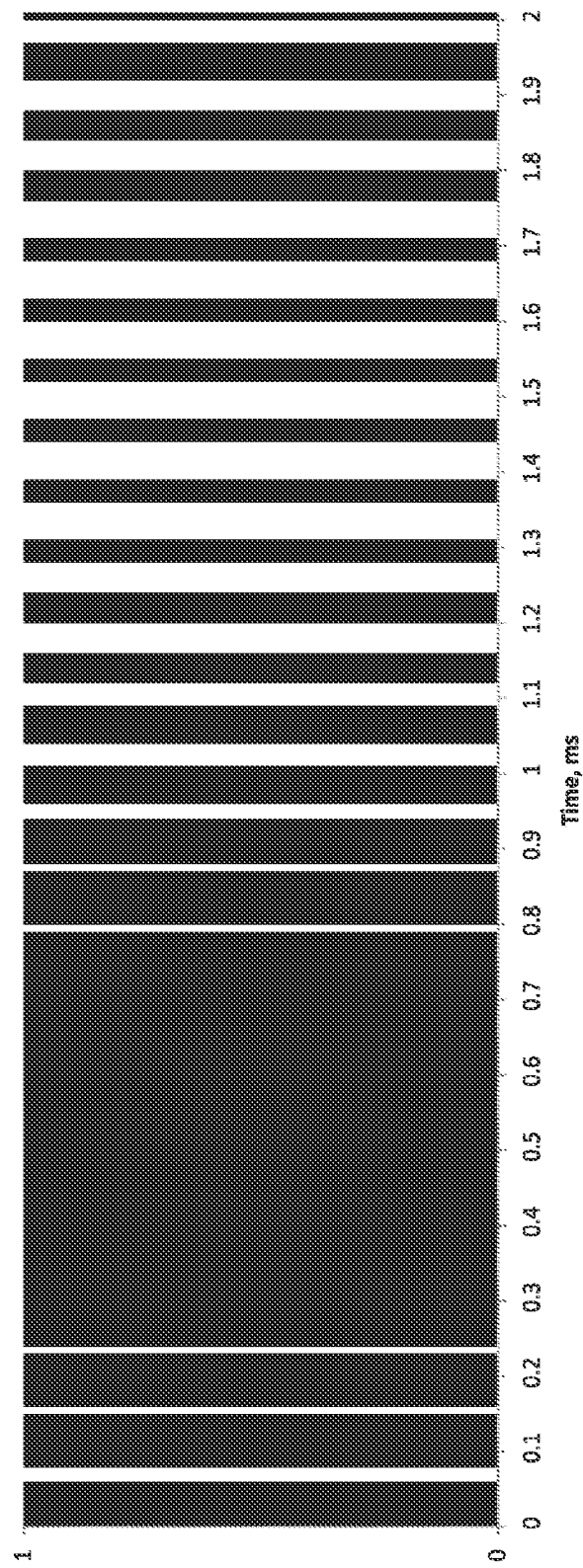
FIG. 5C shows an encoding of the fixed bias curve of FIG. 5A, using pulse width modulation, in accordance with embodiments.

FIG. 5C shows an encoding of the fixed bias curve 250 of FIG. 5A, using pulse width modulation (PWM). Black bars illustrate time periods in which light is on, and white bars illustrate time periods in which light is off. In this example, a clock rate of 12.5 kHz is used, with minimum pulse width of 10 microseconds, allowing a pulse width variable from 0 to 80 microseconds in 10 microsecond increments. Higher clock rates and smaller minimum pulse widths than illustrated may be chosen to allow higher-resolution signal transmission.

Figure 5D:
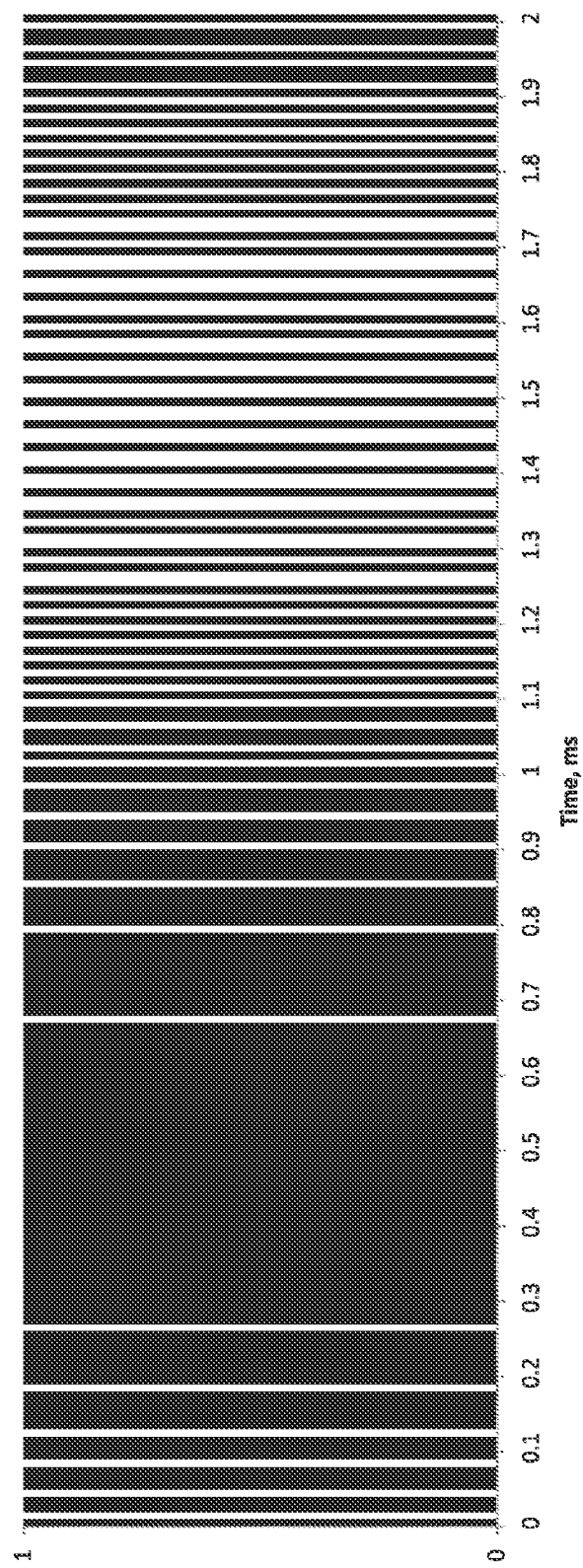
FIG. 5D shows an encoding of the fixed bias curve of FIG. 5A, using pulse density modulation, in accordance with embodiments.

FIG. 5D shows an encoding of the fixed bias curve 250 of FIG. 5A, using pulse density modulation (PDM). Black bars illustrate time periods in which light is on, and white bars illustrate time periods in which light is off. In this example, a clock rate of 100 kHz is used, corresponding to a minimum pulse width of 10 microseconds. Higher clock rates and smaller minimum pulse widths than illustrated may be chosen to allow higher-resolution signal transmission.

Figure 5E:
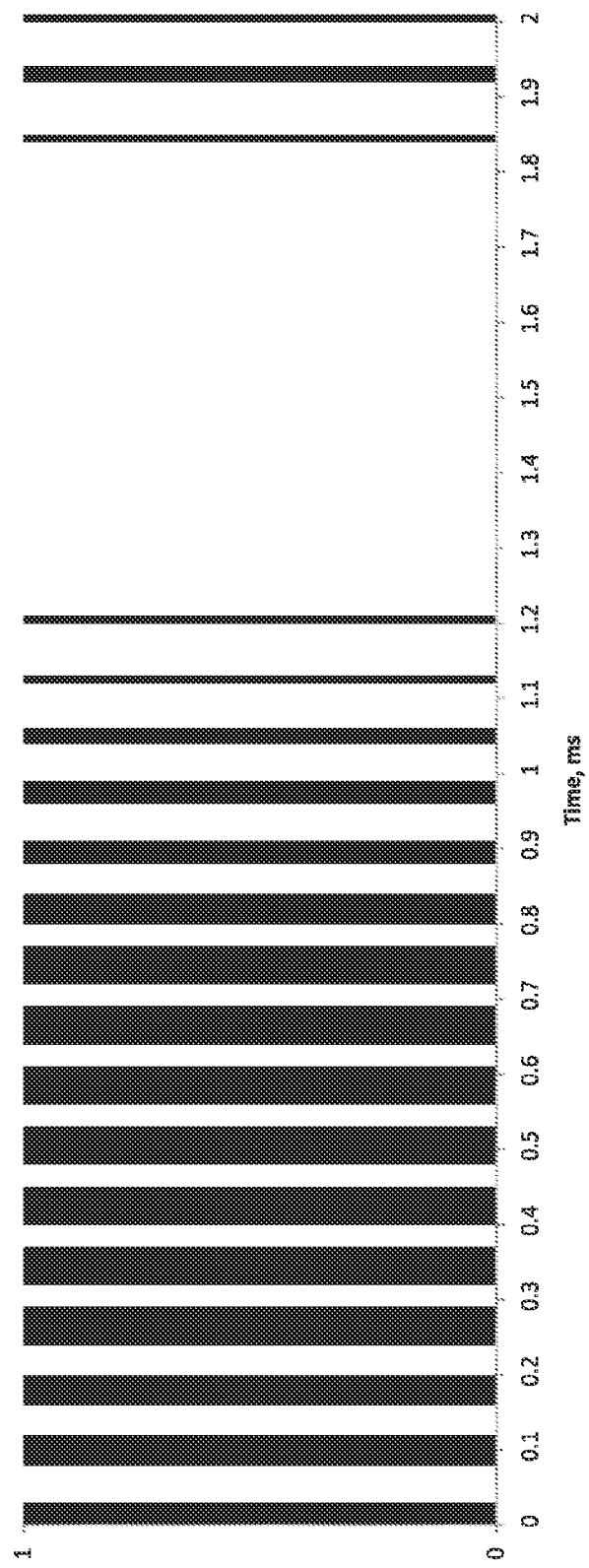
FIG. 5E shows an encoding of the sliding bias curve of FIG. 5A, using pulse width modulation, in accordance with embodiments.

FIG. 5E shows an encoding of the sliding biased curve 255 of FIG. 5A, using PWM. Black bars illustrate time periods in which light is on, and white bars illustrate time periods in which light is off. In this example, a clock rate of 12.5 kHz is used, with minimum pulse width of 10 microseconds, allowing a pulse width variable from 0 to 80 microseconds in 10 microsecond increments. Higher clock rates and smaller minimum pulse widths than illustrated may be chosen to allow higher-resolution signal transmission. In comparison with FIG. 5C, the encoding of FIG. 5E has a lower duty cycle, as shown by the smaller amount of black signal, illustrating that less light power is needed to transmit the signal of sliding bias curve 255 than of fixed biased curve 250. The lower duty cycle provides substantially decreased power consumption.

Figure 5F:
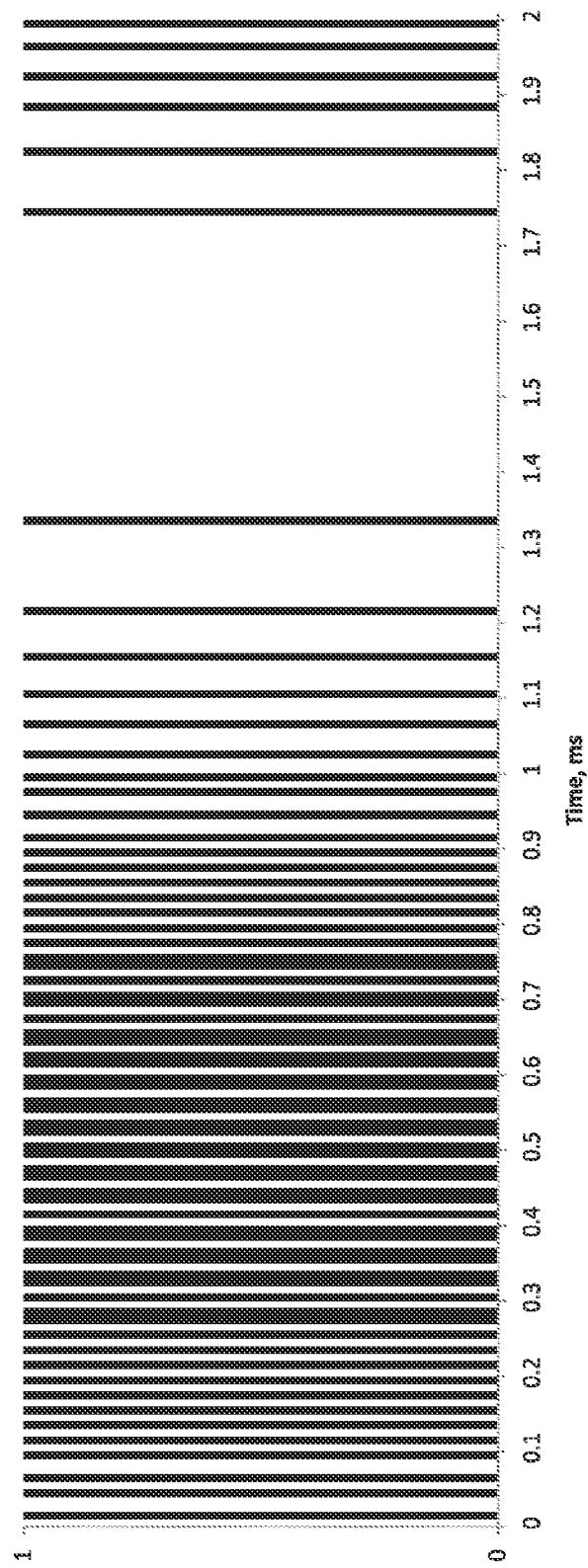
FIG. 5F shows an encoding of the sliding bias curve of FIG. 5A, using pulse density modulation, in accordance with embodiments.

FIG. 5F shows an encoding of the sliding biased curve 255 of FIG. 5A, using PDM. Black bars illustrate time periods in which light is on, and white bars illustrate time periods in which light is off. In this example, a clock rate of 100 kHz is used, corresponding to a minimum pulse width of 10 microseconds. Higher clock rates and smaller minimum pulse widths than illustrated may be chosen to allow higher-resolution signal transmission. In comparison with FIG. 5D, the encoding of FIG. 5F has a lower duty cycle, as shown by the smaller amount of black signal, illustrating that less light power is needed to transmit the signal of sliding bias curve 255 than of fixed biased curve 250. The decreased duty cycle and pulse density provides decreased power consumption.

The light source such as a laser may comprise the most significant source of power consumption with an optical hearing system, and the power drawn by the laser is often proportional to the signal offset. Therefore, applying a large sliding bias so that the signal comes close to clipping is helpful for reducing power consumption and extending battery life.

Figure 6A:
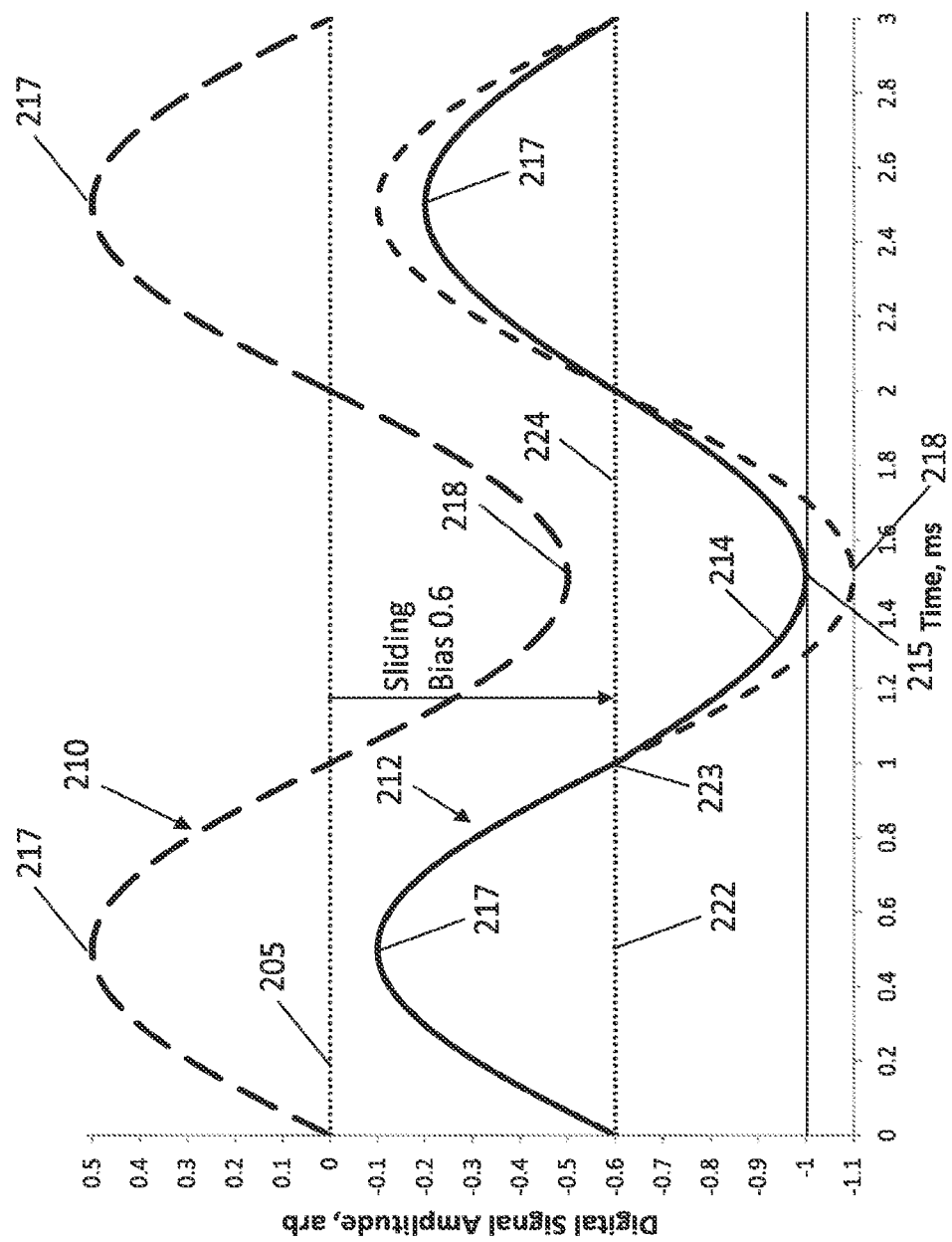
FIG. 6A shows amplitude of a digital input signal, adjusted with sliding bias and peak limiting to inhibit clipping, in accordance with embodiments.

In some cases, when biasing a signal to reduce power consumption, it may be desirable, as discussed earlier, to adjust the signal gain dynamically, for example by peak limiting. Peak limiting may be useful to inhibit clipping. FIG. 6A shows amplitude of an input signal, such as a digital input signal, with sliding bias and peak limiting to inhibit clipping. An input signal 210 is shown in relation to input reference 205 corresponding to a peak-to-peak signal amplitude of 1.0 (arbitrary). The input reference 205 corresponds to a middle of the input signal range, and may correspond to an average value of a fixed bias input signal as described herein. The reference level 205 may correspond to 0 volts of an input such as a microphone as described herein, for example. The signal 210 comprises positive peaks 217 and a negative peak comprising trough 218 at signal amplitudes of about 0.5 and −0.5, respectively. Although reference is made to sine waves by wave of example, the embodiments disclosed herein are well suited with many types of input sound, including asymmetric sound having different positive and negative maximum intensities in relation to input reference 205.

As shown in FIG. 6A, a sliding bias of −0.6 units is applied to input signal 210, generating a sliding-biased signal 212 with peaks 217 at a signal levels of about −0.1 units. For a substantial of the portion of time 222, signal 212 is small enough that the sliding bias of −0.6 does not result in any clipping and the system gain may be maintained at a constant level. However, an increase in signal 212 may result in the negative peak being clipped absent a modification of the bias level and/or system gain. In the event that the increase in signal level happens faster than the bias can be increased without causing negative audio artifacts, the system gain may be dynamically adjusted, so that the trough 215 of the biased signal 212 is higher than the unadjusted trough 218. This gain adjustment ensures that clipping of the negative peaks does not occur and results in a signal 214 with a peak negative magnitude of no greater than −1.0. After reducing the system gain, the positive peak value 217 of the sliding biased curve is reduced as well, such that the sliding-biased curve has a lower peak to peak amplitude of about 0.8 units. Dynamically adjusting the biased signal in this manner inhibits negative clipping, thus decreasing distortion of the signal. Once the sliding bias is adjusted to a point where clipping no longer occurs, the system gain may be restored to its optimum value. The adjustment to the bias during time period 224 may be applied gradually, including over a period of multiple wavelengths, so that the bias remains substantially fixed when the system gain is reduced in order to inhibit user perceptible noise related to the change in bias. The processor may comprise instructions to decrease the gain over a duration no more than a length of a look ahead delay, such that bias remains substantially fixed to within about five percent (5%) over the length of the look ahead delay, for example.

Figure 6B:
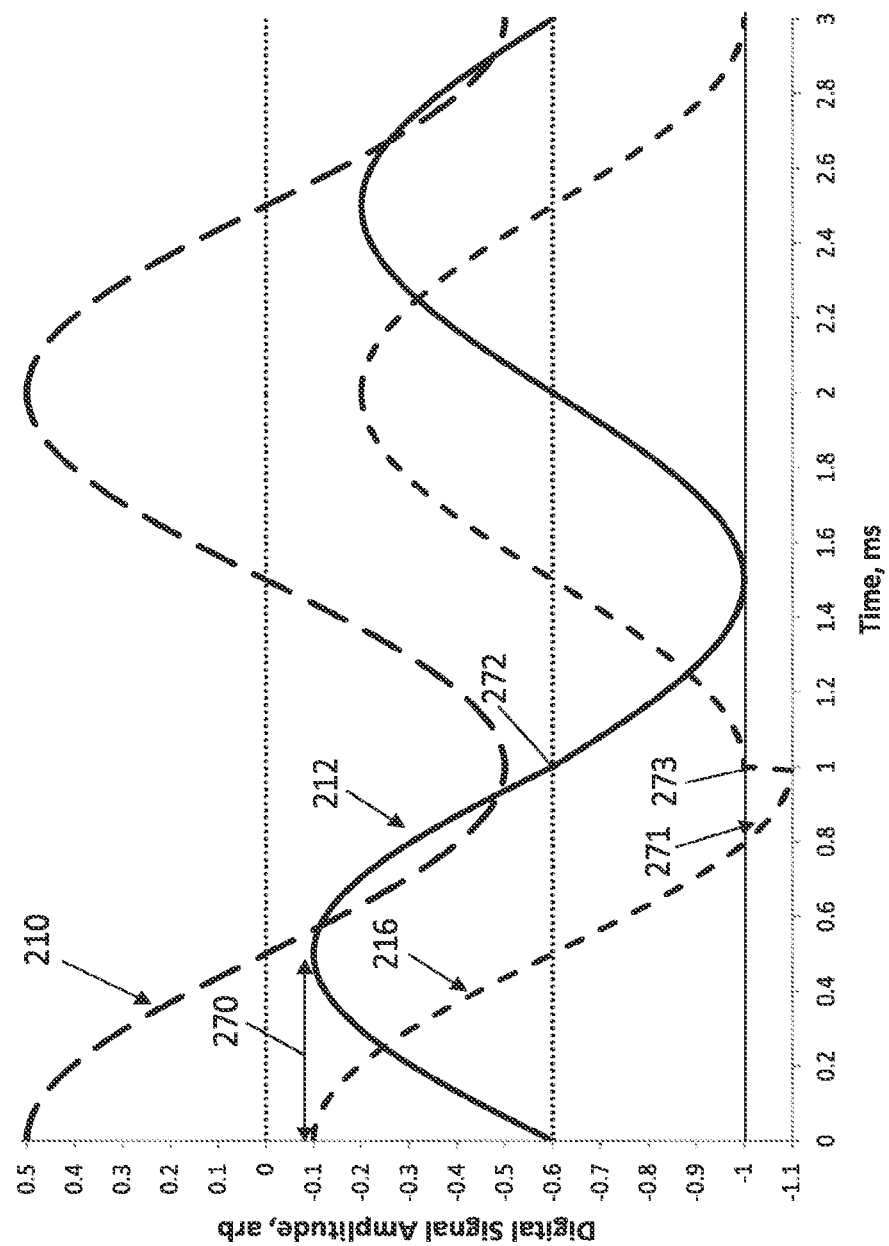
FIG. 6B shows a look-ahead delay used to determine a change in gain, in accordance with embodiments.

FIG. 6B shows how a look-ahead delay may be employed to determine when a change in gain is needed. In FIG. 6B, a sliding-bias of approximately −0.6 units is applied to an input signal 210 to generate a sliding-biased signal 212. In the embodiment illustrated in FIG. 6B, the system has applied a look ahead delay 270 such that the output signal is delayed by a fixed period in order to modify that output in the event that the input signal changes in a manner which requires the output signal to be modified to maintain, for example, sound quality. The look-ahead delay as illustrated is about 0.5 ms, or about one quarter of a wavelength, but different look-ahead delays, including longer look-ahead delays of about 1 ms, about 2 ms, or longer than 2 ms may be chosen to provide more time to react to amplitude changes. The look-ahead delay 270 allows the generation of a prediction 216 of the value that the sliding-biased signal 212 is expected to take after the look-ahead delay. When the prediction 216 is measured to fall below a threshold value, resulting in a predicted clipping 271, a shift in signal gain is triggered. In some cases, the shift in signal gain may not immediately cause a significant change in the amplitude of the sliding-biased signal 212, but it may change the slope 272. Although the change in the sliding-biased signal may be gradual, the change in gain may cause a rapid change 273 in the predicted value 216, because the predicted value 216 reflects the accumulation of the effect of the shifted gain over the time period of the look-ahead delay 272. As a result, the sliding-biased signal 212 may be adjusted to inhibit clipping. The amount of gain adjustment can be determined in order to prevent the predicted curve 216 from clipping. The gain adjustment may be applied at different rates depending on the amount of look-ahead delay used. In some cases the gain may be adjusted gradually in response to a predicted clipping, for example in response to a growing area of predicted clipping 271. In such cases, the change 273 may be much more gradual than illustrated in FIG. 6B, and in some cases the change may be spread over much or all of the look-ahead delay 270, which may in some cases constitute one or more milliseconds, for example. This slower shift may have the benefit of inhibiting acoustic artifacts and distortions.

Figure 6C:
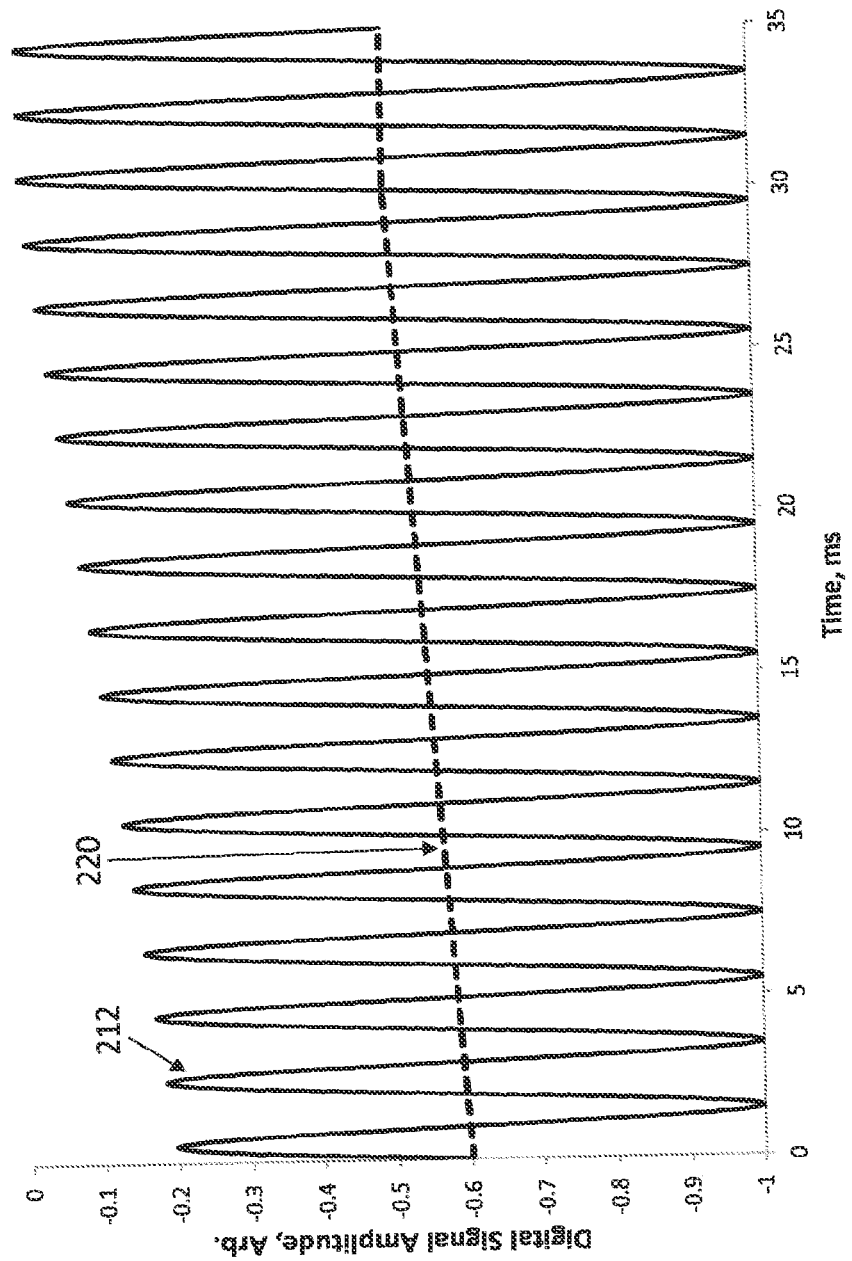
FIG. 6C shows the adjustment of a sliding bias and gain over time, in accordance with embodiments.

After a shift in gain, the amplitude of the sliding-biased signal will be reduced. To allow the amplitude to be restored without clipping, the sliding bias may be gradually adjusted. FIG. 6C shows the adjustment of a sliding bias over time. An input signal (not shown) with amplitude of about 0.5 is initially biased with a sliding bias 220 of about 0.6 in a negative direction to produce a sliding-biased curve 212. To inhibit clipping, the gain applied to sliding-biased curve 212 is reduced, resulting in an amplitude of about 0.4. In order to return to the correct value of amplitude, the sliding bias 220 is gradually adjusted from 0.6 to 0.5. During the same time, the gain is smoothly adjusted back up, increasing the amplitude of the signal along with the shift in bias. This smooth adjustment may keep the troughs of the sliding-biased curve 212 at or near a lower threshold value, allowing the signal amplitude to be increased without clipping. After the sliding bias 220 reaches about 0.5, and the gain has returned to normal, giving an amplitude 0.5, the adjustment stops and the gain and bias may remain constant until another change is appropriate as described herein. While FIG. 6C shows a linear change in bias over about 30 ms, in some cases the bias may be shifted nonlinearly and/or over shorter or longer timescales, for example to inhibit audio artifacts such as thumping.

Sliding Bias

The sliding bias as described herein applies a time-varying bias that adjusts to changes in the signal amplitude. When amplitude is low, the magnitude of the bias is increased to save power. The bias as described herein may comprise a negative number added to the signal, and the value of the bias can be decreased to save power with low energy input signals. When input sound amplitude is high, the magnitude of the bias is adjusted to inhibit clipping, for example by increasing the value of the bias to a less negative number. By dynamically varying the bias, power consumption can be significantly reduced and a high fidelity signal transmitted.

The methods and apparatus disclosed herein provide a signal processing algorithm for sliding bias that can be implemented in the digital signal processor (DSP) of an optical sound system. The processor embodies instructions of an algorithm that adjusts the bias by adding a time-varying offset to the digital signal before it is sent to the digital-to-analog converter (DAC). The digital to analog converter may comprise a digital to analog converter that converts a digital value to an output voltage. The digitally biased signal can be output from the DAC to an amplifier such as class B amplifier to drive the light sourced with an analog signal. Alternatively, the DAC may comprise delta sigma modulation circuitry. The output of the delta sigma modulation circuitry can be used to drive the light source with a digital signal, such as PWM or PDM, for example. The output of the sliding bias algorithm as disclosed herein may comprise the last element in the signal processing chain so that it provides output signal to the DAC to generate the light signal with appropriate amplification.

Signals can be represented in the DSP as fractional digital values in the range from −1 to +1, for example. The DAC comprising delta sigma modulation circuitry maps −1 to a pulse density of 0%, 0 to a pulse density of 50%, and +1 to a pulse density of 100%, for example. In many cases, the offset added by the sliding bias algorithm is in the range −1 to 0, in order to decrease power consumption.

The sliding bias algorithm as described herein is not limited to the modulation scheme that is used to represent the signal with light. The algorithm and circuitry as described herein are effective for analog, delta sigma modulation, PDM, pulse width modulation, and many other approaches, for example.

Inhibiting Sliding Bias Artifacts

The sliding bias algorithm as described herein has the advantage of significantly decreasing power consumption in order to prolong battery life. However, this advantage is preferably achieved without introducing audio artifacts. There are at least three types of artifacts which can be inhibited with the methods and apparatus as disclosed herein:

1. Clipping. If the bias is inadequate to accommodate the signal range at any moment, the signal may clip, producing potentially audible distortion which can be inhibited with adjustments to the signal gain.
2. Thumping. The time varying bias as described herein is a signal that is added to the input signal, and this signal is introduced in a manner that is substantially inaudible. If the bias is shifted too rapidly, it approaches a step function and may become audible. This rapid change in bias can be referred to as "thumping". Because a step function comprises a predominantly low-frequency signal, the user can perceive a rapid change in bias as a thump. Work in relation to embodiments suggests that the low-frequency rolloff of the output transducer assembly that receives transmitted optical power and signal, such as the tympanic membrane transducer assembly, may help to reduce the audibility of the bias shift. A person of ordinary skill in the art can conduct experiments to determine times over which the bias can be adjusted in order to inhibit user perceptible thumping in accordance with embodiments disclosed herein.

3. Noise. Due to nonlinearities of one or more of the DAC, laser driver circuitry, laser, or other components, user perceptible noise could potentially be introduced. The sliding bias as disclosed herein can be configured to inhibit noise that might otherwise be present with a low amplitude signal. For example, the noise may rise slightly as sliding bias approaches the lower end of the input range, for example below about −0.9. The algorithm can optionally limit the sliding bias values to a predetermined minimum amount, for example no lower than about −0.9. Work in relation to embodiments suggests that suitable delta sigma modulation circuitry can be provided that does not introduce distortion with low amplitude signals, and limiting of the sliding bias as described herein may not be helpful in at least some embodiments.

Peak Limiting

The circuitry as disclosed herein can be configured to inhibit clipping without producing audible thumping. Peak limiting as disclosed herein can be used to inhibit clipping with adjustments to the gain.

Clipping may occur if a high-amplitude signal arrives when the bias is low. In order to inhibit clipping, a look ahead delay can be provided in order to shift the bias up in advance of the arrival of the high-amplitude signal. However, the look ahead delay may not provide sufficient time to adjust the bias for a rapidly decreasing signal, and peak limiting can be provided to inhibit clipping of rapidly decreasing signals.

With a rapidly changing signal, the length of the look ahead delay may not be sufficient to allow the bias to change slowly in order to inhibit a user perceptible thump. Work in relation to embodiments suggests that a full-range bias shift applied over a duration of less than about 20-50 ms may produce an audible thump. Therefore, peak limiting can be employed to inhibit clipping while allowing the bias to be changed sufficiently slowly to inhibit thumping.

Limitations of the look ahead delay can be overcome by providing peak limiting with the sliding bias algorithm. An approach to peak limiting is to apply a rapid gain reduction just before the peak and to restore the gain just after the peak, for example as shown above with reference FIGS. 4C and 6. The advantages of combining peak limiting and sliding bias are that a rapid gain change is less likely to create a user perceivable artifact, and peak limiting allows a shorter look ahead delay to be used with the sliding bias.

The sliding bias and peak limiting algorithms can be combined in many ways. A short look ahead delay of a few milliseconds can used to identify a peak that would otherwise be clipped by the low bias and initiate the rapid gain reduction that is helpful to limit the peak sufficiently to inhibit clipping. At about the same time, a slow bias increase can be initiated to accommodate higher positive and negative peaks of the input signal. The gain may then be slowly increased as the bias increases, until full gain is restored. Alternatively or in combination, the gain may be rapidly restored in response to a negative signal rising above a threshold as described herein, depending on the amplitude of the input signal and how rapidly the input signal changes.

Although peak limiting may be considered a form of artifact, peak limiting combined with the sliding is likely to less likely to be apparent to the user than clipping. The digital peak limiting on the lower peak, has the advantage of being less perceivable and can produce less artifact than rapidly increasing the bias, for example.

Implementation of the Algorithm

Bias Calculation and Updating

In many implementations, the sliding bias algorithm operates by tracking the negative-going peak of the signal and applying a bias that is as negative as possible without causing the negative-going signal peak to drop below the clipping level of −1. If the negative-going signal peak is M, the most negative bias that can be applied is −1−M.

Several additional constraints may be imposed on the bias value:

An extra margin against clipping may be imposed. This is an algorithm parameter ε, referred to as the "bias margin". With the margin imposed, the most negative bias is ε−1−M rather than −1−M. Work in relation to embodiments suggests that a bias margin within a range from about 0.05 to about 0.15, for example 0.1, can be useful for decreasing distortion. A bias margin can be similarly employed with analog systems and delta sigma modulation systems, for example.

A lower boundary may be imposed on the range of the bias value. This lower bound is an algorithm parameter $B_{min}$, referred to as the "most negative allowed bias". The most negative allowed bias can be used to avoid bias values that unacceptably elevate the noise floor.

An upper bound at the middle of the input signal range, such as 0, can be imposed on the range of the bias value, in order to prevent the bias margin from pushing the bias into positive territory.

In many implementations, the algorithm uses a linear trajectory to shift the bias, although non-linear trajectories can be used. The term "attack" refers to shifting the bias up to prevent clipping when the signal amplitude rises, and the term "release" refers to shifting the bias down to save power when the signal amplitude falls. The slopes of the linear trajectories can be determined by algorithm parameters $SBS_A$ (sliding bias attack slope) and $SBS_R$ (sliding bias release slope), both specified in units of samples$^{-1}$.

In many implementations, the algorithm has three bias-related state variables:

The "current bias" ($B_C$) is the bias value that is being applied at any instant.

The "target bias" ($B_T$) is the endpoint of the bias-shifting trajectory.

The "sliding bias mode" (SBMode) is the mode of operation, which may be Attack, Release, or Steady. In Attack mode, the bias is shifting up. In Release mode, the bias is shifting down. In Steady mode, the bias is held steady for a period of time while the negative-going peak of the signal is monitored. The duration of Steady mode is an algorithm parameter D, referred to as the "steady duration", in samples.

The algorithm can be initialized as follows:

$B_C$=0

$B_T$=−1

SBMode=Steady

While in Steady mode, the algorithm monitors the signal and sets $B_T$=ε−1−M, where M is the most negative observed signal value. $B_T$ is constrained to the range from $B_{min}$ to 0.

Steady mode is exited if either of the following conditions occur:
- If the steady duration D is exhausted, Release mode is entered.
- If $B_T > B_C$, Attack mode is entered.

While in Attack mode, $B_C$ is incremented by $SBS_A$ until it reaches $B_T$, at which point Steady mode is entered. During this process, $B_T$ is updated if a signal value is observed that requires $B_T$ to be set to a higher value.

While in Release mode, $B_C$ is decremented by $SBS_R$ until it reaches $B_T$, at which point Steady mode is entered. During this process, if a signal value is observed that requires $B_T > B_C$, Attack mode is entered.

Peak Limiting

The peak limiting algorithm may begin by calculating a peak limiting threshold, which is the largest negative-going peak signal magnitude in dB in relation to full-scale that can be accommodated by the current bias value $B_C$ without clipping. The peak limiting threshold is defined as $T = 20 \log_{10}(B_C + 1)$. The integration between the sliding bias and peak limiting algorithms is configured such that the peak limiting threshold depends on the current bias value.

Next, the algorithm calculates the amount in dB by which the negative-going peak signal magnitude exceeds the peak limiting threshold. If M is the negative-going signal peak, then the exceedance may be calculated as $E = 20 \log_{10}(-M) - T$. E is set to 0 if $M \geq 0$, and E is constrained to be $\geq 0$ to prevent negative exceedance.

Finally, the algorithm applies a time-varying gain as required to compensate for exceedance and prevent clipping. When exceedance occurs (i.e., $E > 0$), the gain is gradually reduced to $-E$ dB before the peak and gradually restored. A look ahead delay is employed to detect exceedance in advance so that the gain change can be initiated in time to prevent clipping. The look ahead delay is an algorithm parameter $\Delta$ (also referred to herein as "look ahead time delay"), in samples.

The gain change trajectory may be linear in dB. Within the peak limiting algorithm, the term "attack" refers to reducing the gain and "release" refers to increasing the gain. The slopes of the gain trajectories can be determined by algorithm parameters $PLS_A$ (peak limiting attack slope) and $PLS_R$ (peak limiting release slope), both specified in units of dB/sample.

The algorithm has three peak-limiting-related state variables:
- The "current gain" ($G_C$) is the gain value that is being applied at any instant.
- The "target gain" ($G_T$) is the endpoint of the gain-shifting trajectory.
- The "peak limiting mode" (PLMode) is the mode of operation, which may be Attack, Release, or Steady. In Attack mode, the gain is falling. In Release mode, the gain is rising. In Steady mode, the gain is held steady for a period of time while the exceedance is monitored. The duration of Steady mode is the look ahead delay $\Delta$.

The algorithm is initialized as follows:
$G_C = 0$
$G_T = 0$
PLMode = Steady

While in Steady mode, the algorithm monitors the exceedance E and sets $G_T = -E$. Steady mode is exited if either of the following conditions occurs:
- If the time spent in Steady mode exceeds the look ahead delay $\Delta$, Release mode is entered.
- If $G_T < G_C$, Attack mode is entered.

While in Attack mode, $G_C$ is decremented by $PLS_A$ until it reaches $G_T$, at which point Steady mode is entered. During this process, $G_T$ is updated if an exceedance is observed that requires $G_T$ to be set to a lower value.

While in Release mode, $G_C$ is incremented by $PLS_R$ until it reaches $G_T$, at which point Steady mode is entered. During this process, if an exceedance is observed that requires $G_T < G_C$, Attack mode is entered.

Parameter Selection

While the parameters can be selected in many ways and may comprise many values, this section provides non-limiting examples of considerations for selecting values of the algorithm parameters.

In the following, R represents the system sampling rate, in Hz.

The algorithm parameters are summarized in the following table.

| Parameter | Symbol | Units |
|---|---|---|
| Bias margin | $\varepsilon$ | unitless |
| Most negative allowed bias | $B_{min}$ | unitless |
| Sliding bias steady mode duration | D | samples |
| Sliding bias attack slope | $SBS_A$ | samples$^{-1}$ |
| Sliding bias release slope | $SBS_R$ | samples$^{-1}$ |
| Peak limiting attack slope | $PLS_A$ | dB/sample |
| Peak limiting release slope | $PLS_R$ | dB/sample |
| Look ahead delay | $\Delta$ | samples |

Ideally, $\varepsilon$ should be set to 0 to substantially decrease power consumption. However, setting the bias so low that negative-going peaks are at the digital rail can produce distortion, possibly related to the noise floor and associated circuitry as disclosed herein. The value for $\varepsilon$ should be set to the minimum value that prevents such distortion. Work in relation to embodiments suggests that E with in a range from about 0.05 to about 0.2, for example equal to 0.1 can provide acceptable results. A distortion analysis can be performed by a person of ordinary skill in the art in order to choose an appropriate value.

$B_{min}$ can be set as negative as possible, to substantially decrease power consumption, but high enough to substantially avoid bias values that unacceptably elevate noise. A system noise analysis can be performed by a person of ordinary skill in the art in order to choose an appropriate value.

The parameter D can be chosen to provide an acceptable tradeoff between power consumption and artifacts. Smaller values of D reduce power consumption by allowing the bias to shift down more quickly in response to a drop in signal amplitude. Larger values of D reduce the rate of occurrence of clipping and/or peak-limiting artifacts, because the bias will be shifted down after the signal amplitude has been low for a longer duration, which reduces the likelihood of incorrectly concluding that the signal amplitude has actually decreased. Suitable values are in the range from 1 to 10 seconds, which corresponds to a range from R to 10R samples.

$SBS_R$ should be set fast enough to substantially decrease power consumption and slow enough to substantially inhibit user perceptible thumping. A suitable value is $1/(0.5R)$ samples$^{-1}$, which implements a full-range bias shift over the course of 500 ms, for example.

Choosing $SBS_A$ can result a tradeoff between different types of artifacts. Faster values of $SBS_A$ allow a faster response to signal amplitude increase, which substantially decreases clipping and peak-limiting artifacts, but slower values of $SBS_A$ decrease thumping. A suitable value is $1/(0.05R)$ samples$^{-1}$, which implements a full-range bias shift over the course of 50 ms, for example.

The peak-limiting slopes $PLS_A$ and $PLS_R$ can be chosen with a tradeoff between different types of artifacts. Fast slopes substantially decrease envelope distortion by making the gain change more time-limited, but excessively fast slopes may introduce spectral distortion. In addition, there is an interaction among $PLS_A$, $B_{min}$, and $\Delta$. To inhibit clipping, the following relationship can be considered:

$$PLS_A \geq -20 \log_{10}(B_{min}+1)/\Delta$$

This constraint can allow the attack slope to increase fast enough to respond to the worst-case exceedance condition within the look ahead delay. If the system noise analysis yields a choice of $B_{min}=-0.5$, and a look ahead delay of 2 ms is acceptable, an attack slope of at least 3 dB/ms=3000/R dB/sample can be provided to inhibit clipping. The release slope is not critical for preventing clipping, so the release slope can be slower to inhibit spectral distortion. A suitable value might be 1 dB/ms=1000/R dB/sample, for example.

Additional Description of the Algorithm

The algorithm can be block-oriented for efficiency and for compatibility with the block-based architecture of commercially available DSP systems. L is the block length, in samples. The look ahead delay is constrained to be an integral number of blocks. The symbol K can be used to represent the look ahead delay in blocks; hence $\Delta=KL$.

The algorithm receives a block of input samples, $x[i:i+L-1]$, and produces a block of output samples, $y[i:i+L-1]$, where i is the starting sample number of the current block. The algorithm proceeds in three sections:

1. The pre block loop section analyzes the input block, sets the sliding bias mode and target bias, and sets the peak limiting mode and target gain. The pre-block-loop section is described in further detail below with reference to method 300 and method 400 of FIG. 7.
2. The block loop applies the time-varying bias and gain to the input block to produce the output block. The block loop is described in further detail below with reference to method 500 and method 600 of FIG. 7.
3. The post block loop section checks for termination of the bias and gain trajectories and resets state variables accordingly. The post block loop section is described in further detail below with reference to method 700 and 800 of FIG. 7

The following table shows the state variables used in the algorithm and their initial values.

| Parameter | Symbol | Units | Initial Value |
|---|---|---|---|
| Sliding bias mode | SBMode | Steady, Attack, or Release | Steady |
| Peak limiting mode | PLMode | Steady, Attack, or Release | Steady |
| Sliding bias steady counter | SBCtr | samples | D |
| Peak limiting steady counter | PLCtr | samples | KL |
| Target bias | $B_T$ | unitless | -1 |
| Current bias | $B_C$ | unitless | 0 |
| Target peak limiting gain | $G_T$ | dB | 0 |
| Current peak limiting gain | $G_C$ | dB | 0 |

Figure 7:
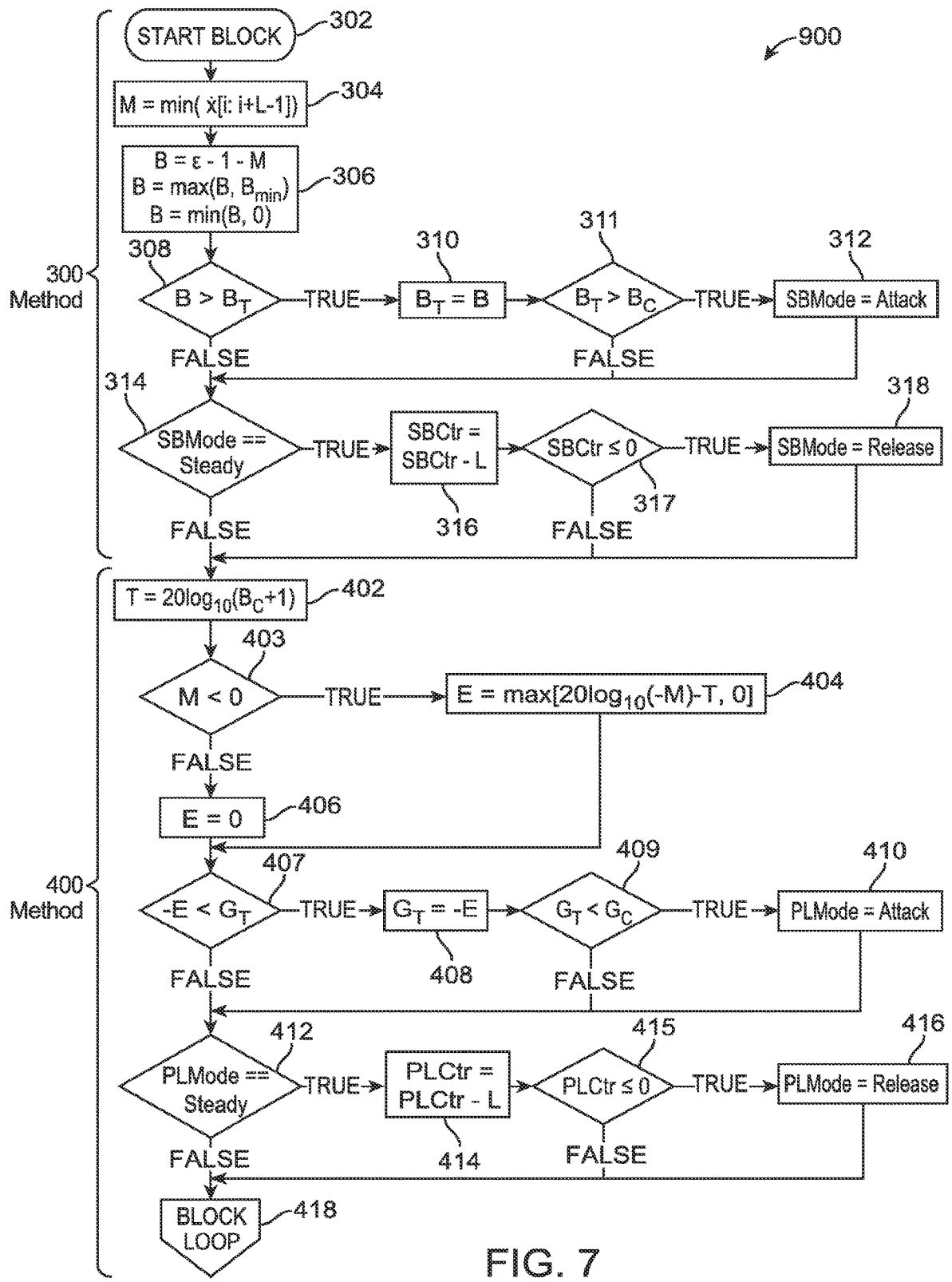
FIG. 7 shows a method of adjusting a bias and peak limiting, in accordance with embodiments.

FIG. 7 shows a method 900 of implementing an adjustable bias and peak limiting, in accordance with embodiments. The method 900 may comprise one or more of a plurality of methods, such as one or more of a method 300, a method 400, a method 500, a method 600, a method 700 or a method 800, for example.

The method 900 may comprise one or more of the following parameters:

Signals:
  $x[i]$=input at sample i, range [-1, +1]
  $y[i]$=output at sample i, range [-1, +1]
Parameters:
  L=input/output block length, samples
  K=look ahead delay, blocks
  D=sliding bias steady mode duration, samples
  $SBS_A$=sliding bias attack slope, samples$^{-1}$
  $SBS_R$=sliding bias release slope, samples$^{-1}$
  $PLS_A$=peak limiting attack slope, dB/sample
  $PLS_R$=peak limiting release slope, dB/sample
  $\varepsilon$=bias margin (unitless)
  $B_{min}$=most negative allowed bias (unitless)
State Variables:
  SBMode=sliding bias mode (Steady, Attack, or Release)
  PLMode=peak limiting mode (Steady, Attack, or Release)
  SBCtr=sliding bias steady counter, samples
  PLCtr=peak limiting steady counter, samples
  $B_T$=target bias (unitless)
  $B_C$=current bias (unitless)
  $G_T$=target peak limiting gain, dB
  $G_C$=current peak limiting gain, dB
  i=starting sample number of current block
Initialization of State Variables:
  SBMode=Steady
  PLMode=Steady
  SBCtr=D
  PLCtr=K×L
  $B_T=-1$
  $B_C=0$
  $G_T=0$
  $G_C=0$
  i=0

Method 300 comprises analyzing input signals of a system to determine whether a signal bias can be shifted and clipping inhibited, in accordance with embodiments.

At a step 302, a block of incoming signal is provided. The signal block may comprise signal from one or more auditory inputs as described herein.

At a step 304, the minimum value, M, of the incoming signal of the block is determined.

At a step 306, the most negative bias, B, that can be applied to the block without clipping any troughs of the input is determined.

At a step 308, the values of B and a target bias, $B_T$, are compared.

At a step 310, if the value of $B_T$ is less than the value of B, then the value of $B_T$ is set to equal the value of B.

At a step 311, the value of $B_T$ is compared to the value of $B_C$.

At a step 312, if the value of $B_T$ is greater than $B_C$, then a signal bias mode (hereinafter "SBMode"), is set to "Attack."

Steps 308, 310, 311, and 312 disclose a method of setting the SBMode to "attack" when the bias should be increased in order to account for deeper troughs in the signal, so as to inhibit clipping.

At a step 314, the value of SBMode is compared to "steady."

At a step 316, if the value of SBMode is equal to "steady," a counter with a defined interval or cycle is decremented.

At a step 317, the value of the counter is compared to zero.

At a step 318, if the counter is less than or equal to zero, then the SBMode is set to "release."

Steps 314, 316, 317, and 318 disclose a method of setting SBMode to "release" when, after a defined period as determined by the counter, no peaks were clipped.

A method 400 comprises analyzing input signals of a system to determine whether or not the gain should be adjusted to limit peaks in order to inhibit clipping, in accordance with embodiments.

At a step 402, a threshold T for the peak limiting algorithm disclosed herein is determined, comprising a formula that includes the value of $B_C$ from method 300.

At a step 403, the value of M, the minimum value of the incoming signal of the block of step 302, is compared to 0.

At a step 404, if M is less than 0, then an exceedance E is determined, representing the number of decibels a signal trough goes below the threshold, if at all.

At a step 406, if M is not less than 0, then E is set to equal 0.

At a step 407, the value of −1 multiplied by E is compared to a target peak limiting gain, $G_T$.

At a step 408, if −1 multiplied by E is less than $G_T$, then $G_T$ is set to equal −1 multiplied by E.

At a step 409, the value of $G_T$ is compared to the value of the current gain of the system, $G_C$.

At a step 410, if $G_T$ is less than $G_C$, the peak limiting mode (hereinafter "PLMode"), is set to "attack."

Steps 407, 408, 409, and 410 disclose a method of setting the peak limiting mode to "attack" in order to adjust for troughs that may be clipped.

At a step 412, the value of PLMode is compared to "steady."

At a step 414, if the value of PLMode is equal to "steady," a counter with a defined interval or cycle is decremented.

At a step 415, the value of the counter is compared to 0.

At a step 416, once the counter has been exhausted, PLMode is set to "release."

At a step 418, the PLMode and the SBMode of method 300 is passed on to a subsequent block loop method.

Steps 412, 414, 415, and 416 disclose a method of setting the peak limiting mode to "release" when, after a given period as determined by the counter, no peaks have been clipped.

Method 500 comprises changing the signal bias and inhibiting clipping, in accordance with embodiments. Method 500 comprises a block loop method that may accept outputs from method 300.

At a step 502, a loop is initiated.

At a step 503, the state of SBmode is determined. At step 503, the state variable SBMode comprises an input from the outputs of method 300, for example. The SBMode may comprise states "attack" and "release", for example.

At a step 504, if SBMode is set to "attack," then $B_C$ will be set to the smaller value of either $B_C$ plus a sliding bias attack mode slope, or $B_T$.

At a step 505, the state of SBMode is determined.

At a step 506, if SBMode is set to "release," then $B_C$ will be set to the larger value of either $B_C$ minus a sliding bias release mode slope, or $B_T$.

At a step 508, the loop executes until any loop conditions are satisfied. For example, such loop conditions may comprise exhaustion of a counter.

Method 600 comprises changing the gain of a system in order to inhibit clipping, in accordance with embodiments. Method comprises a block loop method that may accept outputs from method 400.

At a step 602, a loop is initiated.

At step 603, the state of PLMode is determined. At step 603, the state variable PLMode comprises an input from the outputs of embodiments such as those of method 400. For example, PLMode may comprise states "attack" and "release."

At a step 604, if PLMode is set to "attack," then $G_C$ will be set to the larger value of either $G_C$ minus a peak limiting attack mode slope, or $G_T$.

At a step 605, the state of PLMode is determined.

At a step 606, if PLMode is set to "release," then $G_C$ will be set to the smaller value of either $G_C$ minus a peak limiting release mode slope, or $G_T$.

At a step 608, an output sample—comprising an equation comprising variables such as $G_C$, a look ahead time delay, and a current bias—is determined.

At a step 610, the loop executes until any loop conditions are satisfied. For example, such loop conditions may comprise exhaustion of a counter.

A method 700 comprises updating the sliding bias mode as appropriate, in accordance with embodiments. Method 700 comprises accepting outputs from methods such as method 500.

At a step 701, the value of $B_C$ is compared to the value of $B_T$, and the value of SBMode is determined.

At a step 702, if $B_C$ is equal to $B_T$ and SBMode is not set to "steady, then SBMode will be set to "steady" for a defined amount of time. State variables, such as $B_T$, are also initialized.

At a step 704, the method terminates.

A method 800 comprises updating the peak limiting mode as appropriate, in accordance with embodiments. Method 800 comprises accepting outputs from methods such as method 600.

At a step 801, the value of $G_C$ is compared to the value of $G_T$, and the value of PLMode is determined.

At a step 802, if $G_C$ is equal to $G_T$, and PLMode is not set to "steady, then PLMode will be set to "steady" for a given amount of time. State variables, such as $G_T$, are also initialized.

At a step 804, the algorithm terminates.

The method 900 discloses a method of adjusting a bias and limiting peaks, in accordance with embodiments. A person of ordinary skill in the art will recognize many variations and modifications based on the disclosure provided herein. For example, some steps may be added or removed. The steps can be combined, or the order changed. Some of the methods may comprise sub-methods. Some of the steps may comprise sub-steps, and many of the steps can be repeated.

The values of method 900 can be determined with one or more of calculations, look up tables, fuzzy logic, or neural networks, for example.

The method 900 can be embodied with instructions stored on a tangible medium of processor 170. The processor can be coupled to components of the system in order to perform one or more steps of method 900.

Examples of ranges of parameters suitable for use with method 900 may comprise one or more of the following, where R is the sampling rate of the system:
  K (look ahead delay), within a range from about 0.0001R/L to about 0.01R/L
  D (sliding bias steady mode duration), within a range from about 0.5R to about 2R
  $SBS_A$ (sliding bias attack slope), within a range from about 1/(0.01R) to about 1/(0.9R)
  $SBS_R$ (sliding bias release slope), within a range from about 1/(0.1R) to about 1/(0.9R)
  $PLS_A$ (peak limiting attack slope), within a range from about 1000/R to about 9000/R
  $PLS_R$ (peak limiting release slope), within a range from about 100/R to about 10000/R
  ε (bias margin), within a range from about 0.05 to about 0.3
  $B_{min}$ (most negative allowed bias), within a range from about −0.5 to about −1.0

While preferred embodiments of the present disclosure have been shown and described herein, it will be obvious to those skilled in the art that such embodiments are provided by way of example only. Numerous variations, changes, and substitutions will be apparent to those skilled in the art without departing from the scope of the present disclosure. It should be understood that various alternatives to the embodiments of the present disclosure described herein may be employed without departing from the scope of the present invention. Therefore, the scope of the present invention shall be defined solely by the scope of the appended claims and the equivalents thereof.

What is claimed is:

1. A method of transmitting an audio signal to an ear of a user, the method comprising:
  receiving the audio signal from an input;
  determining a bias of the audio signal and a biased audio signal with a processor in response to the audio signal;
  outputting the biased audio signal to circuitry to drive an electromagnetic energy source with the biased signal in order to generate an electromagnetic signal with decreased electromagnetic energy transmitted from the light source; and
  receiving the electromagnetic signal with an output transducer to vibrate the ear in response to the electromagnetic signal,
  wherein the processor comprises instructions for a look ahead delay to decrease the gain to inhibit clipping in response to a negative signal below a threshold amount detected with the look ahead delay.

2. A method as in claim 1, wherein the processor comprises instructions to adjust the bias to decrease the energy of the electromagnetic signaling in response to decreased energy of the audio signal and to adjust the bias to increase the energy of the electromagnetic signal in response to increased energy of the audio signal in order to inhibit distortion.

3. A method as in claim 2, wherein the processor comprises instructions to adjust the bias in a direction corresponding to negative sound pressure in response to decreased amounts of negative sound pressure of the audio signal.

4. A method as in claim 2, wherein the processor comprises instructions to adjust the bias to decrease amounts of the energy of the electromagnetic signal at a first rate and to increase amounts of the energy of the electromagnetic signal at a second rate to inhibit distortion, the first rate slower than the second rate.

5. A method as in claim 2, wherein the processor comprises instructions to adjust the bias over a time duration of more than about 50 ms in order to inhibit an audible thump.

6. A method as in claim 2, wherein the processor comprises instructions to adjust the bias over a time duration of more than about 20 ms in order to inhibit an audible thump.

7. A method as in claim 1, wherein the processor comprises instructions to adjust the biased signal to more positive values in response to the negative signal below the threshold amount and to increase the gain when the biased signal is adjusted to the more positive values.

8. A method as in claim 1, wherein the negative signal corresponds to negative sound pressure and the threshold amount comprises a lower end of the input range.

9. A method as in claim 8, wherein the processor comprises instructions to decrease the gain faster than a change in bias and wherein the bias remains substantially fixed when the gain is decreased in response to the signal below the threshold.

10. A method as in claim 9, wherein the processor comprises instructions to decrease the gain over a duration no more than a length of the look ahead delay and the bias remains substantially fixed to within about five percent (5%) over the length of the look ahead delay.

11. A method as in claim 1, wherein the processor comprises instructions to limit the bias in response to a noise floor associated with one or more of delta sigma modulation circuitry, the circuitry to drive the electromagnetic energy source, electromagnetic energy source or the output transducer to receive the output signal.

12. A method as in claim 1, wherein the audio signal comprises a fixed bias and the processor comprises instructions to determine the biased audio signal in response to the fixed bias of the audio signal.

13. A method as in claim 1, wherein the circuitry to drive the electromagnetic energy source comprises delta sigma modulation circuitry.

14. A method as in claim 13, wherein the delta sigma modulation circuitry comprises one or more of pulse width modulation circuitry, pulse density modulation circuitry, or a digital to analog converter of the processor comprising the pulse density modulation circuitry.

15. A method as in claim 14, wherein the circuitry to drive the electromagnetic energy source comprises an analog amplifier.

16. A method of transmitting an audio signal to an ear of a user, the method comprising:
  receiving the audio signal from an input;
  determining a bias of the audio signal and a biased audio signal with a processor in response to the audio signal;
  outputting the biased audio signal to circuitry to drive an electromagnetic energy source with the biased signal in order to generate an electromagnetic signal with decreased electromagnetic energy transmitted from the light source; and
  receiving the electromagnetic signal with an output transducer to vibrate the ear in response to the electromagnetic signal,
  wherein the processor comprises instructions to limit the bias in response to a noise floor associated with one or more of delta sigma modulation circuitry, the circuitry to drive the electromagnetic energy source, the electromagnetic energy source or the output transducer to receive the output signal.

17. A method as in claim 16, wherein the processor comprises instructions to adjust the bias to decrease the energy of the electromagnetic signaling in response to decreased energy of the audio signal and to adjust the bias to increase the energy of the electromagnetic signal in response to increased energy of the audio signal in order to inhibit distortion.

18. A method as in claim 17, wherein the processor comprises instructions to adjust the bias in a direction corresponding to negative sound pressure in response to decreased amounts of negative sound pressure of the audio signal.

19. A method as in claim 17, wherein the processor comprises instructions to adjust the bias to decrease amounts of the energy of the electromagnetic signal at a first rate and to increase amounts of the energy of the electromagnetic signal at a second rate to inhibit distortion, the first rate slower than the second rate.

20. A method as in claim 17, wherein the processor comprises instructions to adjust the bias over a time duration of more than about 50 ms in order to inhibit an audible thump.

21. A method as in claim 17, wherein the processor comprises instructions to adjust the bias over a time duration of more than about 20 ms in order to inhibit an audible thump.

22. A method as in claim 16, wherein the processor comprises instructions for a look ahead delay to decrease the gain to inhibit clipping in response to a negative signal below a threshold amount detected with the look ahead delay.

23. A method as in claim 22, wherein the processor comprises instructions to adjust the biased signal to more positive values in response to the negative signal below the threshold amount and to increase the gain when the biased signal is adjusted to the more positive values.

24. A method as in claim 22, wherein the negative signal corresponds to negative sound pressure and the threshold amount comprises a lower end of the input range.

25. A method as in claim 24, wherein the processor comprises instructions to decrease the gain faster than a change in bias and wherein the bias remains substantially fixed when the gain is decreased in response to the signal below the threshold.

26. A method as in claim 25, wherein the processor comprises instructions to decrease the gain over a duration no more than a length of the look ahead delay and the bias remains substantially fixed to within about five percent (5%) over the length of the look ahead delay.

27. A method as in claim 16, wherein the audio signal comprises a fixed bias and the processor comprises instructions to determine the biased audio signal in response to the fixed bias of the audio signal.

28. A method as in claim 16, wherein the circuitry to drive the electromagnetic energy source comprises delta sigma modulation circuitry.

29. A method as in claim 28, wherein the delta sigma modulation circuitry comprises one or more of pulse width modulation circuitry, pulse density modulation circuitry, or a digital to analog converter of the processor comprising the pulse density modulation circuitry.

30. A method as in claim 29, wherein the circuitry to drive the electromagnetic energy source comprises an analog amplifier.

31. A method of transmitting an audio signal to an ear of a user, the method comprising:
receiving the audio signal from an input;
determining a bias of the audio signal and a biased audio signal with a processor in response to the audio signal;
outputting the biased audio signal to circuitry to drive an electromagnetic energy source with the biased signal in order to generate an electromagnetic signal with decreased electromagnetic energy transmitted from the light source; and
receiving the electromagnetic signal with an output transducer to vibrate the ear in response to the electromagnetic signal,
wherein the audio signal comprises a fixed bias and the processor comprises instructions to determine the biased audio signal in response to the fixed bias of the audio signal,
wherein the processor comprises instructions for a look ahead delay to decrease the gain to inhibit clipping in response to a negative signal below a threshold amount detected with the look ahead delay.

32. A method as in claim 31, wherein the processor comprises instructions to adjust the bias to decrease the energy of the electromagnetic signaling in response to decreased energy of the audio signal and to adjust the bias to increase the energy of the electromagnetic signal in response to increased energy of the audio signal in order to inhibit distortion.

33. A method as in claim 32, wherein the processor comprises instructions to adjust the bias in a direction corresponding to negative sound pressure in response to decreased amounts of negative sound pressure of the audio signal.

34. A method as in claim 32, wherein the processor comprises instructions to adjust the bias to decrease amounts of the energy of the electromagnetic signal at a first rate and to increase amounts of the energy of the electromagnetic signal at a second rate to inhibit distortion, the first rate slower than the second rate.

35. A method as in claim 32, wherein the processor comprises instructions to adjust the bias over a time duration of more than about 50 ms in order to inhibit an audible thump.

36. A method as in claim 32, wherein the processor comprises instructions to adjust the bias over a time duration of more than about 20 ms in order to inhibit an audible thump.

37. A method as in claim 31, wherein the processor comprises instructions to adjust the biased signal to more positive values in response to the negative signal below the threshold amount and to increase the gain when the biased signal is adjusted to the more positive values.

38. A method as in claim 31, wherein the negative signal corresponds to negative sound pressure and the threshold amount comprises a lower end of the input range.

39. A method as in claim 38, wherein the processor comprises instructions to decrease the gain faster than a change in bias and wherein the bias remains substantially fixed when the gain is decreased in response to the signal below the threshold.

40. A method as in claim 39, wherein the processor comprises instructions to decrease the gain over a duration no more than a length of the look ahead delay and the bias remains substantially fixed to within about five percent (5%) over the length of the look ahead delay.

41. A method as in claim 31, wherein the circuitry to drive the electromagnetic energy source comprises delta sigma modulation circuitry.

42. A method as in claim 41, wherein the delta sigma modulation circuitry comprises one or more of pulse width modulation circuitry, pulse density modulation circuitry, or a digital to analog converter of the processor comprising the pulse density modulation circuitry.

43. A method as in claim 42, wherein the circuitry to drive the electromagnetic energy source comprises an analog amplifier.

44. A method of transmitting an audio signal to an ear of a user, the method comprising:
    receiving the audio signal from an input;
    determining a bias of the audio signal and a biased audio signal with a processor in response to the audio signal;
    outputting the biased audio signal to circuitry to drive an electromagnetic energy source with the biased signal in order to generate an electromagnetic signal with decreased electromagnetic energy transmitted from the light source; and
    receiving the electromagnetic signal with an output transducer to vibrate the ear in response to the electromagnetic signal,
    wherein the audio signal comprises a fixed bias and the processor comprises instructions to determine the biased audio signal in response to the fixed bias of the audio signal, and
    wherein the circuitry to drive the electromagnetic energy source comprises delta sigma modulation circuitry.

45. A method as in claim 44, wherein the processor comprises instructions to adjust the bias to decrease the energy of the electromagnetic signaling in response to decreased energy of the audio signal and to adjust the bias to increase the energy of the electromagnetic signal in response to increased energy of the audio signal in order to inhibit distortion.

46. A method as in claim 45, wherein the processor comprises instructions to adjust the bias in a direction corresponding to negative sound pressure in response to decreased amounts of negative sound pressure of the audio signal.

47. A method as in claim 45, wherein the processor comprises instructions to adjust the bias to decrease amounts of the energy of the electromagnetic signal at a first rate and to increase amounts of the energy of the electromagnetic signal at a second rate to inhibit distortion, the first rate slower than the second rate.

48. A method as in claim 45, wherein the processor comprises instructions to adjust the bias over a time duration of more than about 50 ms in order to inhibit an audible thump.

49. A method as in claim 45, wherein the processor comprises instructions to adjust the bias over a time duration of more than about 20 ms in order to inhibit an audible thump.

50. A method as in claim 44, wherein the processor comprises instructions for a look ahead delay to decrease the gain to inhibit clipping in response to a negative signal below a threshold amount detected with the look ahead delay.

51. A method as in claim 50, wherein the processor comprises instructions to adjust the biased signal to more positive values in response to the negative signal below the threshold amount and to increase the gain when the biased signal is adjusted to the more positive values.

52. A method as in claim 50, wherein the negative signal corresponds to negative sound pressure and the threshold amount comprises a lower end of the input range.

53. A method as in claim 52, wherein the processor comprises instructions to decrease the gain faster than a change in bias and wherein the bias remains substantially fixed when the gain is decreased in response to the signal below the threshold.

54. A method as in claim 53, wherein the processor comprises instructions to decrease the gain over a duration no more than a length of the look ahead delay and the bias remains substantially fixed to within about five percent (5%) over the length of the look ahead delay.

55. A method as in claim 44, wherein the delta sigma modulation circuitry comprises one or more of pulse width modulation circuitry, pulse density modulation circuitry, or a digital to analog converter of the processor comprising the pulse density modulation circuitry.

56. A method as in claim 55, wherein the circuitry to drive the electromagnetic energy source comprises an analog amplifier.

* * * * *